US007040983B2

(12) United States Patent
Dolloff et al.

(10) Patent No.: US 7,040,983 B2
(45) Date of Patent: *May 9, 2006

(54) GAMING DEVICE HAVING A MULTI-ROUND, MULTI-CHARACTERISTIC MATCHING GAME

(75) Inventors: Jan K. Dolloff, Pasadena, CA (US); Randall D. Mead, Reno, NV (US); John D. Hostetler, Reno, NV (US); Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 635 days.

This patent is subject to a terminal disclaimer.

(21) Appl. No.: 10/243,706

(22) Filed: Sep. 13, 2002

(65) Prior Publication Data

US 2003/0045338 A1 Mar. 6, 2003

Related U.S. Application Data

(63) Continuation-in-part of application No. 09/813,698, filed on Mar. 21, 2001, now Pat. No. 6,749,502.

(51) Int. Cl.
*A63F 13/00* (2006.01)

(52) U.S. Cl. ........................................................ 463/16

(58) Field of Classification Search ............ 463/16–20, 463/25, 29; 273/138.1, 139

See application file for complete search history.

(56) References Cited

U.S. PATENT DOCUMENTS

| | | | |
|---|---|---|---|
| 4,448,419 | A | 5/1984 | Telnaes |
| 4,508,353 | A | 4/1985 | Meyer et al. |
| 4,624,459 | A | 11/1986 | Kaufman |
| 4,695,053 | A | 9/1987 | Vazquez, Jr. et al. |
| 4,732,386 | A | 3/1988 | Rayfiel |
| 4,775,155 | A | 10/1988 | Lees |
| 5,072,946 | A | 12/1991 | Miller |
| 5,205,555 | A | 4/1993 | Humano |
| 5,324,041 | A | 6/1994 | Boylan et al. |
| 5,423,539 | A | 6/1995 | Nagao |

(Continued)

FOREIGN PATENT DOCUMENTS

EP 0945837 A2 9/1999

(Continued)

OTHER PUBLICATIONS

Uno Original Instructions published by Mattel, Inc. in 1998.

(Continued)

*Primary Examiner*—Kim Nguyen
(74) *Attorney, Agent, or Firm*—Bell, Boyd & Lloyd, LLC

(57) ABSTRACT

A gaming device having a multi-characteristic matching game including a plurality of rounds. In each round, the gaming device displays a base and a plurality of selections including at least two characteristics. The gaming device enables a player to pick one of the selections to match at least one of the characteristics of the selection with one of the characteristics of the base. The player continues to pick selections until there are no selections remaining in the round that include at least one characteristic that matches one of the characteristics of the base. The gaming device then initiates the next round. The player continues to pick selections in each of the rounds until there are no rounds remaining. The gaming device determines a modified award in each round based on a modifier associated with each round. The modified awards are summed to provide a total award for the game.

102 Claims, 32 Drawing Sheets

U.S. PATENT DOCUMENTS

| | | | |
|---|---|---|---|
| 5,449,173 | A | 9/1995 | Thomas et al. |
| 5,511,781 | A | 4/1996 | Wood et al. |
| 5,531,441 | A | 7/1996 | Dabrowski et al. |
| 5,536,016 | A | 7/1996 | Thompson |
| 5,542,669 | A | 8/1996 | Charron et al. |
| 5,560,603 | A | 10/1996 | Seelig et al. |
| 5,607,162 | A | 3/1997 | Boylan et al. |
| 5,611,535 | A | 3/1997 | Tiberio |
| 5,722,891 | A | 3/1998 | Inoue |
| 5,769,716 | A | 6/1998 | Saffari et al. |
| 5,772,509 | A | 6/1998 | Weiss |
| 5,788,573 | A | 8/1998 | Baerlocher et al. |
| 5,823,874 | A | 10/1998 | Adams |
| 5,848,932 | A | 12/1998 | Adams |
| 5,851,148 | A | 12/1998 | Brune et al. |
| 5,882,261 | A | 3/1999 | Adams |
| 5,911,418 | A | 6/1999 | Adams |
| 5,919,091 | A | 7/1999 | Bell et al. |
| 5,935,002 | A | 8/1999 | Falciglia |
| 5,944,314 | A | 8/1999 | Stavinsky |
| 5,947,820 | A | 9/1999 | Morro et al. |
| 5,951,397 | A | 9/1999 | Dickinson |
| 5,988,643 | A | 11/1999 | Awada |
| 5,989,121 | A | 11/1999 | Sakamoto |
| 5,996,997 | A | 12/1999 | Kamille |
| 6,004,207 | A | 12/1999 | Wilson, Jr. et al. |
| 6,015,346 | A | 1/2000 | Bennett |
| 6,059,658 | A | 5/2000 | Mangano et al. |
| 6,089,976 | A | 7/2000 | Schneider et al. |
| 6,089,977 | A | 7/2000 | Bennett |
| 6,102,798 | A | 8/2000 | Bennett |
| 6,105,962 | A | 8/2000 | Malavazos et al. |
| 6,126,542 | A | 10/2000 | Fier |
| 6,129,355 | A | 10/2000 | Hahn et al. |
| 6,142,873 | A | 11/2000 | Weiss et al. |
| 6,149,521 | A | 11/2000 | Sanduski |
| 6,159,098 | A | 12/2000 | Slomiany et al. |
| 6,164,652 | A | 12/2000 | Lauretta et al. |
| 6,173,955 | B1 | 1/2001 | Perrie et al. |
| 6,174,234 | B1 | 1/2001 | Seibert, Jr. et al. |
| 6,174,235 | B1 | 1/2001 | Walker et al. |
| 6,224,483 | B1 | 5/2001 | Mayeroff |
| 6,227,969 | B1 | 5/2001 | Yoseloff |
| 6,227,971 | B1 | 5/2001 | Weiss |
| 6,231,442 | B1 | 5/2001 | Mayeroff |
| 6,234,897 | B1 | 5/2001 | Frohm et al. |
| 6,261,177 | B1 | 7/2001 | Bennett |
| 6,287,197 | B1 | 9/2001 | Dickinson et al. |
| 6,299,165 | B1 | 10/2001 | Nagano |
| 6,305,686 | B1 | 10/2001 | Perrie et al. |
| 6,309,300 | B1 | 10/2001 | Glavich |
| 6,312,334 | B1 | 11/2001 | Yoseloff |
| 6,315,663 | B1 | 11/2001 | Sakamoto |
| 6,336,860 | B1 | 1/2002 | Webb |
| 6,346,043 | B1 | 2/2002 | Colin et al. |
| 6,347,996 | B1 | 2/2002 | Gilmore et al. |
| 6,398,644 | B1 | 6/2002 | Perrie et al. |
| 6,561,902 | B1 | 5/2003 | Walker et al. |
| 6,572,472 | B1 | 6/2003 | Glavich |
| 6,592,457 | B1 | 7/2003 | Frohm et al. |
| 6,749,502 | B1 * | 6/2004 | Baerlocher .................. 463/16 |
| 2002/0025847 | A1 | 2/2002 | Thomas et al. |
| 2002/0034974 | A1 | 3/2002 | Wood et al. |
| 2004/0097282 | A1 | 5/2004 | Baerlocher et al. |

FOREIGN PATENT DOCUMENTS

| | | |
|---|---|---|
| GB | 2 117 155 | 10/1983 |
| GB | 2 262 642 | 6/1993 |
| GB | 2 335 524 | 9/1999 |
| GB | 2 393 021 | 3/2004 |
| GB | 2 396 566 | 6/2004 |
| WO | WO9732285 | 9/1997 |
| WO | WO 00/12186 | 3/2000 |
| WO | WO 2005/028045 A2 | 3/2005 |

OTHER PUBLICATIONS

Uno Game Illustration written by Marshall Fey, published in 1983, 1989, 1991, 1994 and 1997.

Clue Advertisement published by Mikohn in 2002.

Unusual Suspects—Clue Advertisement published by Mikohn in 2003.

Clue—Most Wanted Advertisement published by Mikohn in 2003.

Trivial Pursuit Advertisement published by Mikohn in 2003.

Addams Family Article written by Strictly Slots, published Jul., 2000.

All Grown Up written by Sodak Gaming, Inc., published in 2003, on or before Dec. thereof.

Austin Powers written by IGT, published in 2001, on or before Dec. thereof.

Catch a Wave Article written by IGT, published in 2001, on or before Dec. thereof.

On the Money Article written Casino Data System, published Dec., 2000.

Price is Right Showcase Showdown, written by IGT, published in 2001, on or before Dec. thereof.

Red, White and Blue Advertisement written by IGT, published in 2000, on or before Dec. thereof.

Rules of Card Games: One Minute Solitaire, published at www.pagat.com (website last updated Jan. 12, 2002), dated 1989 on or before Dec. thereof.

Slot Machines written by Marshall Fey, published in 1983, 1989, 1991, 1994 and 1997, on or before Dec. thereof.

Slots 2003, part one, written by Melissa Raimondi, published Jan., 2003.

South Park written by IGT, published in 2000, on or before Dec. thereof.

UNO and Magic 8 Ball Slots Offer a One-Two Punch of Fun!, Slotline 2003, summer edition, 2003, on or before Dec. thereof.

Uno Game Description by C.R. Light & Co., published in 1900, on or before Dec. thereof.

* cited by examiner

122

| PAY TABLE | |
|---|---|
| MATCHES | AWARD |
| 36 | 10,000 |
| 35 | 5,000 |
| 30-34 | 1,000 |
| 25-29 | 500 |
| 20-24 | 250 |
| 15-19 | 100 |
| 10-14 | 50 |
| 5-9 | 10 |
| 0-4 | 0 |

GAMING DEVICE HAVING A MULTI-ROUND, MULTI-CHARACTERISTIC MATCHING GAME

PRIORITY CLAIM

This application is a continuation-in-part and claims the benefit of U.S. patent application Ser. No. 09/813,698, filed Mar. 21, 2001, now U.S. Pat. No. 6,749,502.

CROSS REFERENCE TO RELATED APPLICATIONS

This application is related to the following commonly-owned co-pending patent applications: "Electronic Gaming Method and Apparatus Using Simulated Number Card Deck," Ser. No. 09/539,277, "Image Matching Game Method," Ser. No. 09/395,034, and "Gaming Device With Bonus Scheme Providing Increased Reward for Selecting Related Symbols," Ser. No. 09/605,023.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device having a multi-characteristic matching game.

BACKGROUND OF THE INVENTION

Gaming devices such as slot machines, video poker machines, blackjack machines and keno machines are well-known. Slot and other machines having primary and secondary or bonus games or schemes are also well known. Such gaming devices have schemes in which a player has one or more opportunities to place wagers and interact with the gaming device. Since players continue to seek more entertainment and enjoyment from different types of gaming devices, it is desirable to provide players with gaming devices with new game schemes where the players have an opportunity to receive winning payouts and are entertained at the same time.

SUMMARY OF THE INVENTION

The present invention provides a gaming device having a multi-characteristic matching game scheme. The multi-characteristic matching game scheme of the present invention can be employed as a primary or secondary or bonus game in a gaming device. The gaming device provides a base and a plurality of selections. The base and each of the selections include a plurality of characteristics. To play the game, the player selects at least one selection that has at least one characteristic that matches (i.e., that is the same as, that is equal to or that is equivalent to) one of the characteristics of the base. The game continues as long as the player continues to match characteristics between one of the selections and the base. If the player is unable to make a match, the game terminates or alternatively replaces the selection with new selections. The gaming device provides the player an award based on the number of matches and/or values associated with the matches.

Alternative embodiments of the present invention include providing multiple bases, providing awards associated with different numbers of matches or different ranges of numbers of matches, providing award values for each match, masking selections and having a varying number of characteristics, selections and bases.

In an alternative embodiment of the present invention, one or more of the selections could have multi-part characteristics and/or could have functional elements. Multi-part characteristics could match more than one or multiple different characteristics similar to the function of a wild card. Functional elements of selections could perform actions such as, but not limited to, changing one or more characteristics of the base, changing one or more of the selections or characteristics of the selections, adding another base, eliminating a selection, etc.

In another embodiment of the present invention, a selection could reveal associated selections such as selections that the first selection was blocking or overlaying. Such associated selections may have none, some or all of such selection's characteristics revealed to the player while it was blocked. This would enable the player to strategically select the selection that would unblock or make available a desired selection.

In yet another embodiment of the present invention, the selection could be masked and revealed as they are selected. If the chosen selection has a characteristic matching one of the characteristics of the base, it is matched to (or replaces) the base, otherwise the revealed selection is a miss. In this embodiment, a defined number of misses would end the game.

In an alternative embodiment of the present invention, the multi-characteristic matching game includes a plurality of rounds. In each round, the gaming device displays a base including at least two characteristics and a plurality of selections, which each include at least two of the characteristics. The characteristics may be symbols, colors, numbers, letters, character's, images or any other suitable characteristics. In another embodiment, the gaming device displays a plurality of selections at the beginning of a game and enables the player to pick the base selection or base from the plurality of selections.

In each round of the game, the gaming device enables the player to pick selections having at least one characteristic that matches one of the characteristics of the base. The player continues to pick selections in each round until there are no selections including at least one characteristic that matches one of the characteristics of the base in that round. Each time the player picks a selection in a round, the selection is removed and cannot be re-picked in that round. Therefore, after each pick of the selections, if at least one of the characteristics of the picked selection matches one of the characteristics on the base, the picked selection replaces the base as the new base in the round. In one embodiment, the gaming device generates and displays a base at the beginning of the game. In another embodiment, the gaming displays a plurality of selections to the player and enables the player to pick the base from the selections. The game then continues as described above.

In one embodiment, the gaming device provides an award for each picked selection that includes a characteristic that matches one of the characteristics of the base. The award may be values, credits, multipliers or any suitable award. In another embodiment, the gaming device provides an award to the player for each matching characteristic between a picked selection and the base. For example, the gaming device provides two awards when the player picks a selection including two characteristics that match two of the characteristics of the base. In another embodiment, the gaming device provides at least one multiplier to the player when multiple characteristics of the picked selection match multiple characteristics of the base. In one aspect of this embodiment, the multiplier is based on the number of matching characteristics between the picked selection and the base. In a further embodiment, a modifier such as a multiplier is associated with each of the rounds and modifies the accumulated award in each of those rounds. The player continues to pick selections in each round until there are no rounds remaining in the game. At the end of the game, the modified awards are summed from each of the rounds to provide a total award to the player for the game.

In a further embodiment, a modifier is associated with at least one of the selections in the rounds of the game. The modifiers may be viewable by a player or masked or hidden from the player. The player picks the selections and obtains the modifier associated with each of the picked selections when the picked selections include at least one characteristic that matches one of the characteristics of the base. Any modifiers obtained by the player from the selections are added or transferred to the modifier displays in each of the rounds.

In one embodiment, the modifiers associated with each of the rounds in a game are multipliers. In one aspect of this embodiment, at least two of the multipliers associated with the rounds are different. In another aspect of this embodiment, a plurality of the multipliers associated with the rounds are different. In a further aspect of this embodiment, all of the multipliers associated with the rounds are different. The multipliers may change in one or more of the rounds. In one embodiment, the multipliers increase in each round of the game. In another embodiment, the multipliers increase in a plurality of the rounds of the game. It should be appreciated that the multipliers may increase, decrease or remain unchanged in one or more of the rounds of the game. Additionally, the multipliers may be pre-determined, randomly determined, determined based upon a wager made by a player in the game or according to any suitable determination method.

In another embodiment, the awards provided to the player for each matching selection in the rounds are different in each round. In another embodiment, the plurality of the awards are different in the rounds. The awards may be randomly determined, predetermined, determined by a wager made by the player or determined according to any other suitable method. Additionally, the awards may increase, decrease or remain unchanged in one or more rounds of the game. The awards may be values, credits, multipliers or any suitable award. Alternatively, the awards may equal the value or values of one or more characteristics associated with a picked selection.

In a further embodiment, the gaming device provides a bonus award to the player when the player matches at least one characteristic of each of the selections in a round with one of the characteristics on the base in that round. In other words, the bonus award is provided to the player if the player uses all of the selections in the round. The bonus award may be provided to the player in one round, or a plurality of the rounds in a game, or in all of the rounds in a game. Furthermore, the bonus award may be one or more values, credits, multipliers, or any suitable awards. The bonus award is added to the players total award in the round in which the player obtained the bonus award. Additionally, the bonus award may be added to the other awards obtained by the player in the round and then modified by the modifier in that round. Alternatively, the bonus award is added to the modified award in each of the rounds.

In a further embodiment, the base and the selections in each of the rounds are playing cards. In this embodiment, the player picks card selections to match at least one of the characteristics on the card selections such as the suit, color or type of card, with one of the characteristics on the base card. The player continues to pick card selections in each of the rounds until there are no selections including at least one characteristic that matches one of the characteristics of the base or until there are no card selections remaining in the round.

As described above, a player's goal is to continue to pick selections that include at least one characteristic that matches one of the characteristics of the base. Because the picked selection replaces the base when the picked selection includes at least one characteristic that matches one of the characteristics of the base, the player must determine how many matching selections the player can make by picking each of the initially displayed selections. The optimal or best selection in each pick therefore, is the selection that enables the player to match the most selections in the game. Thus, the player attempts to pick the selections that will enable the player to match the most selections in the game to maximize the player's award in the game.

In a further alternative embodiment of the present invention, a multi-characteristic matching game includes a prompt or indicator which directs the player to one of the selections in a game, and preferable to the best pick, best selection or optimal play or selection in the game at a point in time in the game. The prompt or indicator may indicate the selections by highlighting or illuminating, the designated selections. The gaming device may also indicate the designated selection by displaying a prompt or indicator adjacent to or near the designated selection. In one embodiment, the prompt is a statement such as "best pick" or any other suitable phrase or statement. The displayed prompt or indicator directs the player to the best selection or best pick in that round or game. In one embodiment, if the player does not pick the selection which is designated as the best pick by the gaming device, the gaming device continues to direct the player to the best pick until the player picks the best pick or best selection in the round or game. Thus, the gaming device ensures that the player will pick the best selection or selections in the game and therefore, obtain the best possible award in the game.

In another embodiment, the gaming device indicates or displays the best pick or optimal selection to the player in one or more picks of the selections. Thus, the gaming device does not display or direct the player to the best pick in each pick of the selections. In this embodiment, the best pick or best selection may be designated in one or more picks of the selections. The gaming device may randomly determine, predetermine or determine based on a wager by the player when to display or direct the player to the best pick in a game.

In one embodiment, the gaming device displays a plurality of selections to the player and enables the player to pick one of the selections to be the base at the beginning of a game. In this embodiment, the gaming device indicates which selection is the best pick or best selection to be the base in the game.

In one embodiment, the gaming device directs a player to the best pick or best selection in one or more picks in a game based on the player's previous pick or picks in that game. In this embodiment, the gaming device enables the player to pick one of the selections in the game. If the player does not pick the best selection, the gaming device directs the player to the best selection. In one aspect of this embodiment, the gaming device continues to direct the player to the best selection until the player picks the best selection. In another aspect of this embodiment, the gaming device directs the player to the best selection when the player does not pick the best selection for a designated number of picks of the selections. If the player picks a selection, other than the best selection, after the designated number of picks, the gaming device enables the player to pick that selection instead of the best selection. In one embodiment, the gaming device resets the designated number of picks each time a best selection is indicated in the game. In another embodiment, the gaming device stops indicating the best selection once the player exceeds the designated number of picks in the game.

In a further embodiment, the gaming device includes one or more additional prompts or indicators, which direct a player to the best pick. The additional prompts or indicators further direct the player to the best pick in a round or game. The additional prompts or indicators may be a prompt statement or phrase or any other suitable indicator or prompt as desired by the game implementor.

In another embodiment, the gaming device indicates and directs the player to the best pick or best selection in a round or game, which is not a selection including a wild symbol or wild characteristic. The gaming device continues to indicate or direct the player to the best selection or best pick in the round or game, which does not include a wild symbol or wild characteristic, until the unpicked selections only include wild symbols or wild characteristics or until there are no selections remaining in the round or game.

It should be appreciated that the indicators or prompts can be provided to or displayed to the player before the player picks a selection or after the player picks a non-optimal selection.

It is therefore an advantage of the present invention to provide a gaming device having a multi-characteristic matching primary game scheme.

It is a further advantage of the present invention to provide a gaming device having a multi-characteristic matching secondary game scheme.

It is another advantage of the present invention to provide a gaming device having a multi-characteristic matching game including a plurality of rounds.

It is a further advantage of the present invention to provide a gaming device having a multi-characteristic matching game including an indicator which directs the player to the best selection in a round or game.

It is another advantage of the present invention to provide a gaming device having a multi-characteristic matching game including two or more indicators which direct the player to the best pick or best selection in the round or game.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
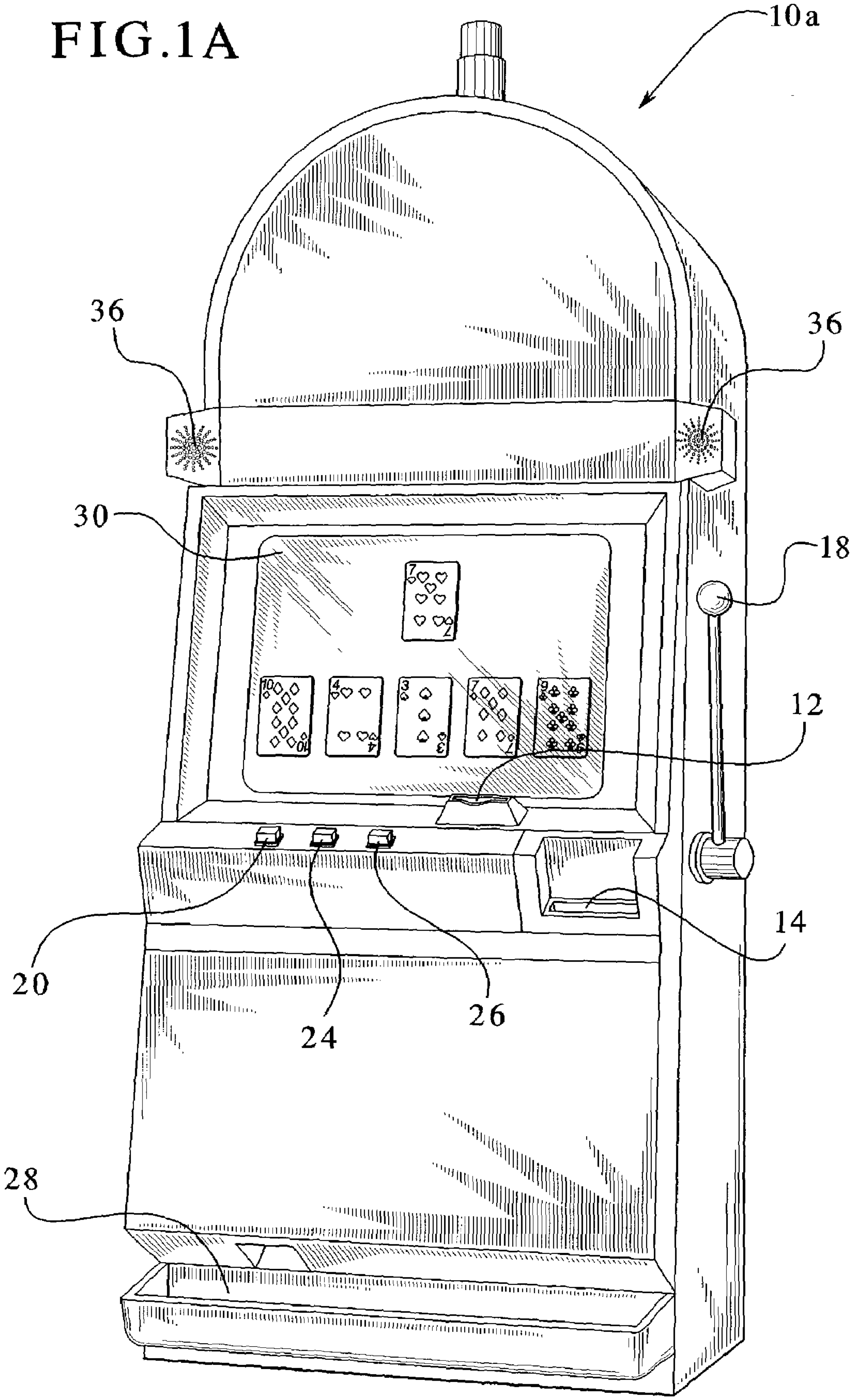
FIGS. 1A and 1B are perspective views of alternative embodiments of the gaming device of the present invention.
Figure 1B:
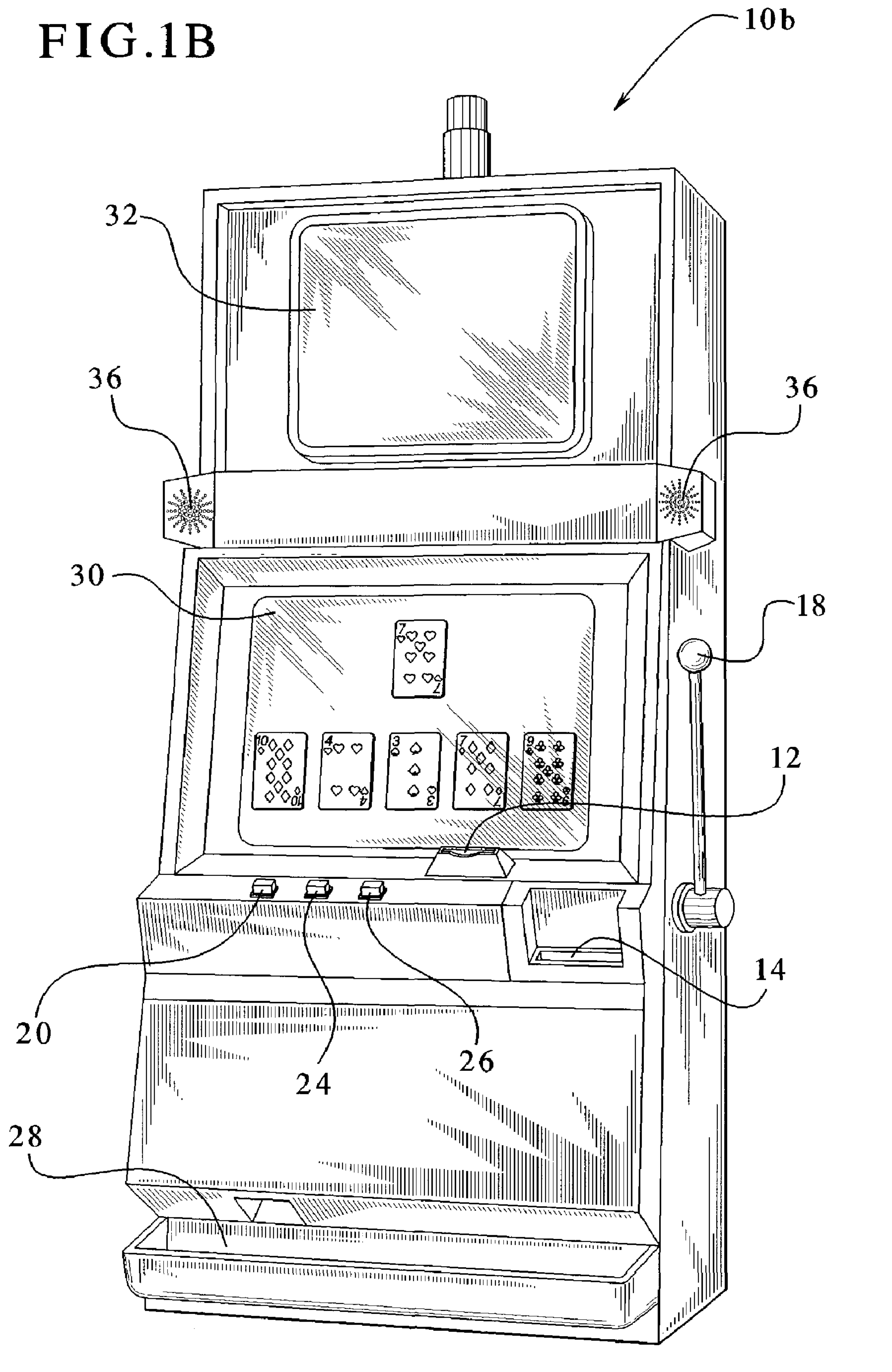

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 preferably has controls, displays and features of a conventional gaming machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Additionally, gaming device 10 can be implemented as a program code stored on a disk or other memory device which a player can use in a desktop or laptop personal computer or other computerized platform.

If the present invention is employed as a bonus game, the gaming device 10 can incorporate any primary game such as slot, poker, blackjack or keno, any of their bonus triggering events and any other bonus game in addition to the bonus game of the present invention. The symbols and indicia used on and in gaming device 10 may be in mechanical, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device 10.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

At any time before or after playing the game, a player may "cash out" and thereby receive a number of coins corresponding to the number of remaining credits by pushing a cash out button 26. When the player "cashes out," the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10*a* displays a plurality of reels 34, preferably three to five reels 34 in mechanical or video form. In this game, the present invention is employed in a bonus round at one or more of the display devices. Gaming device 10*b* displays a base card and a plurality of selections on the display device 32. In this game, the present invention is employed as a primary and/or secondary game. However, it should be appreciated that the display devices can display any visual representation or exhibition, including but not limited to movement of physical objects such as mechanical reels, cards, symbols, wheels, dynamic lighting and video images. A display device 32, 34 can be any viewing surface such as glass, a video monitor or screen, a liquid crystal display or any other display mechanism. If the reels, cards or other displayed images are in video form, the display device 32, 34 for the video reels, cards or other displayed images is preferably a video monitor.

The displays include a plurality of indicia such as bells, hearts, fruits, numbers, letters, bars or other images such as playing cards, which preferably correspond to a theme associated with the gaming device 10. Furthermore, the gaming device 10 preferably includes speakers 36 for making sounds or playing music.

Figure 2:
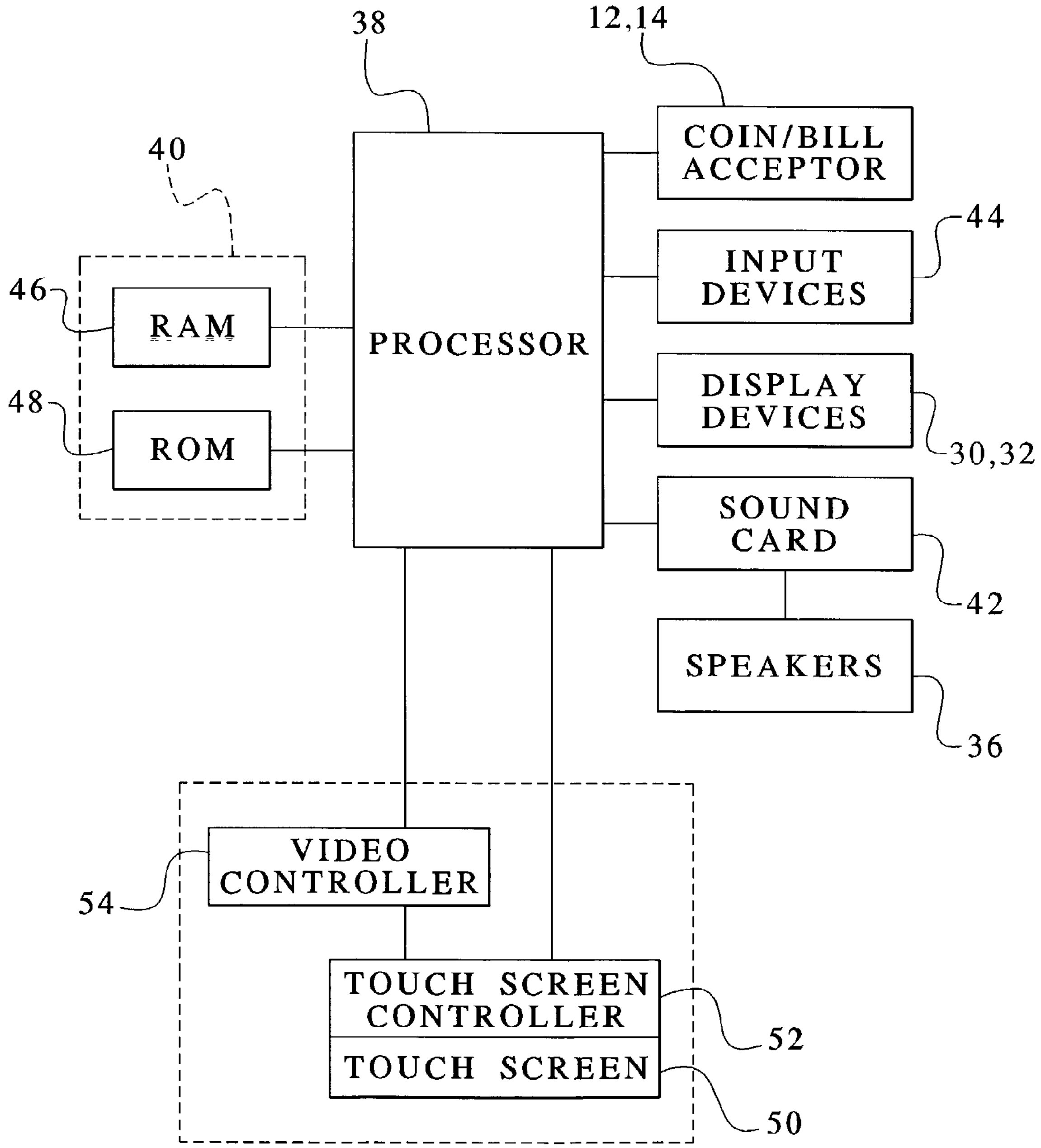
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 may include random access memory (RAM) 46 for storing event data or other data generated or used during a particular game. The memory device 40 may also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances, it is preferable to use a touch screen 50 and an associated touch screen controller 52 instead of a conventional video monitor display device.

The touch screen 50 and the touch screen controller 52 are connected to a video controller 54 and processor 38. A player can make decisions and input signals into the gaming device 10 by touching touch screen 50 at the appropriate places. As further illustrated in FIG. 2, the processor 38 may be connected to coin slot 12 or bill acceptor 14. The processor 38 may be programmed to require a player to deposit a certain amount of money in order to start the game.

It should be appreciated, that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communicating with a playing station over a local area network (LAN), wide area network (WAN), Internet connection, microwave link, and the like. The processor 38 and memory device 40 is generally referred to herein as the computer or controller.

With reference to FIGS. 1A, 1B and 2 and where the present invention is employed in a bonus round, to operate the gaming device 10 in one embodiment the player inserts the appropriate amount of money or tokens at coin slot 12 or bill acceptor 14 and then pulls the arm 18 or push the play button 20. If the game is a slot machine, the reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, preferably gaming device 10 also gives players the opportunity to win credits in a bonus round. This type of gaming device 10 will include a program which automatically begins a bonus round when the player has achieved a qualifying condition in the game. This qualifying condition can be a particular arrangement of indicia on the display device. The gaming device 10 preferably uses a video-based central display device 30 to enable the player to play the bonus round. Preferably, the qualifying condition is a predetermined combination of indicia appearing on a plurality of reels 34. As illustrated in the five reel slot game shown in FIG. 1A, the qualifying condition could be the number seven appearing on three adjacent reels 34 along a payline 56. It should be appreciated that the present invention can include one or more paylines displayed in a horizontal and/or diagonal fashion.

The present invention can also be employed as a primary game in a gaming machine as shown in FIG. 1B. In this embodiment, a pre-set or predetermined number of matches would be required for a win. For instance, five matches could be required for a minimum win. The number of matches greater than the minimum number could increase the amount or value of the win. A number of matches such as 7 matches may also trigger a bonus game.

Gaming Scheme

Referring now to FIGS. 3, 4A, 4B, 4C, 4D, 4E and 5, one embodiment of a multi-characteristic matching game of the present invention is illustrated. The gaming device 10 provides a base and a plurality of selections. The base and each of the selections have two characteristics and can have multi-part characteristics as described below. However, it should be appreciated that the base and selections could have more than two characteristics and can have multi-part characteristics as described below. A player picks, chooses or selects at least one selection that has at least one characteristic that matches at least one of the characteristics of the base. The gaming device 10 counts the matches and provides the player an award such as credits based on the number of matches or a value associated with the matches as further discussed below. The game continues as long as the player continues to specify selections which have at least one characteristic that matches one of the characteristics of the base. The game terminates if the player is unable to make such a selection.

The multi-characteristic matching game of the present invention may be employed as a primary game in a gaming machine or a bonus game associated with a gaming device having a primary game. For purposes of this application, the multi-characteristic match game of the present invention is primarily described as a bonus game. The gaming device 10 employing the present invention in a bonus game initiates the bonus round when the player achieves a qualifying condition as discussed above.

Additionally, the gaming device 10 may include two versions of the multi-characteristic matching game including, both a primary game and a bonus round. The primary game could include one version of the multi-characteristic matching game that is more difficult to win (i.e., difficult to achieve a large number of matches, limiting the chance of winning or advancing to the bonus round). The bonus round could include another version of the multi-characteristic matching game that is easier to win in comparison to the primary game and that could include a much larger award or jackpot. It should also be appreciated that the gaming device 10 could also provide a plurality of multi-characteristic matching games sequentially played to obtain a large jackpot.

Figure 3:
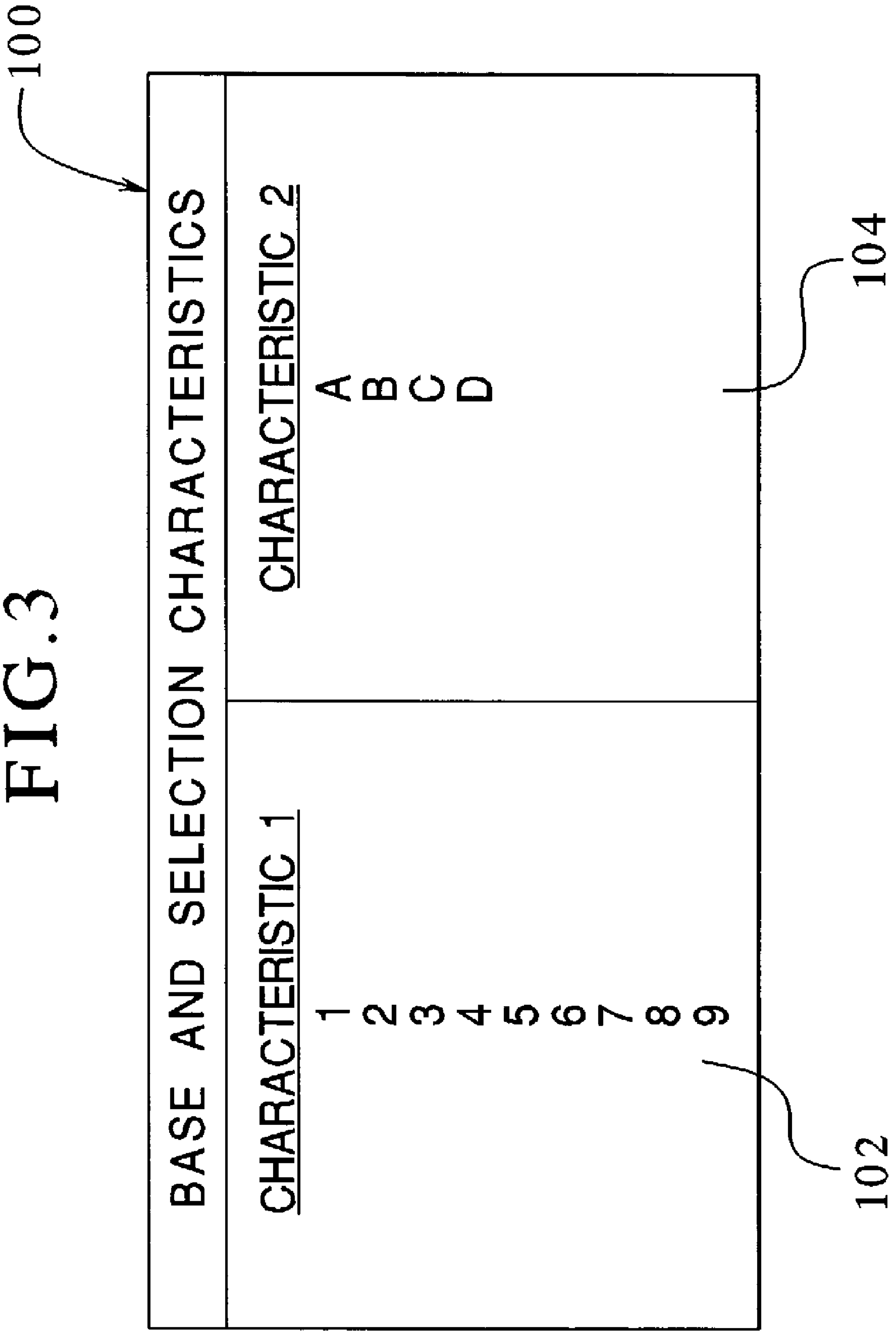
FIG. 3 is a table illustrating two characteristics used in one embodiment of the multi-characteristic matching game of the present invention.

Preferably, the multi-characteristic matching game includes a plurality of characteristics associated with the base and each selection. Table 100 in FIG. 3 illustrates one embodiment of the matching game having two sets of characteristics assigned to the base and the selections. It should be appreciated that while only two sets of characteristics are illustrated, two or more sets are contemplated.

Table 100 illustrates a set of numbers consisting of numbers 1 through 9 (referred to as Characteristic 1 and generally designated 102) and a set of letters consisting of letters A through D (referred to as Characteristic 2 and generally designated 104). In this embodiment, the gaming device 10 provides 36 possible combinations of Characteristics 1 and 2. It should be appreciated that any suitable number of each characteristic may be employed in accordance with the present invention.

The gaming device 10 preferably assigns or associates one characteristic from each of the characteristic sets to the base and to each selection. It should be appreciated that more than one characteristic from each set could be assigned or associated with the base and the selections. In one embodiment of the gaming device 10, the controller randomly selects or assigns the characteristics to the base and the selections. In another embodiment of the present invention, the gaming device 10 could include an algorithm that assigns a weight factor to each characteristic, so that specific values of one characteristic set having higher weight factors have a greater chance of being selected by the gaming device. This may result in such specific characteristics having a greater chance of being associated with specific values of the other set or that such specific characteristics have a greater chance of being assigned to the base or selections. This weight factor may be consistent throughout the entire matching game or may change after each match. In a preferred embodiment of the present invention discussed herein, prior to beginning ordinary play of the game, the controller assigns or associates the characteristics to the base and the selections such that the base and the selections are all different (i.e., do not have all of the same characteristics.) In the embodiment utilizing 36 combinations, there would be one base and 35 selections which are all different.

While numbers and letters are illustrated as characteristics, any type of characteristics could be employed in connection with the present invention such as characters, pictures and images. The sets of characteristics may have some predetermined or logical relationship. For example, the sets could include values and suits associated with a deck of cards, months of the year and signs of the Zodiac, television programs and characters, sport teams and positions, cities and states, etc. Alternatively, the sets may not have any logical relationship. For example, one set could include colors and the other set could include numbers.

Referring now to one embodiment of the multi-characteristic matching game illustrated in FIGS. 4A through 4E, the gaming device provides a screen or display 106 (which is preferably a touch screen provided by display devices 30 or 32). The display enables the player to pick, choose or select at least one selection from a plurality of selections having at least one characteristic that matches at least one characteristic of the base.

In this illustrated embodiment, the display displays a base 108, a match display 110 and a plurality of selections 112, 114, 116, 118 and 120. It should be appreciated that while five selections are illustrated, any suitable number of selections are contemplated. Appropriate messages such as "SELECTIONS," "MAKE A SELECTION" or "SELECT A MATCH" are preferably provided to the player visually, or through suitable audio or audiovisual displays in conjunction with the plurality of selections.

The match display 110 tracks and displays the number of matches. In the illustrated embodiment, the award display is labeled "METER," tracking the total number of matches made during the matching game. Each time the player makes a match, the match display 110 increases by one increment. The meter may start at zero or one as desired by the implementor of the game. Preferably, the number of matches has some corresponding award value as discussed subsequently, although other award methods are contemplated also as further discussed below.

In the illustrated embodiment, the controller selects a base and five selections from the thirty-six possible selections. In an alternative embodiment, the gaming device could: (a) select at least one value from the plurality of values of Characteristic 1 (here the number 8), assign it to the base and display it as C1; (b) select two or more values from the plurality of values of Characteristic 1 (here the numbers 8, 1, 5, 7 and 3), assign one to each of the five selections 112, 114, 116, 118 and 120, respectively, and display them as C1; (c) select at least one value from the plurality of values of Characteristic 2 (here the letter D), assign it to the base and display it as C2; (d) select two or more values from the plurality of values of Characteristic 2 (here the letters A, B, C, A and D), assign one to each of the five selections 112, 114, 116, 118 and 120, respectively, and display them as C2 as indicated.

In an alternate embodiment, the gaming device could select a base and selection that already have all characteristics predetermined.

It should be appreciated that one, more or none of the selections may initially have a characteristic that matches the base characteristic. When the invention is employed as a primary game, there may be no matches.

Figure 4A:
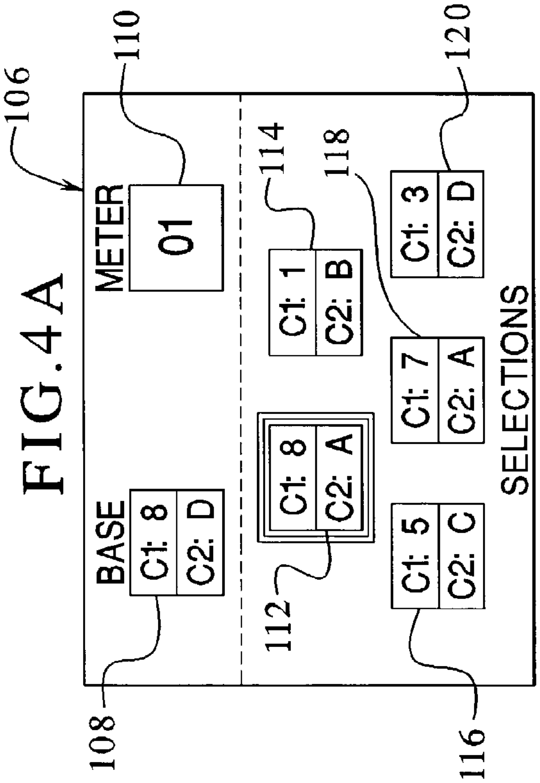
FIGS. 4A, 4B, 4C, 4D and 4E are front elevational views of a display of one embodiment of the multi-characteristic matching game of the present invention illustrating selections having at least one characteristic that matches a characteristic of a base from a plurality of selections.

During the first play of the matching game illustrated in FIG. 4A, the base displays C1=8 and C2=D. The player looks for a selection having a characteristic matching either characteristic of the base. In this illustrated embodiment, selection 112 has a characteristic C1=8 that matches C1 of the base. The player selects selection 112.

The gaming device preferably highlights selection 112 or otherwise indicates the selection. The gaming device also records this match in the match display 110, incrementing the number of matches by one, so that the match display reads "01." The matching game continues as illustrated in FIGS. 4B through 4E.

Figure 4B:
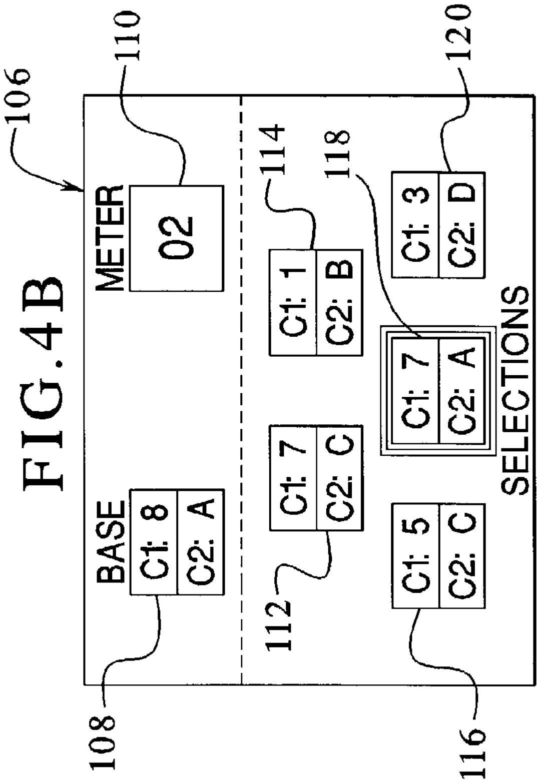

The gaming device provides a new base as illustrated in FIG. 4B. In the preferred embodiment, the gaming device replaces the base of the previous play with selection 112. Specifically, the gaming device replaces C1 and C2 of the base 108 with C1 and C2 of selection 112 from FIG. 4A. The gaming device displays base 108 having C1=8 and C2=A. It should be appreciated, however, that the gaming device could alternatively provide a new base in a different manner such as selecting a new C1 and C2 from Characteristics 1 and 2 similar to that described previously. The gaming device also generates a new selection 112 (illustrated in FIG. 4B) from the remaining combinations of 36 original combinations. In this example, the gaming device provides a selection 112 displaying C1=7 and C2=C as illustrated in FIG. 4B.

The player again picks one of the selections having a characteristic that matches one of the characteristics of the new base 108. The player picks selection 118 having C2=A that matches C2=A of the base as illustrated. Again, the gaming device highlights the selection and records the match in the match display 110, incrementing the METER by 1 so that it displays "02."

Figure 4C:
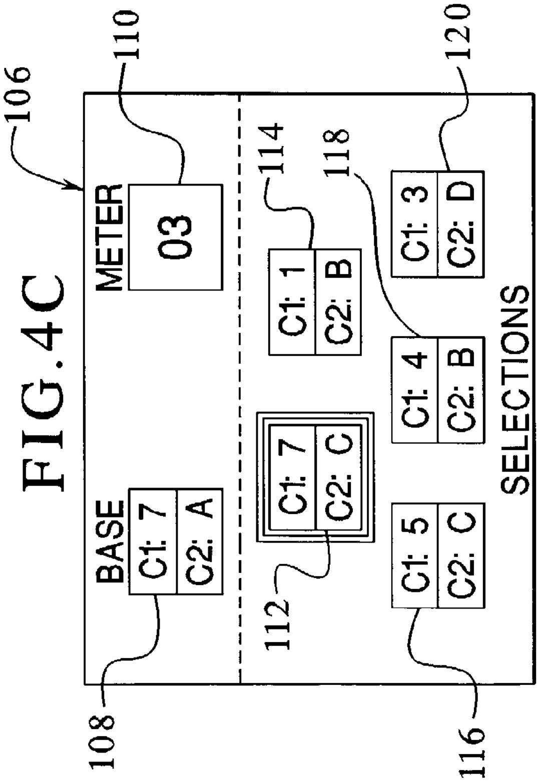
Figure 4D:
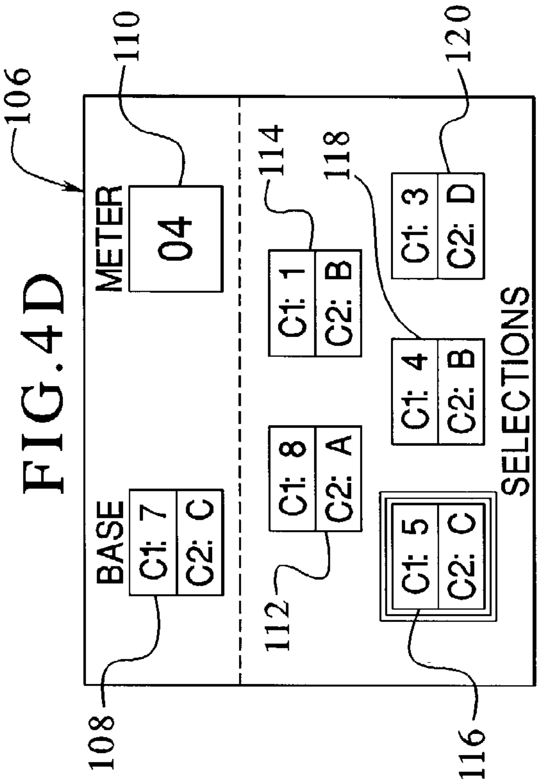
Figures 4E, 5:
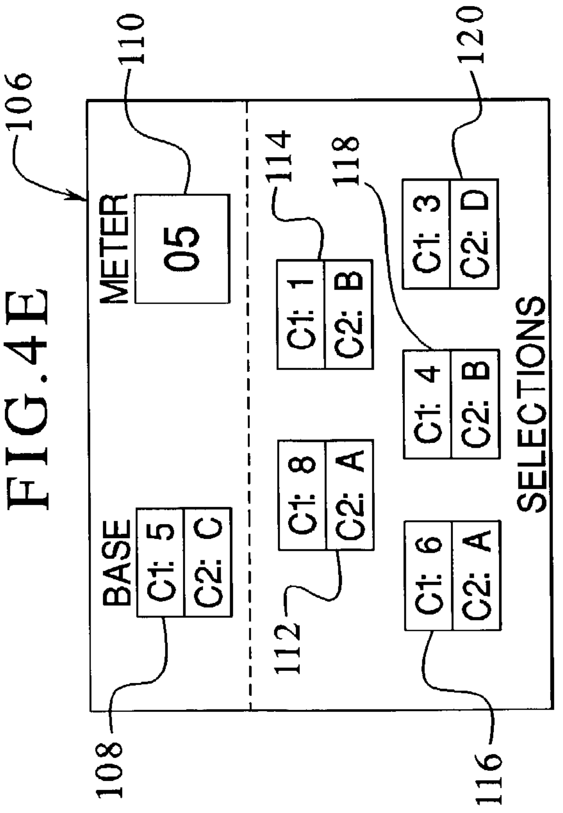
FIG. 5 is a pay table used in one embodiment of the matching game of the present invention illustrating the awards, credits or bonus values associated with the number of matches.

The matching game continues, alternatively providing new bases and selections as illustrated in FIGS. 4C through 4E until the matching game ends or is terminated. In this embodiment, the matching game terminates when the player is unable to select a characteristic that matches one of the characteristics of the base as illustrated in FIG. 4E. That is, there are no more possible matches.

The gaming device terminates the matching game and determines whether the game should provide the player with an award. Alternatively, the matching game could continue until the player has selected a predetermined number of matches. The gaming device could continue the matching game until the players has matched all combinations of C1 and C2, here 36 matches. Furthermore, the gaming device may provide accept and reject buttons enabling the player to terminate the matching game after each match. In this embodiment, the accept or reject decision might occur before the replacement selection is revealed. If the offer is rejected, and no characteristics of the selections match those of the base, the player will receive an award smaller than the previous offer.

Preferably, if the present invention is implemented as a bonus round, the gaming device provides the player with an award after terminating the matching game.

In one embodiment, the award is based on the number of matches as provided by the match display. Preferably, the greater the number of matches, the higher the award value as illustrated by pay table 122 in FIG. 5. It should be appreciated that the gaming device may provide different awards for a range of matches (i.e., 5 to 9 matches may have an associated award of 10 credits while 10 to 14 matches may have an associated award of 50 credits). Each individual match may have an associated award (i.e., one match is worth one credit, two matches is worth two credits, etc.). Additionally, the gaming device 10 may provide awards based on a combination of ranges and individual matches as illustrated in the pay table. In the embodiment illustrated in FIGS. 4A through 4E, the player has 5 matches and is awarded 10 credits in accordance with the pay table. Had the player made 10 matches, the gaming device would award the player 50 credits. It should be appreciated that the pay table 122 is provided as an example only.

While awarding credits based on the number of matches is preferred, other methods are contemplated for rewarding the player for playing the matching game. The award could be based on the value of the selections. For example, selecting a selection having C1=7 may result in the player receiving an award of 7, while a selection having C1=3 may result in the player receiving an award of 3. These awards would be added and displayed to the player in a value display as described below.

Alternatively, each characteristic could have a predetermined value, where each selection would result in the player receiving a predetermined award (10 credits for example). The gaming device may assign the characteristics different predetermined values, wherein matching one set of characteristics results in one predetermined amount (10 credits for example) while matching another characteristic may result in another predetermined amount (5 credits for example). The gaming device 10 could also randomly assign an award to the player or according to some algorithm. The number of matches may lead to a certain level of play at a next level such as a number of picks given for prizes.

In another embodiment, the gaming device 10 may award the player based on the last match. That is, the player may not receive an award until the last selection, at which time the gaming device 10 awards the value of the last selection to the player. For example, if the last remaining unmatched base has a characteristic of 7, the gaming device 10 could provide that player with an award of 7. It should be appreciated that this award may include a predetermined amount associated with the last selection or some other value associated with the last selection.

The gaming device 10 could also provide credits based on the number of matches and some value modified or altered by a modifying factor. For example, the matching game may include a multiplier such as 2×, 3×, 8×, etc., wherein the gaming device 10 provides an award equal to two, three or eight times the number of matches or predetermined value. The modifying factor could include factors other than a multiplier. For example, embodiments of the matching game are contemplated wherein the game tracks both the value for each match and the number of matches. The award could be based on some combination of these two, whether multiplied together, added together or subtracted one from the other (i.e., value of picked selection plus number of matches or times number of matches).

The gaming device 10 could provide an award wherein the value or number of selections not matched are used to modify the award. For example, the gaming device 10 could track those selections that are not matched by the player during the game. The gaming device 10 could track the number of the selections, the value of the selections, a predetermined value of the selections, etc. This number could then be used to modify the award. In this embodiment, the number would be used to reduce the award.

The gaming device 10 could also award the player based on some other factor. For example, the gaming device 10 might associate credits with specific selections. The gaming device 10 would award the player an extra or bonus value if certain selections are matched. Alternatively, the gaming device 10 may provide an extra or bonus value if the player is able to match all the selections or all possible combinations of the characteristics.

A further alternative embodiment of the multi-characteristic matching game of the present invention is illustrated in FIGS. 6A, 6B, 6C, 6D, 6E, 6F and 6G. The gaming device 10 provides a display 206 having a base 208, a match display 210 and a plurality of selections 212, 214, 216, 218, 220 and 221. It should be appreciated that six selections increases the player's chance of making a match assuming the number in the sets of characteristics remains the same.

Figures 6A, 6B, 6C, 6D:
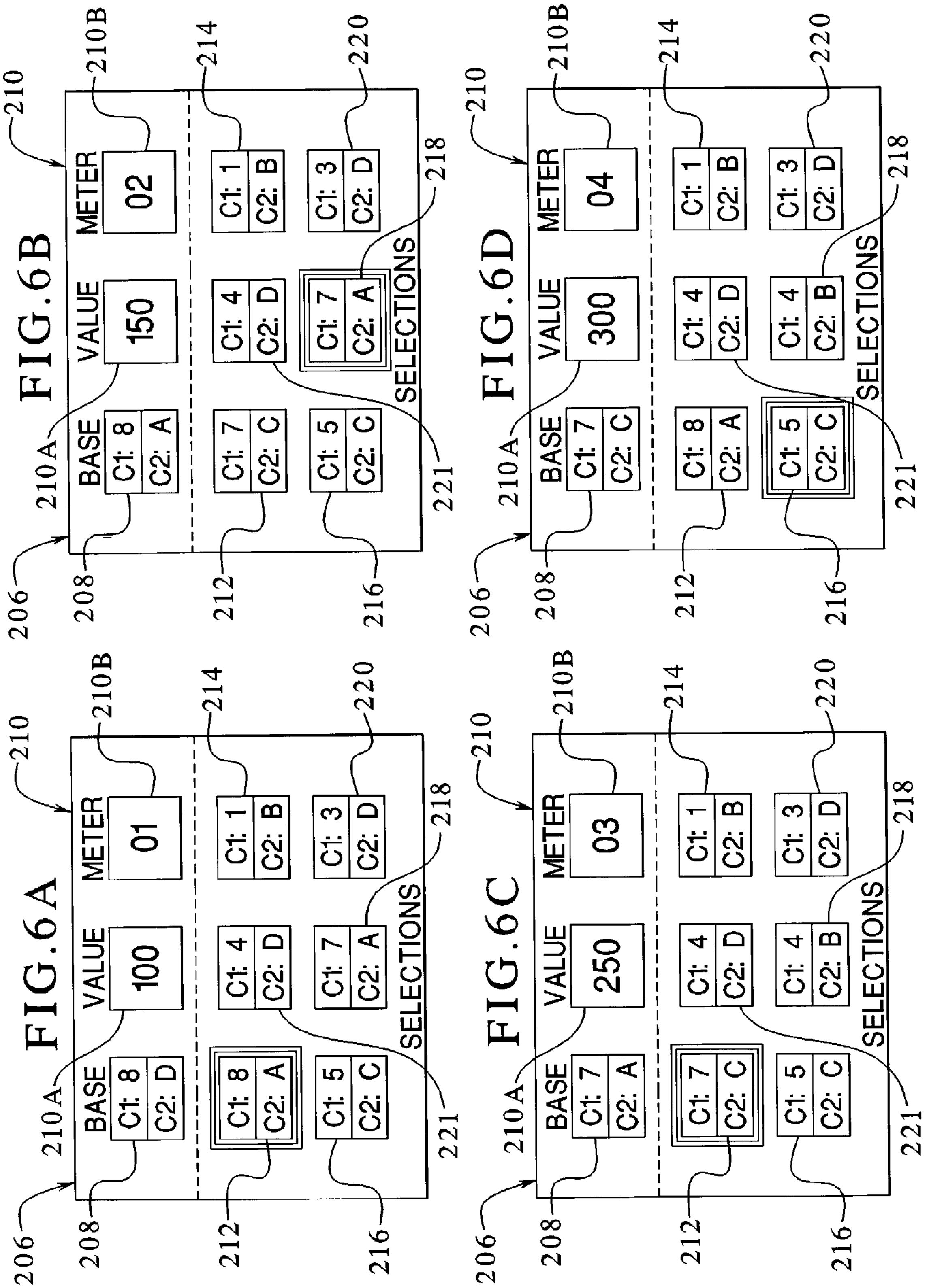
FIGS. 6A, 6B, 6C, 6D, 6E, 6F and 6G are front elevational views of a display of an alternative embodiment of the multi-characteristic matching game of the present invention illustrating a base having two characteristics and choosing selections having at least one characteristic that matches a characteristic of the base from the plurality of selections.
Figure 6F:
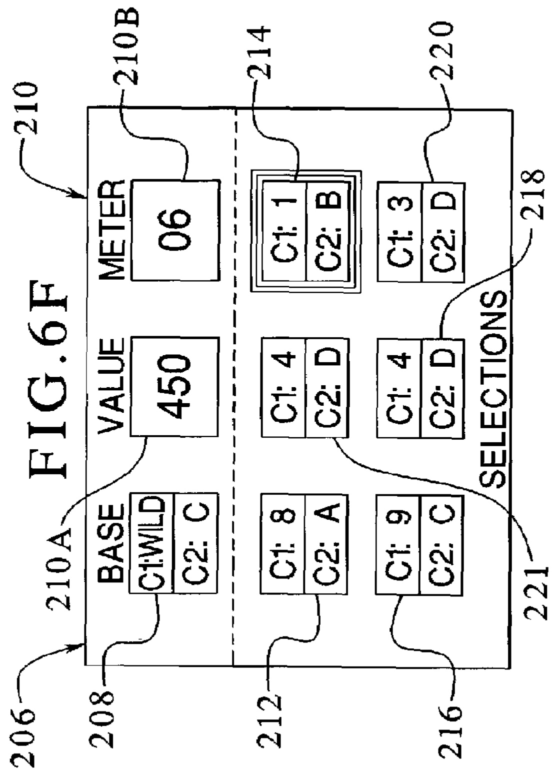
Figure 6E:
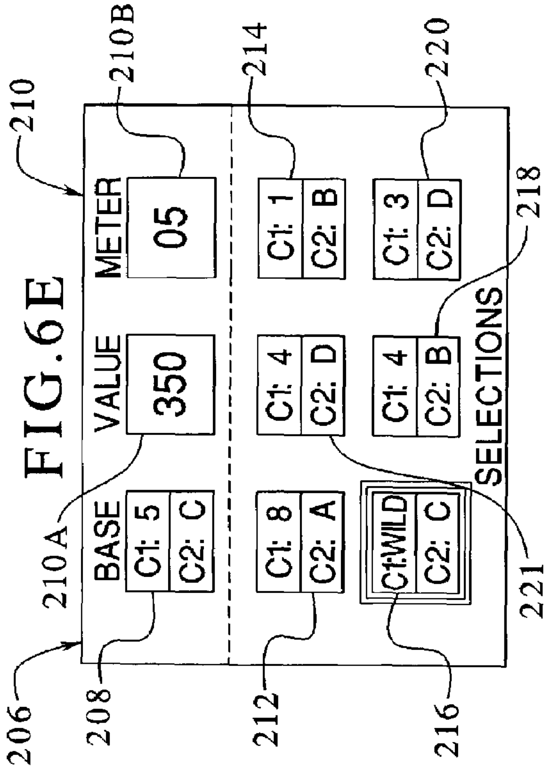
Figure 6G:
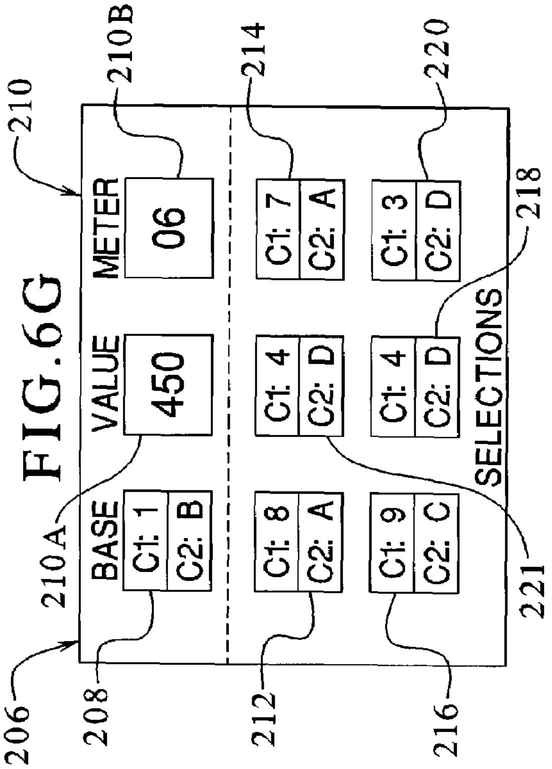

In this embodiment, the award display includes a value display 210A labeled "VALUE" and a match display 210B labeled "METER." The value display 210A tracks the awards for the matches made during the matching game. Preferably, the matches have some predetermined award value that is consistent throughout the matching game. For example, each match may be worth 100 credits. It should also be appreciated that different matches may have different awards. For example, matching the characteristics C1 may be worth 100 points as illustrated in FIGS. 6A, 6C and 6F. However, matching characteristics C2 may only be worth 50 points, as illustrated in FIGS. 6B, 6D and 6E. The match display 210B tracks the matches as described above.

The gaming device 10 assigns characteristics C1 and C2 to the base and the selections as described previously. During the first play of this example bonus game illustrated in FIG. 6A, the base displays C1=8 and C2=D. The player selects selection 212 having a characteristic C1=8 that matches the C1 of the base.

The gaming device 10 records this match or selection in the award display 210, recording a predetermined award of 100 in value display 210A and incrementing the number of matches by one, so that match display 210B is "01." The multi-characteristic matching game continues as illustrated in FIGS. 6B through 6G.

The gaming device 10 provides a new base and generates a new selection 212 as illustrated in FIG. 6B. The player again selects one of the selections having a characteristic that matches one of the characteristics of the new base. The player picks selection 218 having C2=A that matches C2=A of the base as illustrated. The gaming device 10 highlights the selection, and records the award in the award display 210, incrementing the value display 210A by 50 so that it displays 150 and the match display 210B by 1 so that it displays "02."

The matching game continues, alternatively providing new bases and selections as illustrated. In this embodiment, the matching game includes a wild characteristic (labeled "WILD") that may match any other characteristic as illustrated in FIGS. 6E and 6F. It should be appreciated that the wild characteristic could be assigned to C1, C2 or both C1 and C2 of any base or selection. In one embodiment, the player must match a selection before the wild characteristic may be utilized. Alternatively, the wild characteristic may be utilized at any time. In FIG. 6E, the matching game provides selection 216 having C1=WILD and C2=C. In this embodiment, the player must match selection 216 before the wild characteristic may be utilized as illustrated in FIGS. 6E and 6F.

It should be appreciated that the wild characteristics could have a multiplier or other factor associated with it. That is, using the wild characteristic could result in values or matches being increased. For example, the wild characteristic could include a 2×multiplier, so that the award or number of matches is doubled. Alternatively, this multiplier or another suitable modifier could be employed at any time by the multi-characteristics matching game.

Figure 7B:
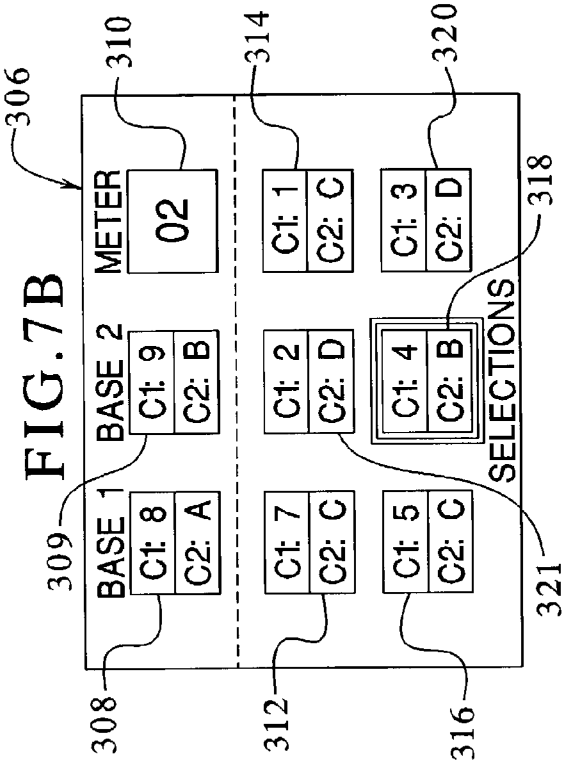
FIGS. 7A, 7B and 7C are front elevational views of a display of another alternative embodiment of the multi-characteristic matching game of the present invention illustrating two bases and choosing selections having at least one characteristic that matches a characteristic of one of the base from the plurality of selections.
Figure 7A:
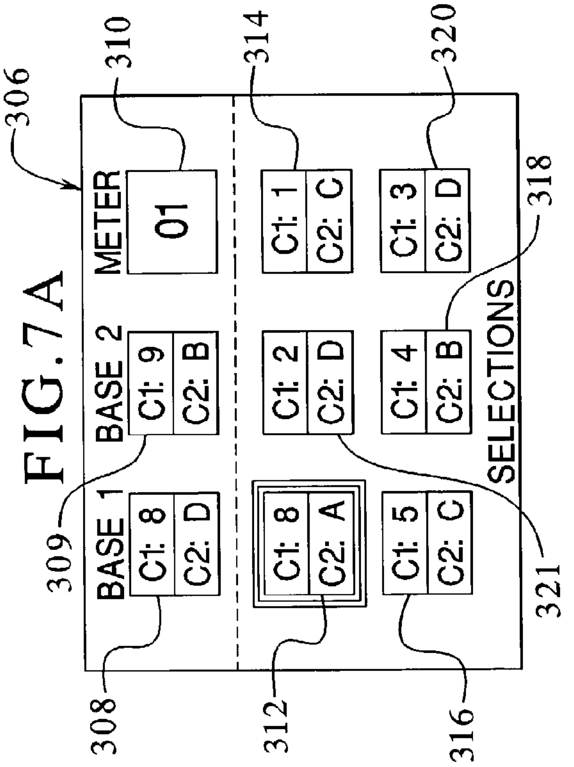
Figure 7C:
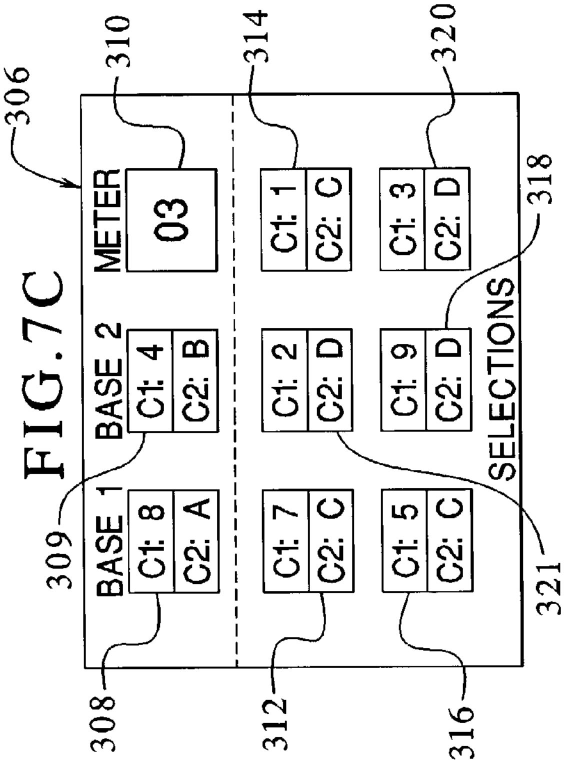

Referring now to the alternative embodiment of the matching game illustrated in FIGS. 7A, 7B and 7C, the gaming device 10 provides a screen or display 306. In this embodiment, the display provides multiple or two bases 308 and 309 that each have two characteristics, the match display 310 and a plurality of selections 312, 314, 316, 318, 320 and 321. It should be appreciated that while two bases and selection are illustrated, any number of bases are contemplated. It should also be appreciated that one of the bases could include one, two or more characteristics.

The gaming device 10 selects one combination of characteristics for each base. In this example, base 308 includes the number 8 as C1 and D as C2 while base 309 includes number 9 as C1 and B as C2. In this embodiment, the object of the multi-characteristic matching game is to match one characteristic C1 or C2 of one selection to one characteristic C1 or C2 of either base, or both. It should be appreciated that the player may receive additional credits or points, or a multiplier if the player is able to match a characteristic of a selection to a characteristic of both bases.

Providing two bases enhances the player's chances of making a match assuming the same number of 36 combinations. During the first play of the game, the player is able to match C1 of selection 312 to C1 of base 308 as illustrated in FIG. 7A. However, during the next play, the player is not able to match any of the characteristics of base 308. However, the player is able to match C2 of selection 318 to C2 of base 309 as illustrated in FIG. 7B. The matching game continues until the player is unable to match any of the characteristics as illustrated in FIG. 7C. It should be appreciated that the award could be modified because two bases are used. That is, the gaming device 10 may only provide an award for the base having the most matches or based on the last base matched. Furthermore, the gaming device 10 could reduce the award by the number of selections that remain unmatched. The other alternative award embodiment, may also be employed with this multiple base embodiment.

Figure 8B:
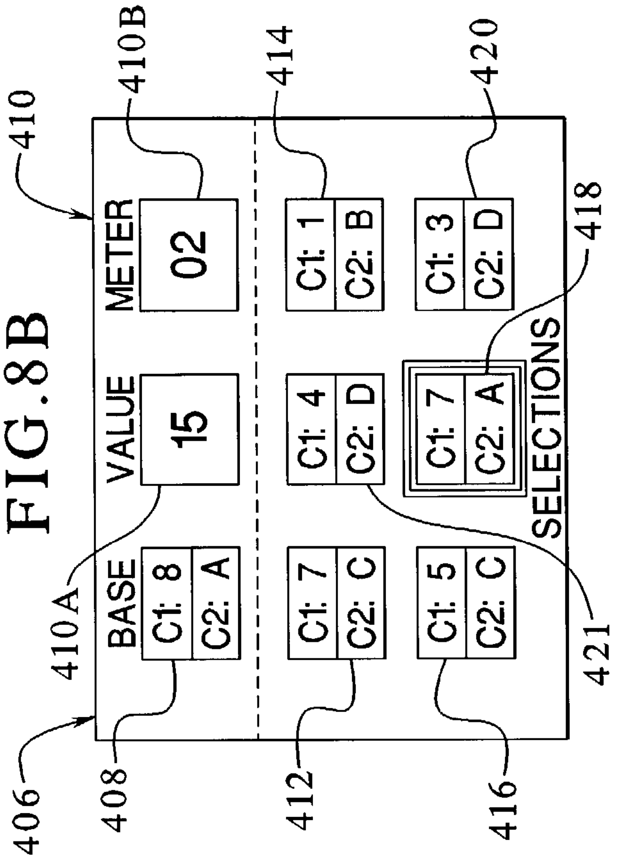
FIGS. 8A and 8B are front elevational views of a display of yet another alternative embodiment of the multi-characteristic matching game of the present invention illustrating a base having two characteristics and choosing selections from the plurality of selections having at least one characteristic that matches a characteristic of the base from the plurality of selections.
Figure 8A:
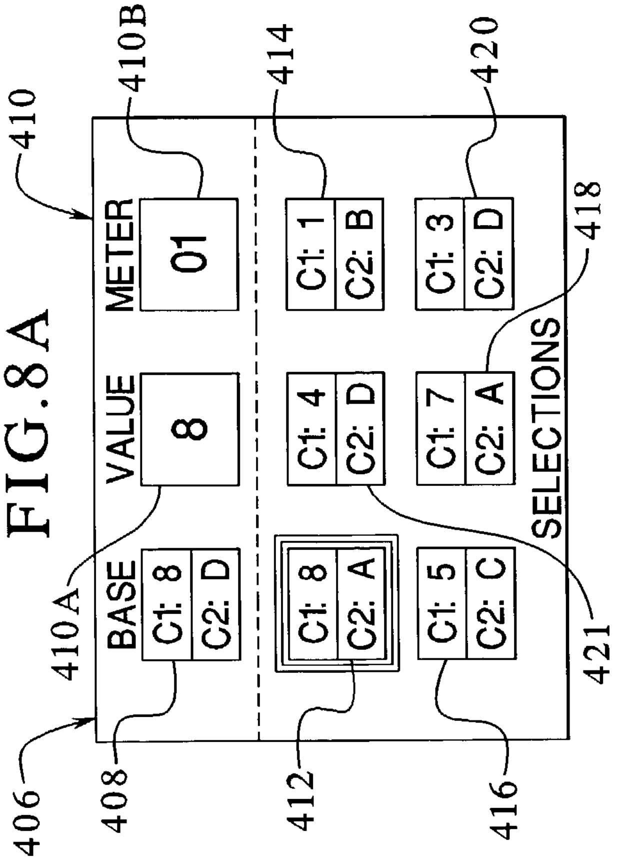

Referring now to the embodiment of the multi-characteristic matching game illustrated in FIGS. 8A and 8B, the gaming device 10 provides a screen or display 406. The display provides at least one base 408, award display 410 including value display 410A and match display 410B, and a plurality of selections 412, 414, 416, 418, 420 and 421 similar to that discussed above in FIGS. 6A through 6F. It should be appreciated that here the game does not award predetermined values. Rather, the game provides an award equal to the value of each selection. For example, in FIG. 8A the player selects selection 412. The gaming device awards the player a value of 8 equal to C1 of selection 418 which is illustrated in the value display 410A. The player then selects section 418 of FIG. 8B. The gaming device awards the player a value of 7 which is added to the value display 410A as illustrated in FIG. 8B.

Figure 9A:
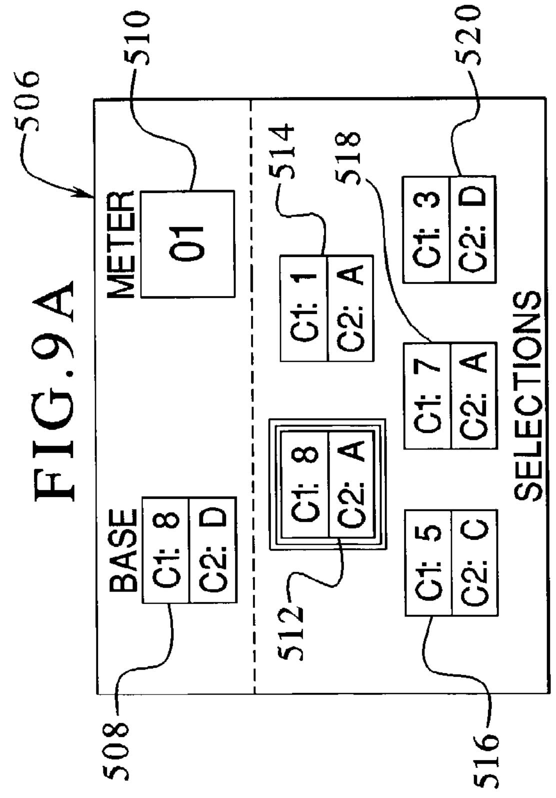
FIGS. 9A, 9B and 9C are front elevational views of a display of yet another alternative embodiment of the multi-characteristic matching game of the present invention illustrating a base having two characteristics and choosing selections having at least one characteristic that matches a characteristic of the base from a decreasing number of selections.
Figure 9B:
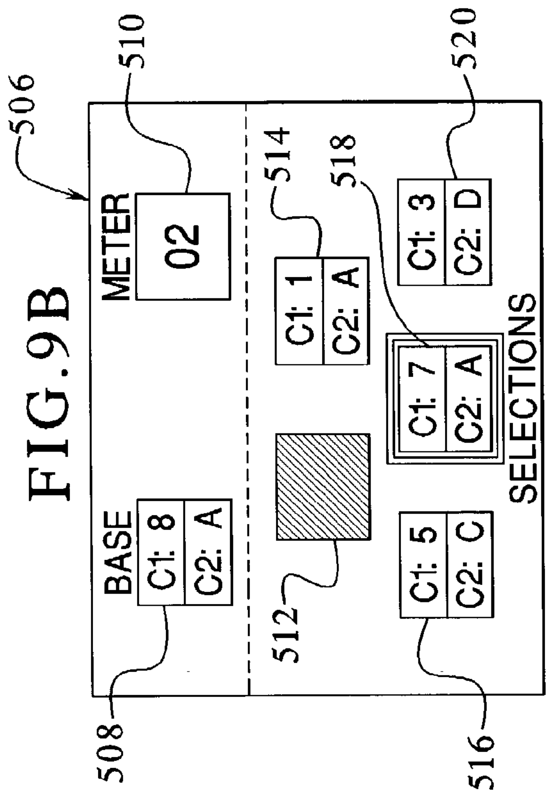
Figure 9C:
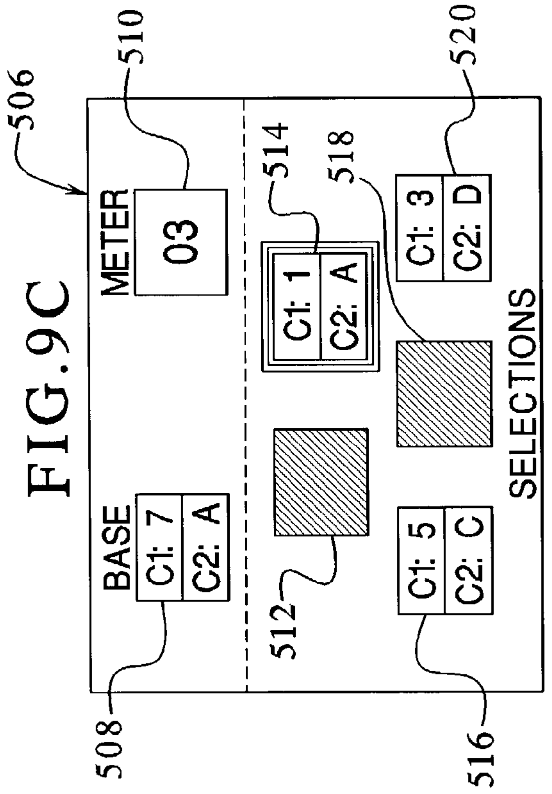

Referring now to the alternative embodiment of the multi-characteristic matching game illustrated in FIGS. 9A, 9B and 9C, the gaming device 10 provides a display 506. In the illustrated embodiment, the display provides at least one base 508, a match display 510 and a plurality of selections 512, 514, 516, 518 and 520.

During the first play of the bonus game illustrated in FIG. 9A, the base displays C1=8 and C2=D. The player looks for a match. In this illustrated embodiment, selection 512 has a characteristic C1=8 that matches C1 of the base. The player picks selection 512. The gaming device 10 highlights selection 512. The gaming device 10 also records this match in the award display, incrementing the number of matches by one, so that the award display reads "01."

The gaming device 10 provides a new or subsequent base as illustrated in FIG. 9B. In this embodiment, the gaming device 10 does not generate a new selection 512. Rather, the game may mask or remove each selection once it is selected, as illustrated in FIGS. 9B and 9C. If the game masks the selection, the player does not know whether a match will occur if the player chooses that selection (i.e., because it is masked.) If the game removes the selection, this reduces player's chance of making a match during each subsequent play of the game.

Figure 10:
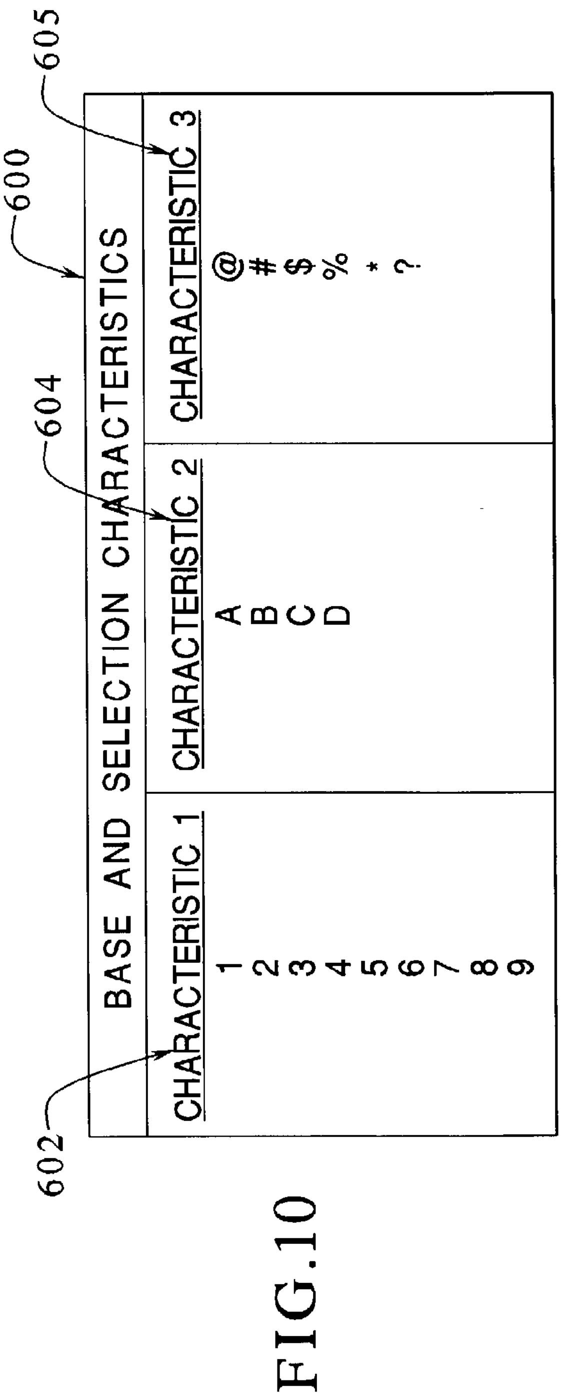
FIG. 10 is a table illustrating three characteristics used in an alternative embodiment of the multi-characteristic matching game of the present invention.

Referring now to FIG. 10, table 600 illustrates three sets of characteristics similar to the two characteristics provided by table 100 of FIG. 3. The characteristic sets include: (a) the number set consisting of numbers 1 through 9 (Characteristic 1 generally designated 602); (b) the letter set consisting of letters A through D (Characteristic 2 generally designated 604); and (c) the symbol set consisting of symbols @, #, $, %, + and ? (Characteristic 3 generally designated 605). In this embodiment, the gaming device can form 216 possible combinations of the Characteristics 1, 2 and 3.

Figure 11:
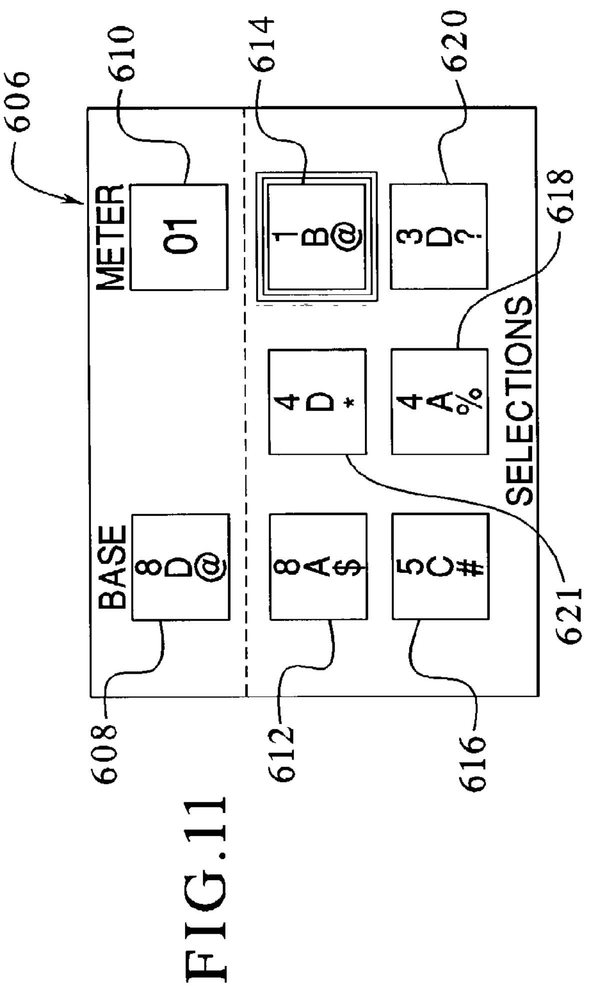
FIG. 11 is a front elevational view of a display of one embodiment of the multi-characteristic matching game of FIG. 10 illustrating a base having three characteristics and choosing a selection from a plurality of selections, wherein the selection has at least one characteristic that matches a characteristic of the base.

A game using three characteristics is generally illustrated in FIG. 11. The gaming device 10 provides at least one value from each of the characteristic sets to the base and to each of the selections as discussed previously. The gaming device 10 provides a display 606. In the illustrated embodiment, the display provides base 608, match display 610 and a plurality of selections 612, 614, 616, 618, 620 and 621, each of which have three characteristics.

During the first play of the bonus game illustrated in FIG. 11, the base displays C1=8, C2=D and C3=@. The player looks for a selection displaying a matching characteristic C1, C2 or C3. In this illustrated embodiment, selection 614 has a characteristic C3=@ that matches C3 of the base. The player selects selection 614. The matching game continues, providing new bases and selections until the matching game ends or is terminated.

Both the base and the selections may have three or more characteristics. However, in a further alternative embodiment, the base may at any one time, have or display one or two out of the three possible characteristics of the base game. The controller can choose which characteristics to display for the base. In this embodiment, the selections may display all three possible characteristics. After a selection is matched to a base, a characteristic can be removed from the selection when it replaces the base.

Conversely, in another embodiment of the present invention, the base can display all three characteristics while the selections display only two out of the possible three characteristics of the selections. After a selection is matched to the base, a characteristic can be added to that selection for subsequent matches.

Alternative embodiments can include four or more sets of characteristics. As in the embodiments mentioned above, the controller can choose the number of characteristics to display for the base and selections. In addition, the controller can choose which sets of characteristics to display.

Figure 12:
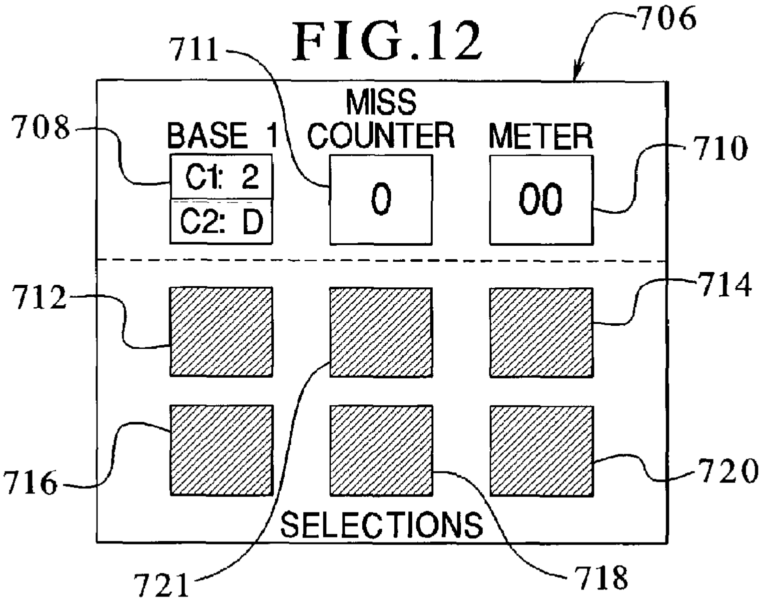
FIG. 12 is a front elevational view of a display of one embodiment of the multi-characteristic matching game illustrating a base and a plurality of masked selections.

Referring now to FIG. 12, an alternative embodiment of the multi-characteristic game of the present invention includes a display 706 having a base 708, a match meter 710 and a plurality of selections 712, 714, 716, 718, 720 and 721. In this embodiment, all of the selections are masked so that the player does not know if the selection the player picks will have a characteristic matching the base. In this embodiment, any number of selections may be masked or revealed to the player as desired by the implementor of the game. In this embodiment, preferably, a miss counter 711 is employed to allow the player a certain number of misses or selections which do not match the base. The player selects the selections and obtains a match if one of the characteristics of the player's selection matches one of the characteristics of the base. If one of the characteristics of the picked selection does not match any characteristic of the base, then a miss is added to the miss counter 711. The game includes a predetermined miss limit. The game ends if the number of misses the player obtains equals or exceeds the miss limit. The player's award, if any, is based on the number of matches obtained before reaching the miss limit.

In an alternative embodiment of the method of FIG. 12, the selections revealed that do not match the characteristics of the base and add a miss to the miss counter remain revealed and are eligible to be used later in the game. Once the base changes, it is possible that the new characteristics of the new base match one or more of the characteristics of the miss selection. The miss selection may be used to match the base and add to the match meter.

Figure 13A:
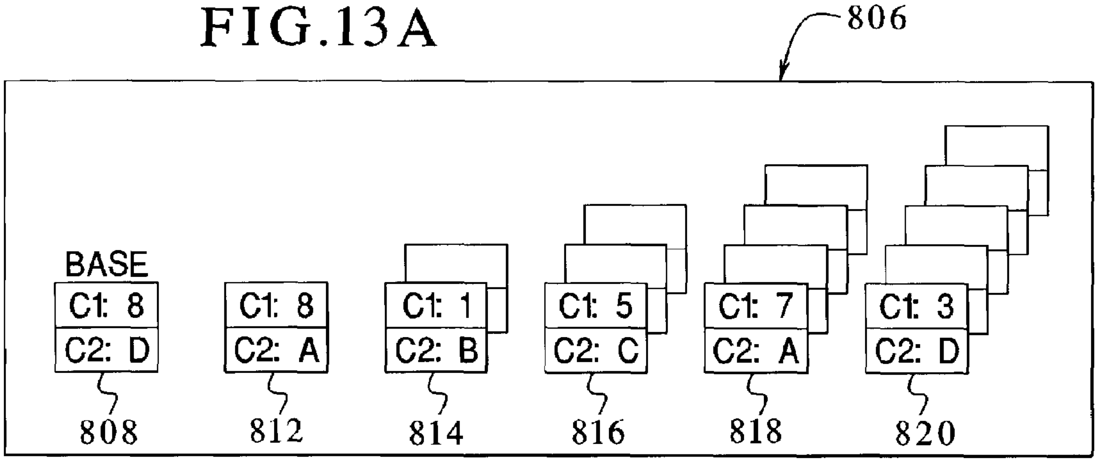
FIG. 13A is a front elevational view of a display of one embodiment of the multi-characteristic matching game illustrating a base and a plurality of sets of selections wherein one of the selections in each set is revealed and the other selections in each set are masked.
Figure 13B:
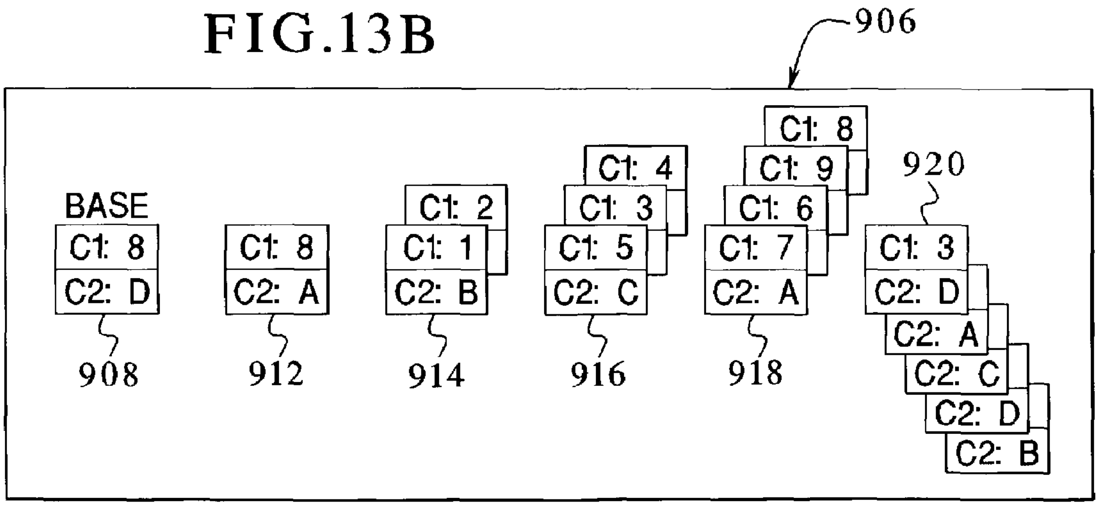
FIG. 13B is a front elevational view of a display of one embodiment of the multi-characteristic matching game illustrating a base and a plurality of sets of selections wherein one of the selections in each set is not revealed and the rest of the selections in each set are partially revealed and partially masked.
Figure 13C:
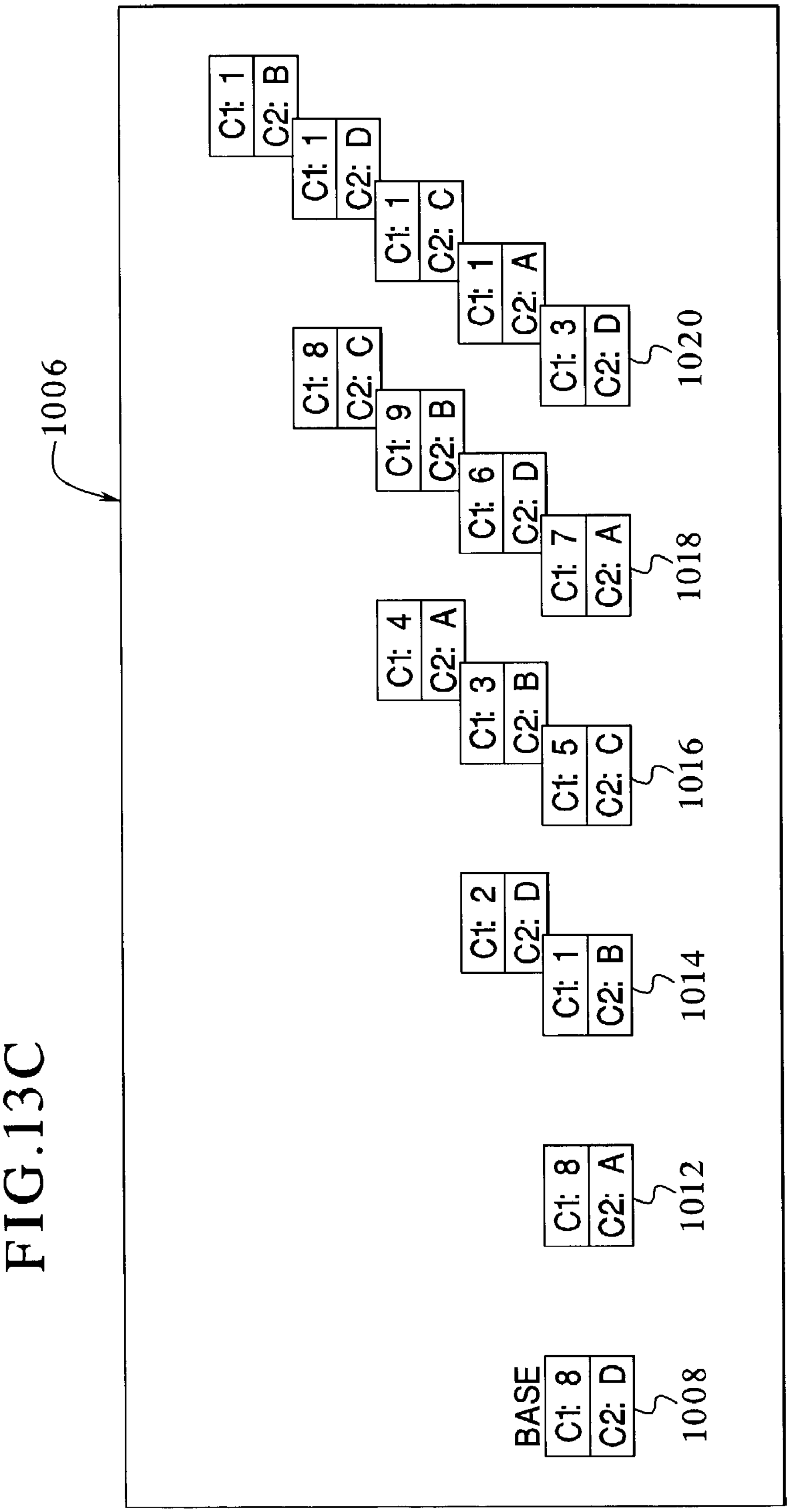
FIG. 13C is a front elevational view of a display of one embodiment of the multi-characteristic matching game illustrating a base and a plurality of sets of selections wherein each selection in each set is revealed to the player.

Referring now to FIGS. 13A, 13B and 13C, further alternative embodiments of the present invention provide display devices 806, 906 and 1006, respectively. Each display device has a base 808, 908 and 1008, respectively. Each display also includes a plurality of sets of selections 812, 814, 816, 818 and 820, 912, 914, 916, 918 and 920, and 1012, 1014, 1016, 1018 and 1020.

In the display 806, the characteristics of only one selection in each set of selection is revealed to the player. The other selections in each set are masked from the player. When one of the selections in one of the sets has been selected, the next selection in that set is revealed to the player. Alternatively, the next selection in the set is not revealed to the player.

In the display 906, the characteristics of one selection in each set are revealed to the player, in addition to the characteristics of each of the other selections in each set. This provides the player with additional information for each new set which the player can use to make the selections.

In the display 1006, each selection in each set is fully revealed to the player which allows the player to select a strategy for maximizing the number of matches. It should be appreciated that the number of selections in any set may vary. It should also be appreciated that combinations of the revealed or masked selections in display 806, 906 and 1006 may be mixed. In particular, certain selections in a set may be revealed, masked, partially revealed or fully revealed.

In further alternative embodiments of the present invention, the amount wagered affects the play of the gaming device. In one embodiment, the credits wagered determine the number of selections provided to a player. For example, a user wagering one credit may receive one selection at the start of play, and a user wagering three coins may receive three selections at the start of play. It should be appreciated that the number of selections provided at the start of game play is not necessarily based on a one-to-one ratio. In another embodiment, the number of bases varies based on the player's wager. It should be appreciated that there is preferably a maximum wager for each game and an associated maximum number of selections or bases.

In another embodiment, the number of selections provided to a user may change during the course of game play based on the credits wagered during the course of play. For example, a user may begin a game with three selections. Upon choosing one or more selections, the user may be left with fewer selections than which the user started with. A user may then bet additional credits during the course of play to receive additional selections. In the example given, if the user has only two selections remaining to choose from, the user may bet an additional credit and receive one or more additional selections or bases.

In a further embodiment of the present invention where the selections are masked or partially masked, the amount wagered at the beginning of game determines the player's number of misses or miss limit. For example, wagering one credit may allow the user only one miss. However, if a user wagers three credits, the user may be entitled to three misses. Again, the number of misses allowed to a user based on the amount wagered may not necessarily be a one-to-one ratio. Similarly, the amount of misses may change based on the number of credits wagered during game play. For example, a user who has three misses and is allowed five misses may bet an additional credit and have the miss limit extended to seven misses.

In a further embodiment of the present invention, the number of credits wagered may determine the number of possible characteristics allocated to a base or a selection. For example, a user wagering one credit may receive a base and selections having only two characteristics. However, a user wagering five credits may receive a base and selections having five characteristics. Again, in an alternative embodiment, the number of characteristics could be changed during game play. For example, wagering an additional credit during game play may provide a user with an additional characteristic.

Further, in another embodiment of the present invention, the amount wagered may determine the probability of matching a base and selections. For example, wagering only one credit may provide a user with less of a probability of matching selections to a base than wagering three credits. The controller can decide how to increase the probability, i.e., increasing the number of selections, characteristics, etc. The probability of matching a selection to abuse can also be changed during game play or desired by the implementor of the game.

In another alternative embodiment, an algorithm could be implemented wherein the determination of the characteristic of the selections are based upon the characteristics of the base and/or previously revealed selections. For example, a set may determine the second characteristic for the base with equal probability. That is, twenty-five percent probability for each of the characteristics A, B, C and D. If characteristic A is assigned, the game may make it more likely that characteristic A is assigned to the selections. One example would be a forty percent probability of selecting A and a twenty percent probability of selecting each of the remaining characteristics B, C and D. The game could alternatively perform the opposite and make it less likely to assign the matching characteristic to the selections.

Figure 14:
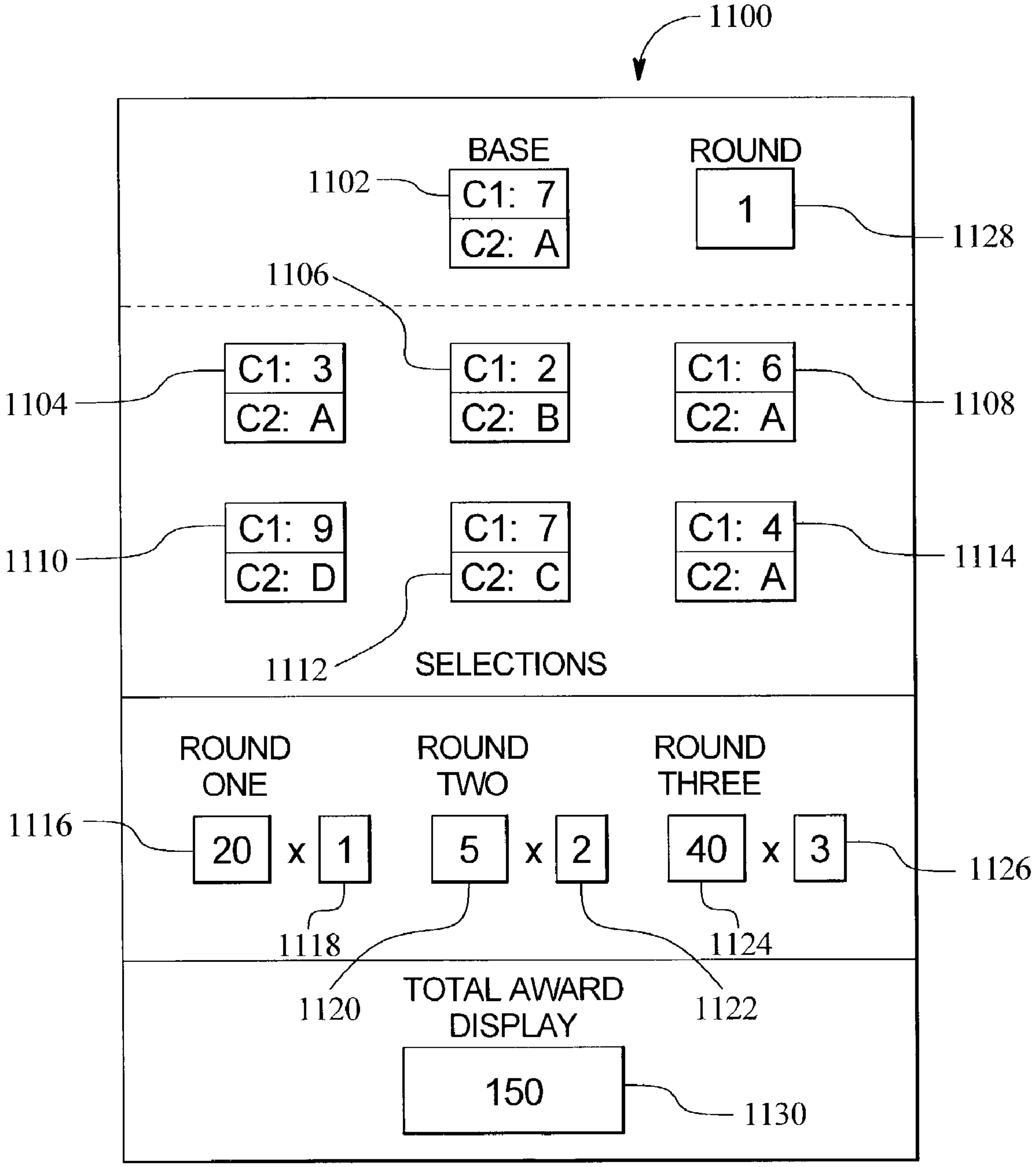
FIG. 14 is an elevation view of a display device of an alternative embodiment of the multi-characteristic matching game of the present invention where the matching game includes a plurality of rounds.

Referring now to FIG. 14, a further alternative embodiment of the present invention is illustrated where the gaming device includes a multi-characteristic matching game having a plurality of events or rounds. The multi-characteristic matching game 1100 displays a base 1102 and a plurality of selections 1104, 1106, 1108, 1110, 1112, and 1114. In one embodiment, the gaming device determines and displays the base to the player at the beginning of a game. In another embodiment, the gaming device displays a plurality of selections and enables a player to pick the base from one of the selections. The gaming device displays the picked selection as the base at the beginning of the game. The base and each of these selections includes at least two characteristics determined from a set of characteristics as described above. In this embodiment, the first characteristic (C1) of the base and the selections include numbers, and the second characteristic (C2), includes letters. It should be appreciated that two or more characteristics may be employed in each of these selections as desired by the game implementor. It should also be appreciated that any number of selections may be employed in the present invention as desired by the game implementor. In this embodiment, a round display 1128 indicates the current round in a game. Additionally, a round award display such as displays 1116, 1120 and 1124, and a modifier display such as displays 1118, 1120 and 1126, indicate the awards and modifiers, if any, in each of the rounds. The award display in each round indicates the award obtained by the player in each of those rounds. The modifier display indicates the modifier associated with each of the rounds.

In one embodiment, the matching game includes multiple rounds where a player picks one or more selections having a least one matching characteristic with the characteristics of the base in each round. When the player cannot match at least one of the characteristics of any of the selections in a round with one of the characteristics of the base, the round ends and the gaming device provides the player with the accumulated award obtained by the player in that round. When there are no rounds remaining in the game, the game ends. The gaming device sums the accumulated awards obtained by the player in each of the rounds to determine a total award for the game. The total award is indicated in a total award display 1130. At the end of the game, the gaming device provides the total award to the player.

In another embodiment, a modifier such as a multiplier, is associated with each of the rounds. The multiplier may be predetermined, randomly determined, determined by a wager made by the player or determined using any suitable determination method. In one aspect of this embodiment, at least two of the multipliers associated with the rounds are different. In another aspect of this embodiment, a plurality of the multipliers associated with the rounds are different. In a further aspect of this embodiment, all of the multipliers associated with the rounds are different. In this embodiment, at the end of a game, the total award equals the sum of the awards in each of the rounds, multiplied by the multipliers associated with each of the rounds.

In one embodiment, the multipliers associated with each of the rounds increases in each successive round. For example, in a game with three rounds, the multiplier in round one may be 1×, the multiplier in round two may be 2×and the multiplier in round three is 3×.

In another embodiment, one or more modifiers are associated with the selections. The modifiers associated with each of the selections may be viewable by a player or may be masked or hidden from the player. In a game, the gaming device enables a player to pick the selections and adds the modifier associated with the picked selections to the modifier display in each of the rounds when the player picks a selection including at least one characteristic that matches one of the characteristics of the base.

In a further embodiment, the multipliers associated with each of the rounds are the same and the awards associated with the matching selections picked by the player increase in each successive round. Therefore, the awards associated with matching selections picked by the player are larger in later rounds than in the earlier rounds. For example, in a game having three rounds, the gaming device provides an award of five for each matched selection round one, an award of ten for each matched selection in round two and an award of fifteen for each matched selection in round three.

In another embodiment, the gaming device provides a bonus award to the player when the player successfully matches at least one characteristic on each of the selections with one of the characteristics on the base in a round. The bonus award may be values, credits, prizes, multipliers or any suitable award. The bonus award may be provided in only one round in the game, in a plurality of rounds in the game or in all of the rounds in a game. Alternatively, the bonus award may be provided to a player when the player matches a designated number of selections in one or more rounds in a game. The designated number of selections may be predetermined, randomly determined, determined based on a wager made by a player in the game or according to any suitable method.

In a further embodiment, the base and the selections in a game are playing cards. The base card and the card selections include at least two characteristics such as the playing card suits (i.e., clubs, diamonds, hearts and spades), numbers, colors, or any other suitable characteristic on the cards. The player picks selections in each of the rounds to match at least one of the characteristics of the card selections with one of the characteristics on the base card. The player continues to pick selections in each of the rounds until there are no selections remaining in the rounds where one of the characteristics on the card selections matches one of the characteristics on the base card. When there are no rounds remaining in the game, the game ends and the player receives the total award in that game.

Referring to FIGS. 15A to 15K, a multi-characteristic matching game of the present invention is illustrated where the matching game includes several rounds. In this example, the matching game includes three rounds where the player picks selections to match one of the characteristics C1 or C2 with the characteristics of base C1 and C2. When the player picks one of the selections 1204, 1206, 1208, 1210, 1212 or 1214 including at least one matching characteristic with one of the characteristics on the base, the picked selection replaces the base and becomes the new base for the next pick in that round. The player continues to pick selections in the round until the player cannot match at least one characteristic of any of unpicked selections with one of the characteristics of the base. When the player cannot match at least one characteristic of the selections with one characteristic of the base, the round ends and the gaming device initiates the next round in the game. When there are no rounds remaining in the game, the gaming device determines the total award for the game, which is the sum of the awards accumulated or obtained in each of the rounds. The total award is indicated in the total award display 1230. Therefore, having multiple rounds in a game compensates a player for situations where the player matches none or only a few of the selections with the base.

Figure 15A:
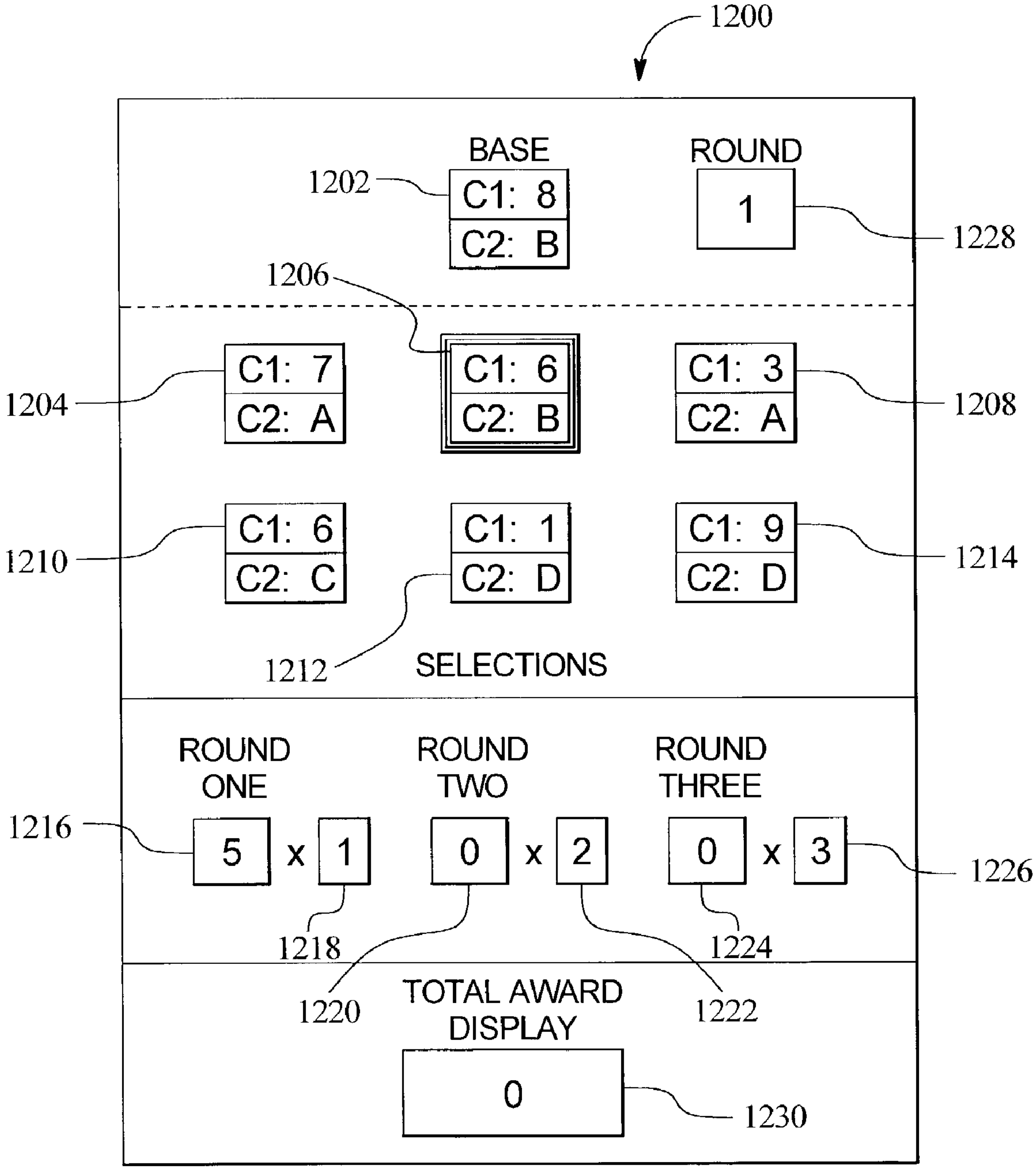
FIGS. 15A to 15K are elevation views of a display device of the embodiment FIG. 14 illustrating an example of a multi-characteristic matching game including a plurality of rounds.

Referring to FIG. 15A, the player picks selection 1206 which includes the first characteristics. The second characteristic, B, matches the second characteristic of the base 1202, which is B. Therefore the player picked a selection including at least one matching characteristic with the base. In round one, the gaming device provides an award of five for each matching selection picked by the player in this round as indicated in the round one award display 1216. In this example, the multiplier associated with round one has a value of one or 1×as indicated in the round one multiplier display 1218. Thus, any awards accumulated by the player in round one are multiplied by 1×. Because the player picked a selection in round one which includes at least one characteristic that matches one of the characteristics of the base, the player continues to pick more selections in the round. Also, the picked selection 1206 is removed from the selections and replaces the base 1202.

In one embodiment, as described above, the gaming device provides an award to the player for each picked selection that includes at least one characteristic that matches one of the characteristics of the base. The award may be values, credits, multipliers or any suitable award. In addition, the award may be predetermined, randomly determined or based on a wager made by a player in a game.

In another embodiment, the award equals or is based on one or more of the characteristics of a picked selection in a game. For example, in a particular game, the gaming device displays a plurality of selections, each including two characteristics—a letter and a number. In this game, each number represents a value and each letter is associated with a value. When the player picks a selection where the number on the picked selection matches a number on the base, the gaming device provides the value of the number to the player as the award for successfully picking a matching selection in the game. When the player picks a selection where the letter on the picked selection matches a letter on the base, the gaming device provides the value associated with the letter to the player as the award for successfully picking a matching selection in the game. When both characteristics of a picked selection match the characteristics of a base, the gaming device provides a combination of the awards to the player.

Figure 15B:
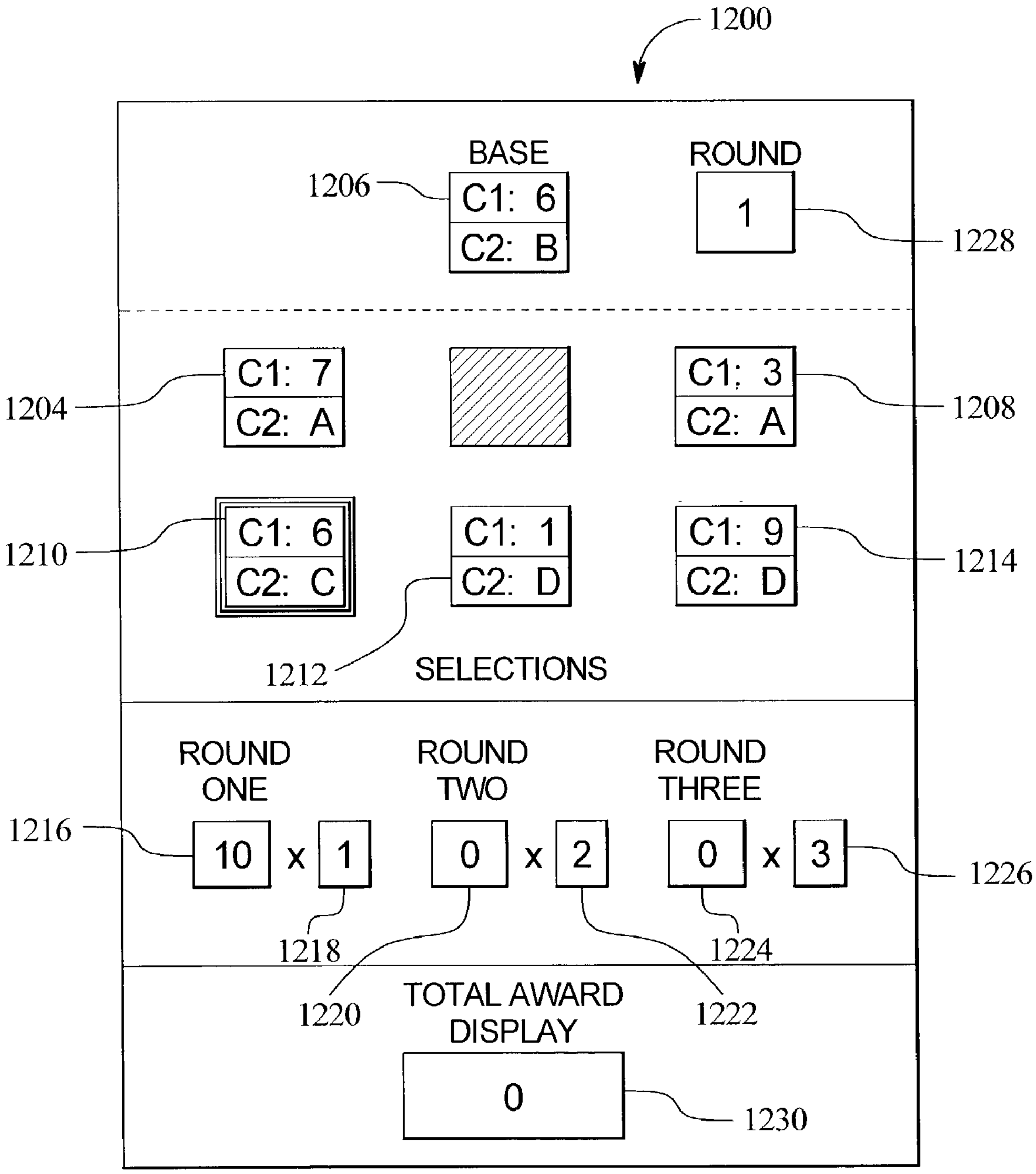

Referring to FIG. 15B, the player picks another selection, selection 1210, in round one. The picked selection 1210 includes a first characteristic C1=six and a second characteristic C2=C. The first characteristic C1=six of the picked selection matches the first characteristic of the base, which is six. Therefore, the player obtained another matching selection in round one. An award of five associated with the matching selection is added to the player's award in round one as indicated by the round one award display 1216. The player now has an accumulated award of ten in round one. The player may now pick another selection in round one. Also, the picked selection 1210 is removed from the selections and replaces the base 1206.

Figure 15C:
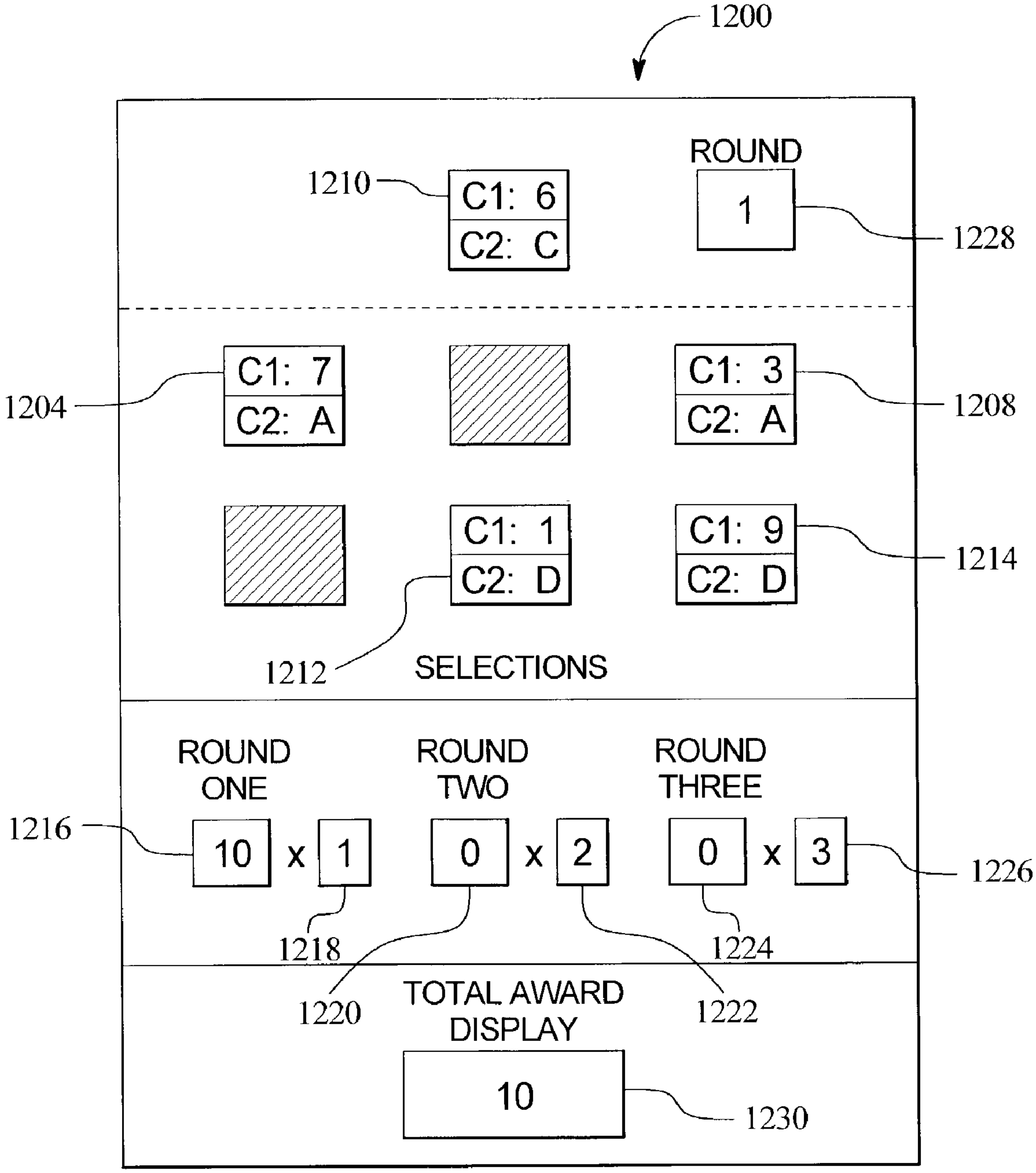

Referring to FIG. 15C, the player cannot pick any of the remaining selections in round one because none of the selections include at least one characteristic that matches one of the characteristics of the base 1210. Thus, round one ends because the player cannot make any further selections in this round. The player obtained an accumulated award of ten in round one as indicated in the round one award display 1216. The award of ten, is multiplied by the multiplier associated with round one, 1×, as indicated in the round one multiplier display 1218. Therefore, the total award obtained by the player in round one is ten, which is the award of ten multiplied by the multiplier 1×.

Figure 15D:
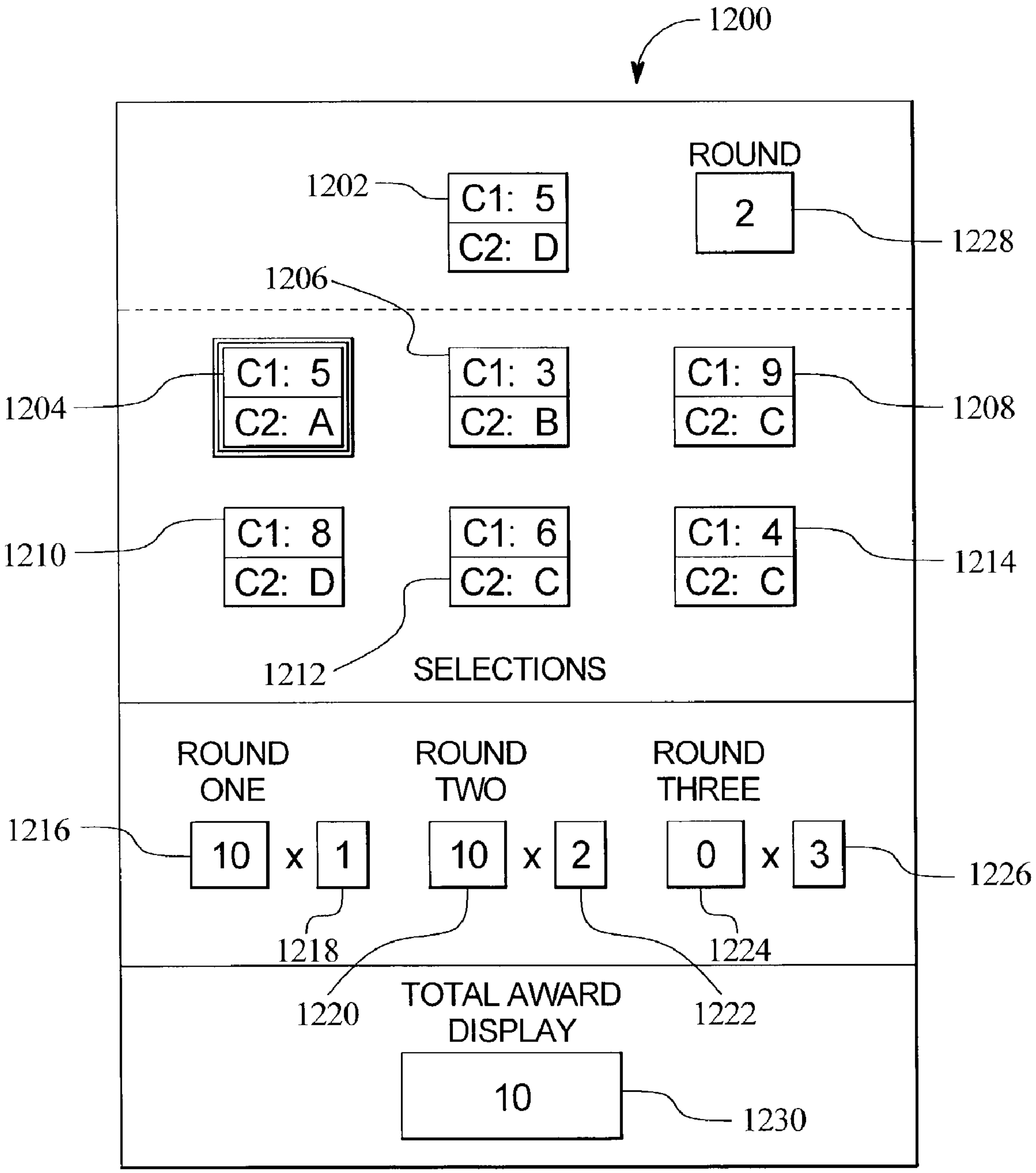

Referring to FIG. 15D, the gaming device initiates the next round in the game which is round two as indicated by the round display 1228. A new base 1202 is displayed in round two. The base 1202 includes a first characteristic, C1=5, and a second characteristic C2=D. Therefore, the player must pick one of the selections that includes at least one characteristic that matches with one of the characteristics of the base 1202. In round two, the player picks selection 1204 which includes a first characteristic, C1=5, and a second characteristic, C2=A. The first characteristic of the picked selection matches the first characteristic of the base 1202. Thus, the player picked a matching selection in round two. Each matching selection in round two provides an award of ten as indicated in the round two award display 1220. In addition, a multiplier of two or 2×is associated with round two as indicated in the round two multiplier display 1222. The picked selection 1204 is removed from the selections and replaces the base 1202.

Figure 15E:
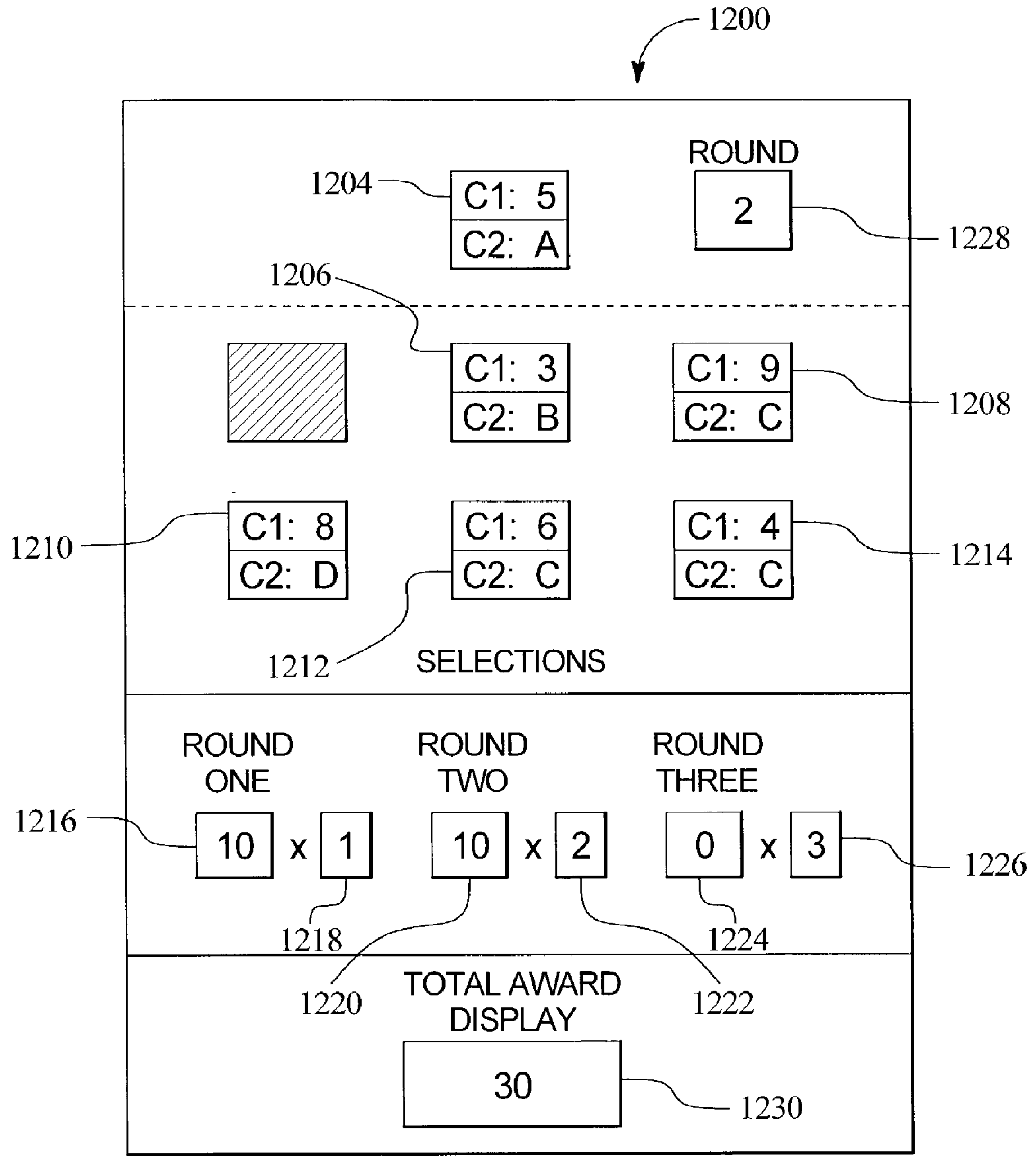

Referring to FIG. 15E, the player cannot pick another selection in round two because none of the selections include at least one matching characteristic with one of the characteristics of the base 1204. Therefore, the gaming device provides the player with an award of ten in the second round as indicated by the round two award display 1220. The award of ten is multiplied by the multiplier two or 2×as indicated in the round two multiplier display 1222 to provide a total award of twenty for round two. The award of twenty in round two is added to the award of ten in round one to give the player a total award of thirty for the game as indicated in the total award display 1230. The gaming device now initiates the next round in the game, which is round three. Round three is the last or final round in the game.

Figure 15F:
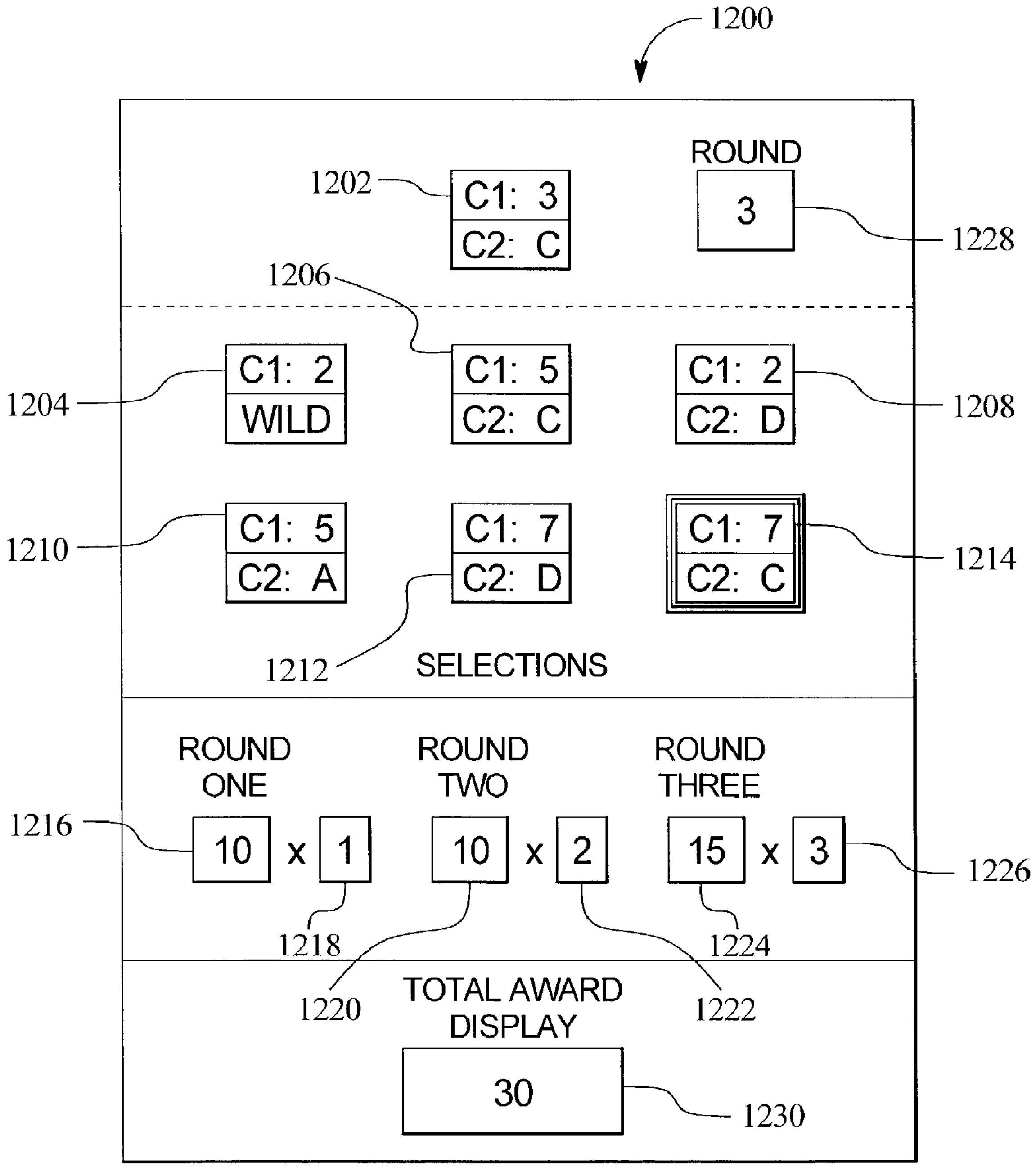

Referring to FIG. 15F, at the beginning of round three, the gaming device displays a new base 1202 and a new set of selections. The base includes a first characteristic, C1=3 and a second characteristic, C2=C. The player picks a first selection in round three which is selection 1214. The second characteristic, C2=C of selection 1214 matches the second characteristic of the base. Therefore, the gaming device provides an award of fifteen to the player for obtaining a matching selection in the round as indicated by the round three award display 1224. In round three, the awards are multiplied by three or 3×as indicated by the round three multiplier display 1226. The player may now pick another selection in round three. The picked selection 1214 is removed from the selections in round three and replaces the base 1202.

Figure 15G:
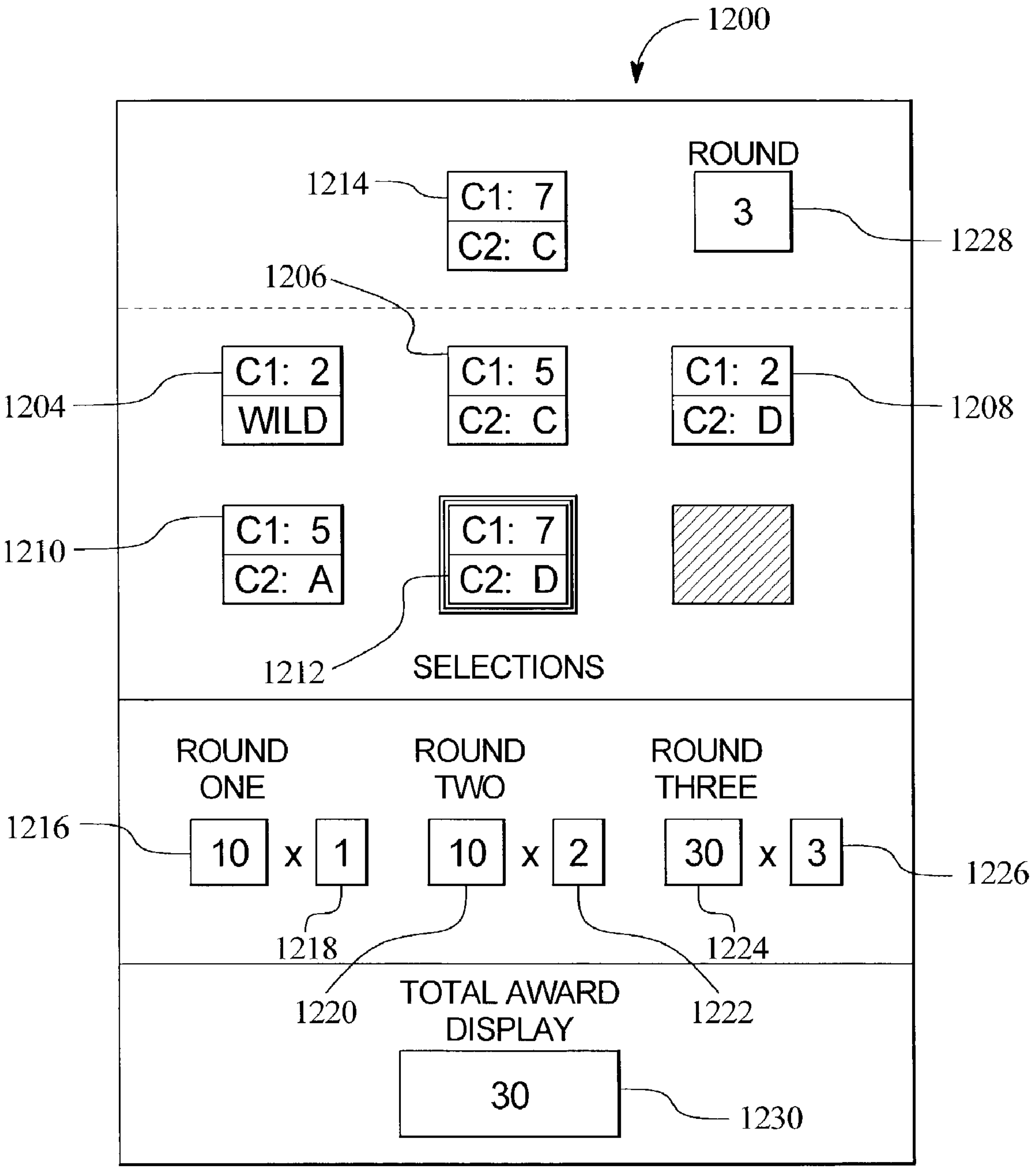

Referring to FIG. 15G, the player picks another selection 1212 in round three. The selection 1212 includes a first characteristic, C1=7, and a second characteristic C2=D. The first characteristic C1=7 matches the first characteristic of the base 1202 which is C1=7. Therefore, the player obtains another award of fifteen for obtaining a matching selection in round three. The gaming device adds the award of fifteen to the round three award display 1224 to give the player an accumulated award of thirty in round three. The player may now pick another selection in round three. The picked selection 1212 is removed from the selections and replaces the base 1214.

Figure 15H:
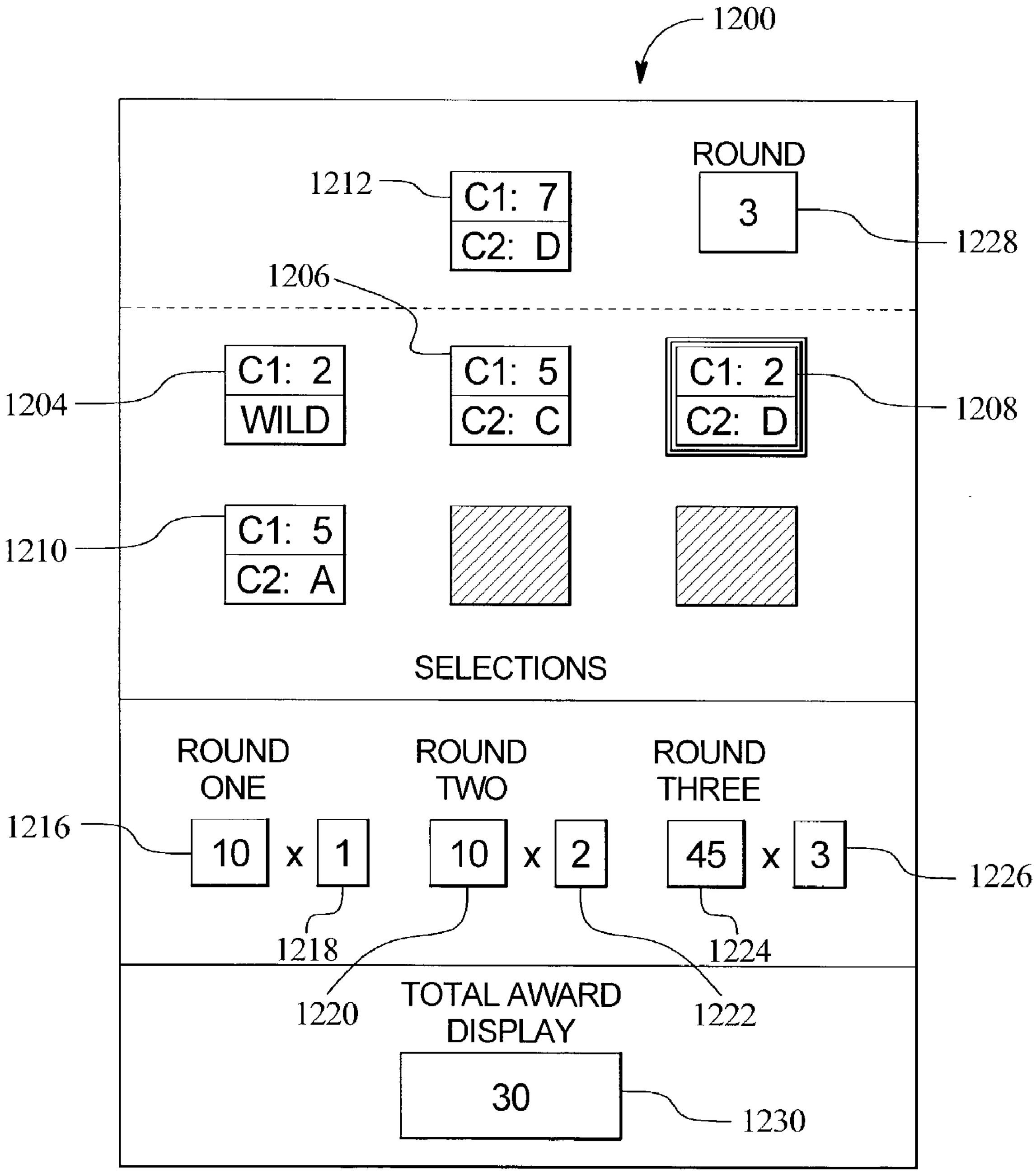

Referring to FIG. 15H, the previous picked selection 1212 is now the base 1212 in round three. Therefore, the player must pick one of the remaining or unpicked selections 1204, 1206, 1208 or 1210, and match one of characteristics on those selections with one of the characteristics on the base 1212. The previously picked selections may no longer be picked in round three as indicated by the shaded boxes. In FIG. 15H, the player picks selection 1208 which includes a first characteristic, C1=2, and a second characteristic, C2=D. The second characteristic D matches the second characteristic of the base 1202, which is also D. Thus, the player obtains or picks another matching selection in round three. The gaming device adds the award of fifteen to the round three award display 1224 for picking the matching selection. The total accumulated award in round three is now forty-five as indicated by the round three award display 1224. The player now only has to the three remaining or unpicked selections in round three to obtain a completion or bonus award in round three. The picked selection 1208 is removed from the selections and replaces the base 1212.

Figure 15I:
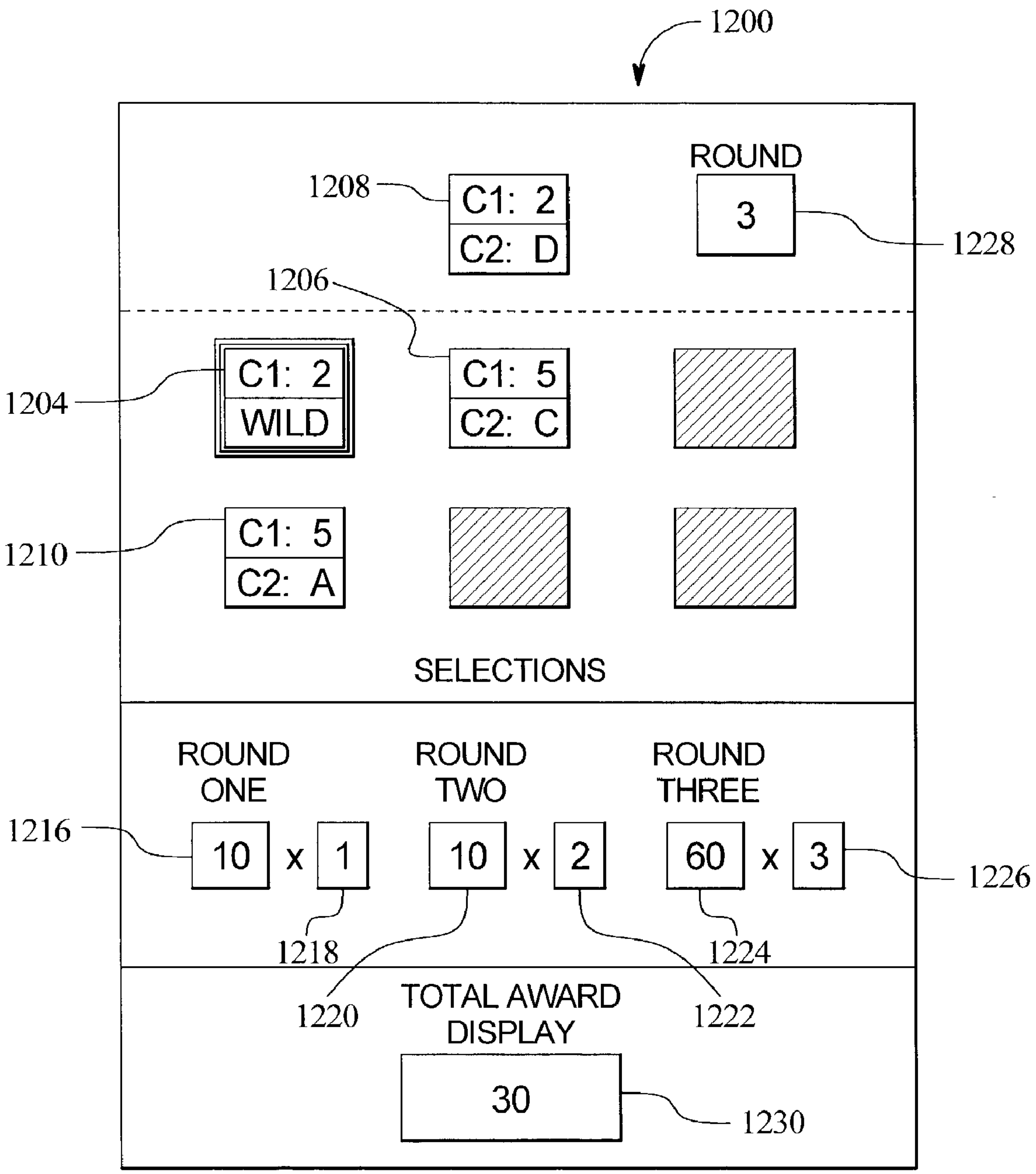

Referring to FIG. 15I, the player picks another selection, selection 1204, which includes a first characteristic, C1=2, and a second characteristic, C2=WILD, matches with any of the second characteristics in the game. Therefore, either the first characteristic, C1=2, or the second characteristic, which is the wild symbol, matches the first and second characteristics of the base 1202. The gaming device provides an award of fifteen to the player for picking another matching selection in round three.

In one embodiment, the gaming device provides an award of fifteen to the player for matching at least one of the characteristics of the picked selection with one of the characteristics of the base. In another embodiment, the gaming device provides the player with an award for each of the characteristics of the picked selection that match characteristics on the base. For example, when two of the characteristics on the picked selection match two of the characteristics on the base as described above, the gaming device provides the player with two awards of fifteen or a total award of thirty. In a further embodiment, the gaming device provides the player with at least one multiplier when the player picks a selection including multiple characteristics that match multiple characteristics on the base. The multiplier may be predetermined, randomly determined, based on a wager made by the player or determined according to any suitable method. In one embodiment, the multiplier is based on the number of matching characteristics between the picked selection and the base. For example, one matching characteristic provides a multiplier of 1×and two matching characteristics provides a multiplier of 2×.

In FIG. 15I, the award of fifteen is added to the previous award of forty-five to give the player a total accumulated award of sixty in round three as indicated by the round three award display 1224. The player now only has to match the remaining two selections 1206 and 1210 to obtain a completion bonus award or bonus award in round three. The picked selection 1204 is removed from the selections and replaces the base 1208.

Figure 15J:
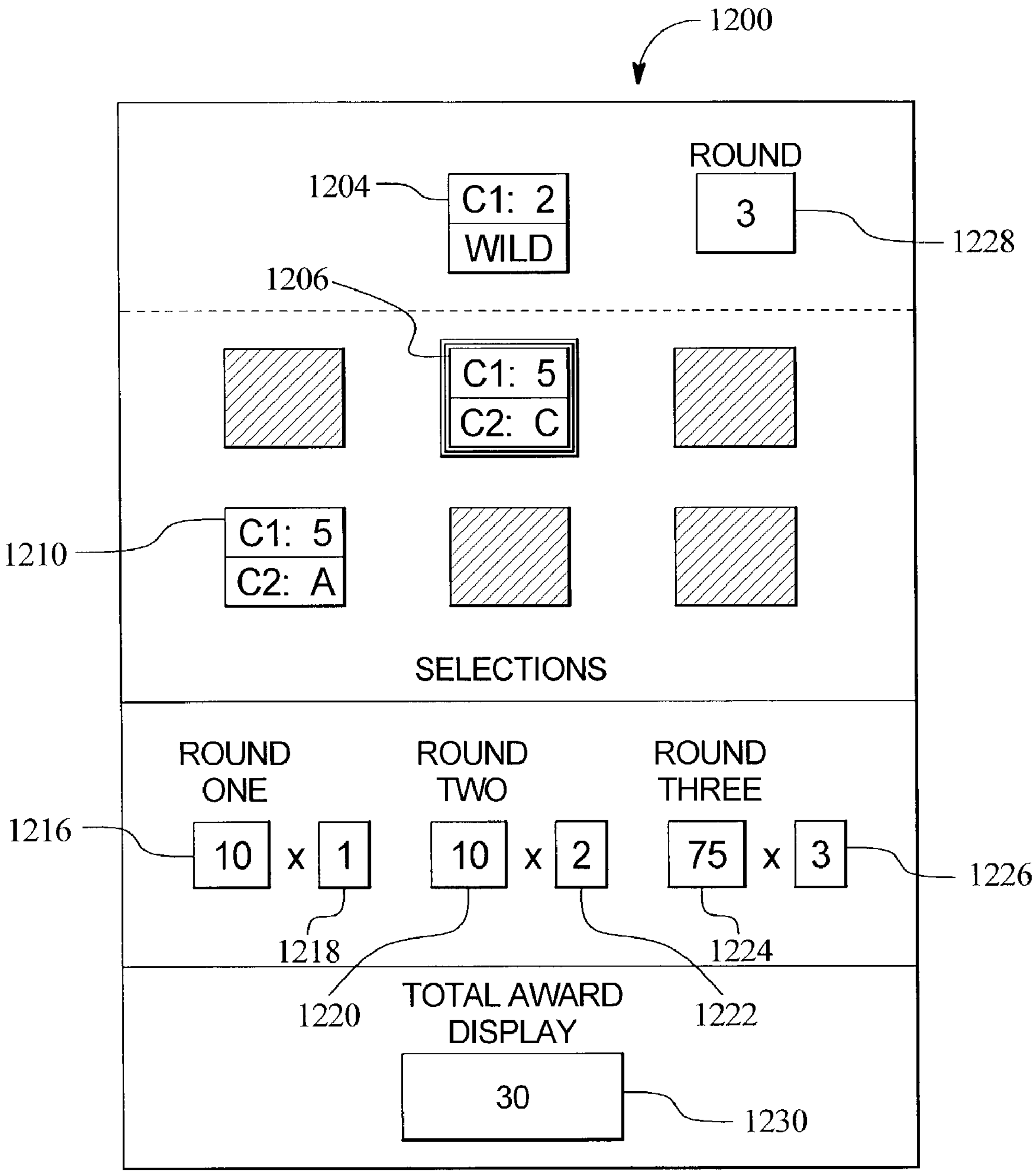

Referring to FIG. 15J, the player picks another selection 1206 in round three. Selection 1206 includes a first characteristic, C1=5, and a second characteristic, C2=C. The base 1204 includes a first characteristic, C1=2 and a second characteristic, C2=WILD. Thus, the wild characteristic matches with any of the second characteristics in round three. Therefore, the second characteristic, C2=C associated with selection 1206 matches the second characteristic or wild characteristic of the base 1204. The gaming device provides an award of fifteen to the player for picking a selection that includes at least one characteristic that matches one of the characteristics of the base 1204. The total accumulated award in round three is now seventy-five as indicated in the round three award display 1224. The player has only one selection remaining in round three. The picked selection 1206 is removed from the selections and replaces the base 1204 in round three.

Figure 15K:
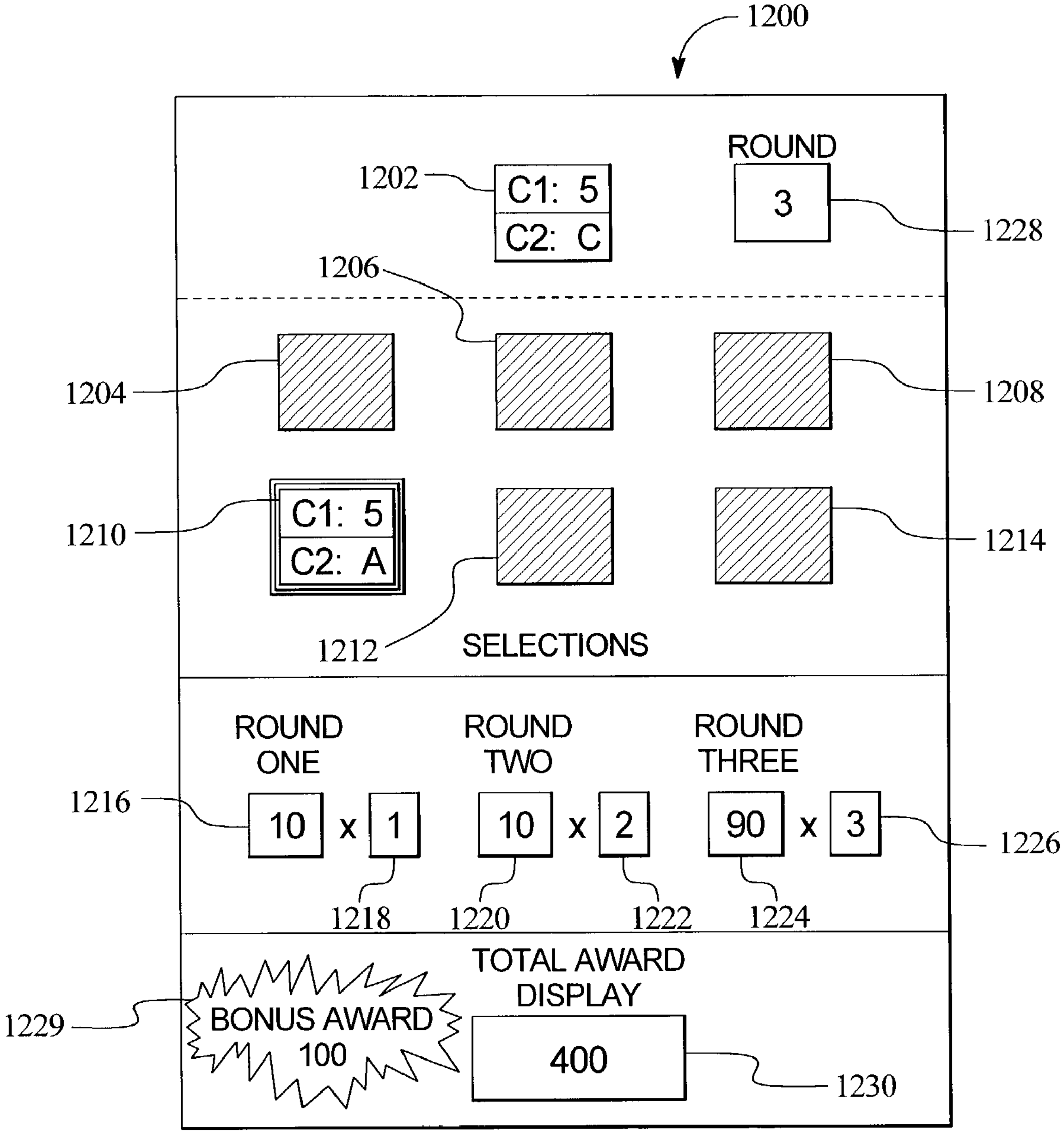

Referring to FIG. 15K, the player picks the final selection 1210 in round three, which includes a first characteristic, C1=5, and a second characteristic C2=A. The first characteristic, C1=5, in selection 1210 matches the first characteristic of the base 1202. Therefore, the player matched all of the selections in round three. The gaming device provides an award of fifteen for picking a matching selection and a completion bonus award or bonus award to the player for successfully matching all of the selections in round three. Thus, the gaming device provides an award of fifteen for successfully matching the individual selection 1210 and a bonus award of one hundred. The award of fifteen is added to the players total award which is now ninety as indicated in the round three award display 1224. The total award of ninety is multiplied by the multiplier for round three, which is three or 3×, and provides an award for round three of two hundred seventy. The completion bonus award of one hundred is indicated or displayed to the player such as in a bonus display 1229 and added to the total accumulated award for the round of two hundred seventy. It should be appreciated that the bonus award may be indicated or displayed to the player using any suitable display or indicator. It should also be appreciated that the bonus award may not be displayed to the player, but only added to the total award in the total award display.

The total award for the round is now three hundred seventy. The award of three hundred seventy is added to the total awards from the previous two rounds of ten and twenty, respectively, to provide a total award for all three rounds of four hundred as indicated in the total award display 1230.

In the above example, the multipliers (i.e., modified) in each round was different. It should be appreciated that the multipliers may be the same, as least two of the multipliers may be different, a plurality of the multipliers may be different or all of the multipliers may be different in two or more rounds of a game. In another embodiment, the multipliers change after each pick in a round. In a further embodiment, the multipliers change after a plurality of picks of the selections in a round. Also, the multipliers may increase, decrease, or remain unchanged in one or more rounds of the game.

As described in the above embodiments of the present invention, a player's goal is to continue to pick selections that include at least one characteristic that matches one of the characteristics of the base. Because the picked selection replaces the base when the picked selection includes at least one characteristic that matches one of the characteristics of the base, the player must determine how many matching selections the player can make by picking each of the initially displayed selections. The optimal or best selection in each pick therefore, is the selection that enables the player to match the most selections in the game. As a result, although two selections may each include at least one characteristic that matches one of the characteristics of the base, one selection is generally optimal over another selection in a game. The reason for picking one selection instead of another selection in a game is one selection may enable a player to pick a series of five selections by matching at least one characteristic of those selections with one characteristic on the base. The other selection may only enable the player to pick and match a series of three selections.

Therefore, one selection is typically the best pick or best selection in a particular pick, because that selection enables the player to pick more subsequent selections by matching one characteristic of the selection with one characteristic of the base, than the other unpicked or available selections in that pick in the game. Thus, the player attempts to pick the selections that will enable the player to match the most selections in the game to maximize the player's award in the game.

Figure 16:
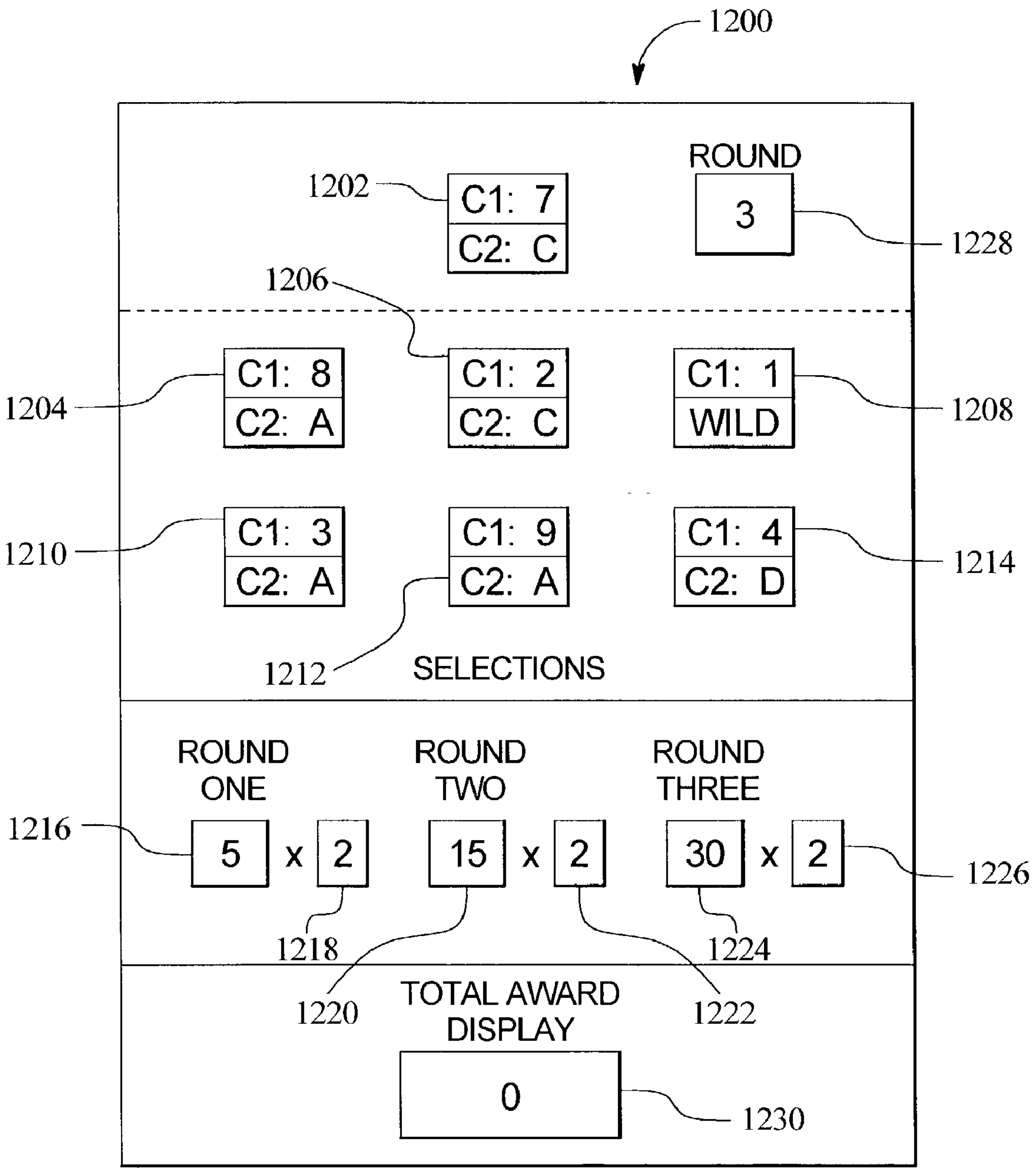
FIG. 16 is an elevation view of a display device of another embodiment of the multi-characteristic matching game of the present invention illustrating a matching game having different rounds and different modifiers associated with each of the rounds.

Referring to FIG. 16, another alternative of the embodiment of the present invention is illustrated where the multi-characteristic matching game 1200 displays a base 1202 and a plurality of selections 1204, 1206, 1208, 1210, 1212 and 1214 to a player in a game. In this embodiment, the modifier associated with each of the rounds is the same (i.e., two or a multiplier of 2×). However, the awards in this embodiment change in one or more of the rounds in the game. For example in FIG. 16, the gaming device provides an award of five for each matching selection in round one. The gaming device provides and award of fifteen for each matching selection in round two. The gaming device provides an award of thirty for each matching selection in round three. Furthermore, in the present invention, the awards for each of the matching selections in the rounds may increase, decrease or remain unchanged in one or more of the rounds of a game. Additionally, both of the awards and the multipliers (i.e., modifiers) may increase, decrease or remain unchanged in one or more of the rounds of a game.

Figure 17:
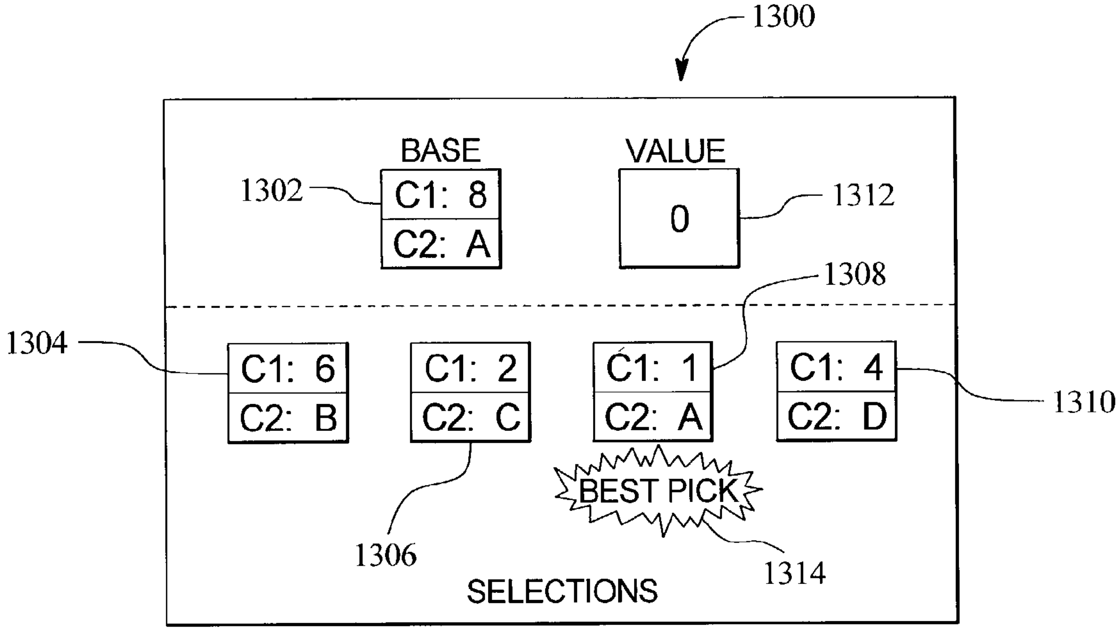
FIG. 17 is an elevation view of a display device of another alternative embodiment of the multi-characteristic matching game of the present invention illustrating a plurality of selections wherein an indicator directs a player to one of the selections.

In another alternative embodiment of the present invention, a multi-characteristic matching game includes an indicator or prompt, which directs the player to one of the selections and preferably the best pick, best selection or optimal selection in a round or in a game. Referring to FIG. 17, one embodiment of the multi-characteristic matching game 1300 is illustrated the gaming device displays a plurality of selections 1304, 1306, 1308 and 1310, which each include a first and second characteristic C1 and C2, wherein one of the selections functions as a base 1302 having a first characteristic, C1=8, and a second characteristic, C2=A. An award display or value display 1312 indicates the award or value obtained by the player in a round or in a game. An indicator 1314 indicates or directs the player to the best pick or optimal selection in a round or in a game. In this embodiment, the indicator is a statement displayed adjacent to or near one of the selections where the statement is the phrase "best pick." It should be appreciated that any phrase, letter, characteristic, or any other element or symbol or function that will direct the player to the best pick or selection may be employed in the game.

In one embodiment, the gaming device displays a plurality of selections to the player and enables the player to pick one of the selections to be the base at the beginning of a game. In this embodiment, the gaming device indicates which selection is the best pick or best selection to be the base in the game.

Additionally, the indicator may be an illumination device associated with each of the selections which highlights or illustrates the best selection. In one embodiment, the gaming device indicates a best pick or best selection to the player by displaying the indicator prompt "best pick" next to the best selection or best pick determined by the gaming device. In this embodiment, the gaming device does not enable the player to pick any selection but the selection designated as the best or optimal selection in the round or game. Therefore, the player must pick the best selection or selections in the game and therefore, obtains the best possible award in the round or game.

Figure 18A:
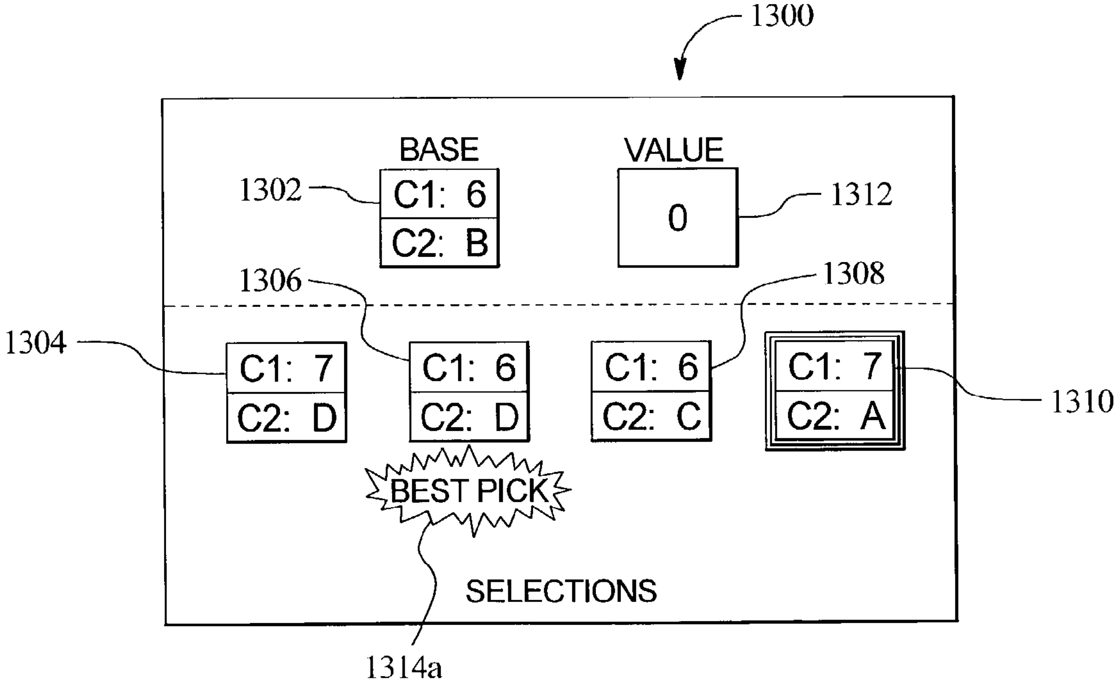
FIGS. 18A to 18C are elevation views of an example of the embodiment of FIG. 17.
Figure 18B:
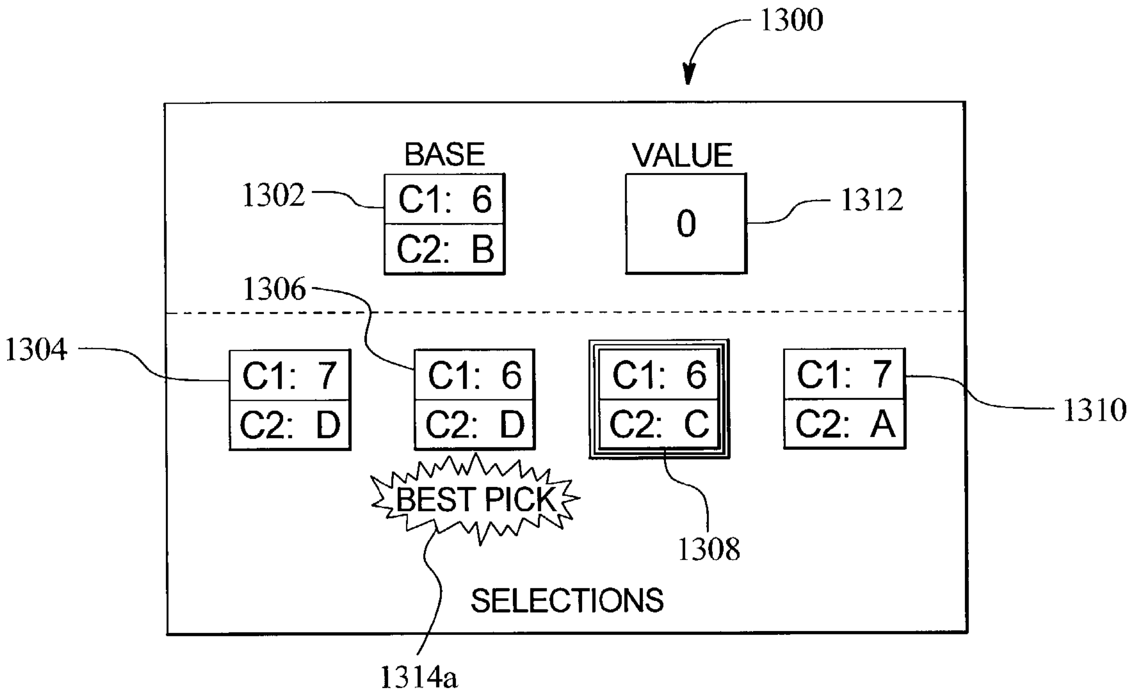
Figure 18C:
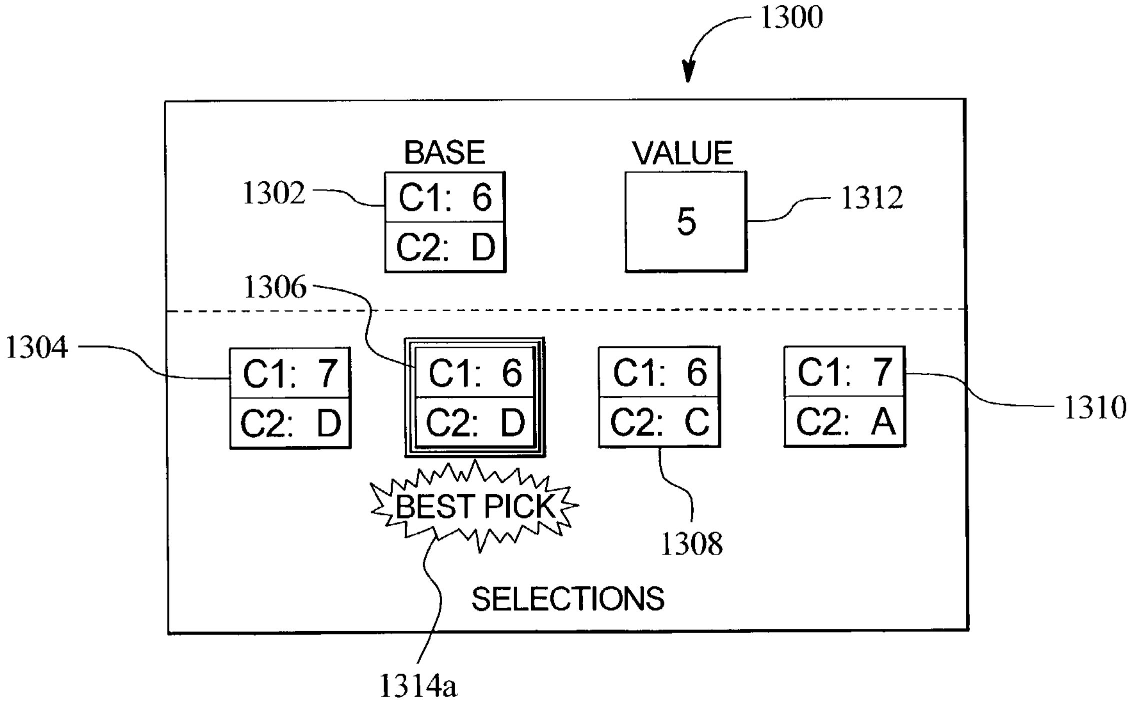

Referring to FIGS. 18A to 18C, an example of the embodiment of FIG. 17 is illustrated where the gaming device displays a base 1302 including a first characteristic, C1=6, and a second characteristic, C2=B. The gaming device also displays a plurality of selections 1304, 1306, 1308 and 1310 to the player. The initial value or award in the game is zero as indicated by the value display 1312. The gaming device indicates the best pick or optimal selection from amongst the plurality of selections in the game. The best selections are indicated by the prompt or indicator 1314, which is the phrase "best pick."

The gaming device determines that selection 1306 is the optimal selection in the game because selection 1306 enables the player to pick the most matching selections in the game. Selection 1306 includes the characteristics (C1=6, C2=D) where the first characteristic C1, matches the first characteristic of the base. If the player picks selection 1306, selection 1306 is removed from the selections and replaces the base 1302 to become the new base 1306. In this situation, of the remaining selections in the game, selection 1304 (C1=7, C2=D) and selection 1308 (C1=6, C2=C) include at least one matching characteristic with the characteristics of the base. Selection 1304 is the best selection of these two remaining selections because the second characteristic of selection 1304 matches the second characteristic of the base 1306. The first characteristic of selection 1304 then matches the first characteristic of selection 1310, which is functioning as the base. Thus, the player can match three of the four selections by picking selection 1306, which is indicated as the best selection in the game. Conversely, if the player picks selection 1308, the player will only be able to match one more selection, which is selection 1306. Therefore, selection 1306 is the best or optimal selection of the initial selections in the game because the player can make the most matches in the game and thereby obtain the largest possible award in the game by picking that selection.

It should be appreciated that the best selection or optimal selection in a game or games is determined based on the type of game being played and the characteristics of the base and the selections in the game. For example, if the object of a particular game is to pick all of the selections including the first characteristic (C1=2) in the game, then the selection or selections that are indicated as the best picks or best selections in the game are the selections including a first characteristic of C1=2. As another example, an object of a game may be to only pick selections where the second characteristic of the selection matches the second characteristic of the base, regardless of the first characteristics of the base or selections. In this example, the best selections will be the selections including a second characteristic which matches the second characteristic of the base. Therefore, it should be appreciated that a selection indicated as the best or optimal selection in one game, may not be the optimal selection in another game.

Referring to FIG. 18A, the player picks a different selection 1310, which includes a first characteristic, C1=7, and a second characteristic, C2=A. Neither of the characteristics of selection 1310 match one of the characteristics of the selection functioning as the base 1302. Thus, the player did not pick the optimal selection in the game as indicated by the indicator 1314*a*. As a result, the gaming device continues to indicate and direct the player to pick selection 1306, which the gaming device determined to be the best pick or optimal selection in the game.

Referring to FIG. 18B, the player picks another selection, selection 1308, in the game. Selection 1308 is not the best selection or best pick in the game as described above.

Therefore, the gaming device continues to direct the player to pick the best pick or optimal selection in the game, which is selection 1306, as indicated by the prompt or indicator 1314*a*.

Referring to FIG. 18C, the player picks selection 1306, which the gaming device determined and designated as the best selection in the game as indicated by the indicator 1314*a*. The picked selection 1306 replaces the base 1302 and the gaming device enables the player to pick one of the remaining selections in the game to match one of the characteristics with characteristics of the new base 1306. The gaming device now determines and indicates the best or optimal selection of the remaining or unpicked selections in the game. The gaming device continues to indicate one or more selections as the optimal selection until there are no selections remaining or until there are no possible matches remaining in the game.

In the embodiment illustrated in the above example, the device continues to indicate the optimal selection and does not enable the player to pick any other selection except for the determined optimal selection in the game. In another embodiment, the gaming device indicates the best pick or best selection after each pick by the player, but enables the player to pick any of the selections in the game. In a further embodiment, the gaming device determines and indicates the optimal selection of the plurality of selections in the game for a designated number of picks. Therefore, the gaming device directs the player to the optimal selection in the game by indicating the selection using the indicator or prompt 1314. The gaming device continues to direct the player to the best or optimal selection in the game for the designated number of picks and does not enable the player to pick any of the other selections. When the player makes or reaches the designated number of picks in the game, the gaming device overrides the restriction of only picking the designated optimal selection in the game and enables the player to pick any of the other selections in the game. Once the player picks another selection in the game, which is not the indicated optimal selection, the gaming device determines a new optimal selection in the game based on the remaining unpicked selections.

In one embodiment, the gaming device resets the designated number of picks after enabling the player to pick a selection other than the optimal selection. In another embodiment, the gaming device does not reset the designated number of picks and continues to indicate the optimal pick or selection in the game until the designated number of picks have been achieved. The game then continues but the gaming device does not indicate the optimal pick for the remainder of the game.

For example, the gaming device may direct the player to the best or optimal selection for two picks in a game. When a player makes two picks of the selections in the game, which are not the designated optimal selection, the gaming device overrides the restriction of only enabling the player to pick the optimal selection and enables the player to pick the desired selection by the player. The gaming device then determines a new optimal selection based on the remaining or unpicked selections in the game. The designated number of picks or the point in the game when the gaming device overrides the restriction may be randomly determined, predetermined, based on a wager made by the player or according to any suitable determination method. In one aspect of this embodiment, the gaming device determines and indicates the optimal selection in the game in a plurality of picks made by the player. In another aspect of this embodiment, the gaming device indicates the optimal selection in the game after a predetermined number of picks made by the player. In a further embodiment, the gaming device indicates the optimal selection in the game after a random number of picks by the player. It should be appreciated that the gaming device may indicate the optimal selection in the game after one or more picks by the player in the game.

Figure 19:
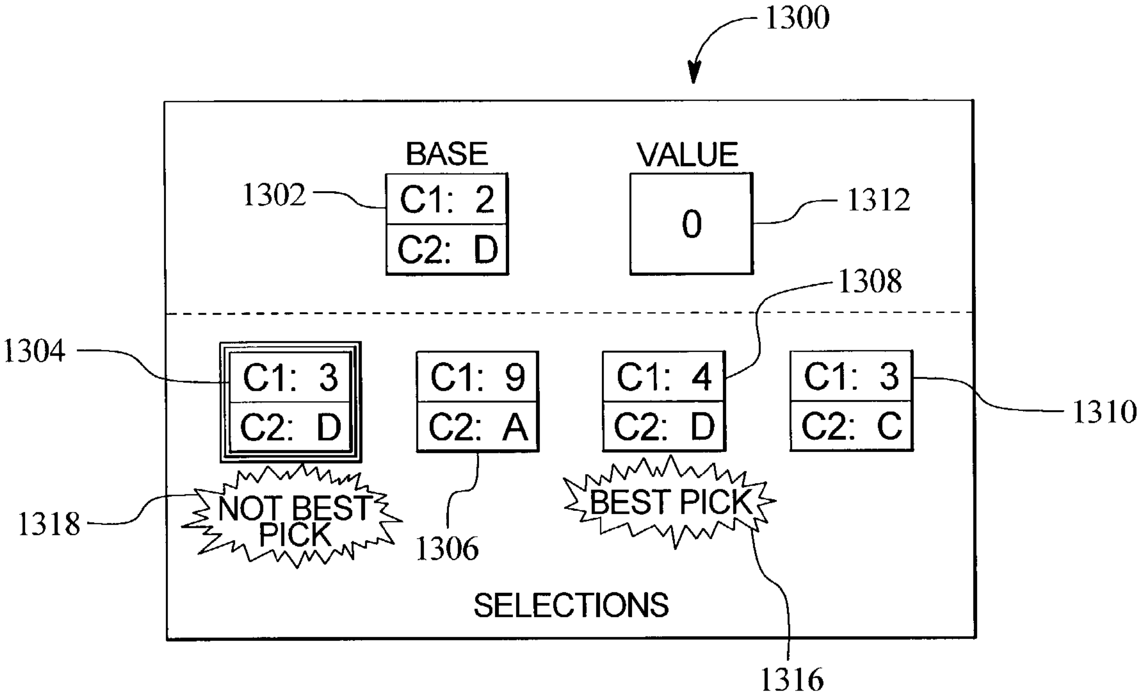
FIG. 19 is an elevation view of a display device of another embodiment of the multi-characteristic matching game of the present invention illustrating a plurality of selections where two or more different indicators are employed in a game to direct the player to one of the selections in the game.

Referring to FIG. 19, another embodiment of the present invention is illustrated where the multi-characteristic matching game includes a second indicator or additional indicator which indicates or further directs the player to the best pick, best selection or optimal selection in the game. In FIG. 19, the matching game 1300 includes a selection functioning as a base 1302 having a first characteristic, C1=2, and a second characteristic, C2=D. The first and second characteristics C1 and C2 may be any suitable characteristics as described above. The gaming device also displays a plurality of additional selections including a first and second characteristic, which are numbers and letters, respectively.

In this embodiment, the gaming device indicates or displays an indicator 1316, which indicates the best pick or optimal selection in the game. The gaming device also displays or includes a second indicator 1318, which further directs the player to the best pick or optimal selection determined by the gaming device in the game. In the example shown in FIG. 19, the second indicator displays a message such as "not best pick" to the player to indicate to the player that the selection 1304 picked by the player is not the best pick as determined by the gaming device. It should be appreciated that the second or additional indicator may be any suitable statement or phrase. It should also be appreciated that the second indicator may include an illumination device which illuminates or highlights the selection. The second prompt further directs the player to the best pick, which is selection 1308 as indicated by the first indicator 1316. As described above, the gaming device may indicate or direct the player to the best pick in each pick or in a plurality of picks. If the player does not pick the determined best pick or best selection in a game, the gaming device re-determines or re-designates the next best pick or optimal selection in the game based on the player's previous selection. The gaming device continues to direct the player to the best pick until the game ends.

Figure 20A:
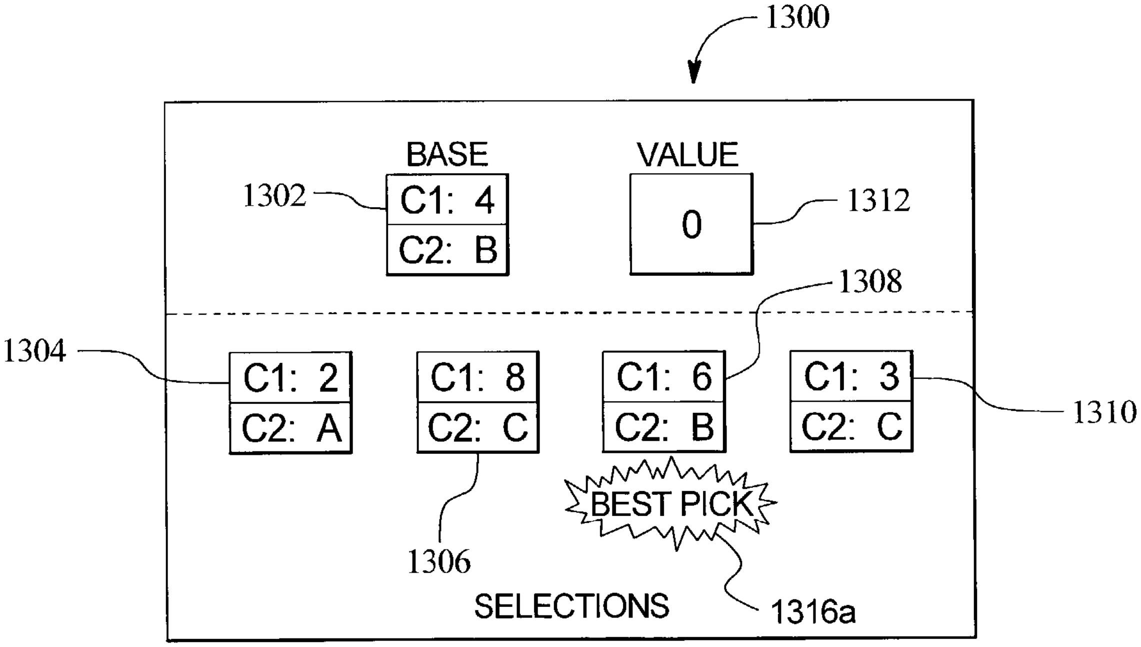
FIGS. 20A to 20C are elevation views of an example of the embodiment of FIG. 19.
Figure 20B:
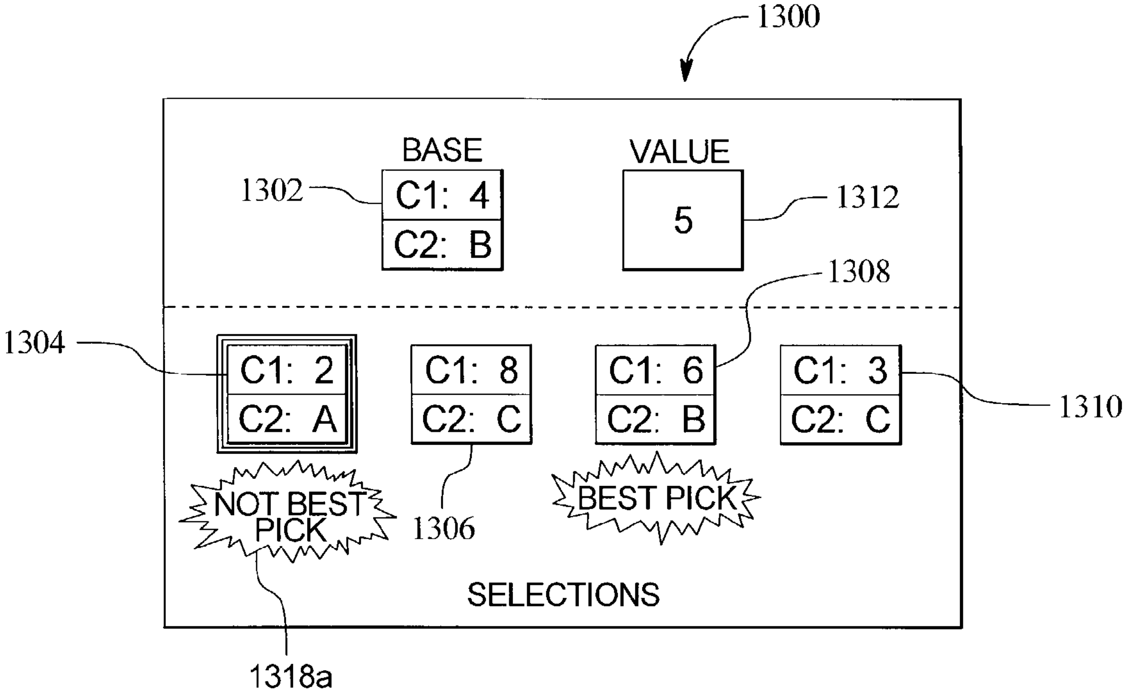
Figure 20C:
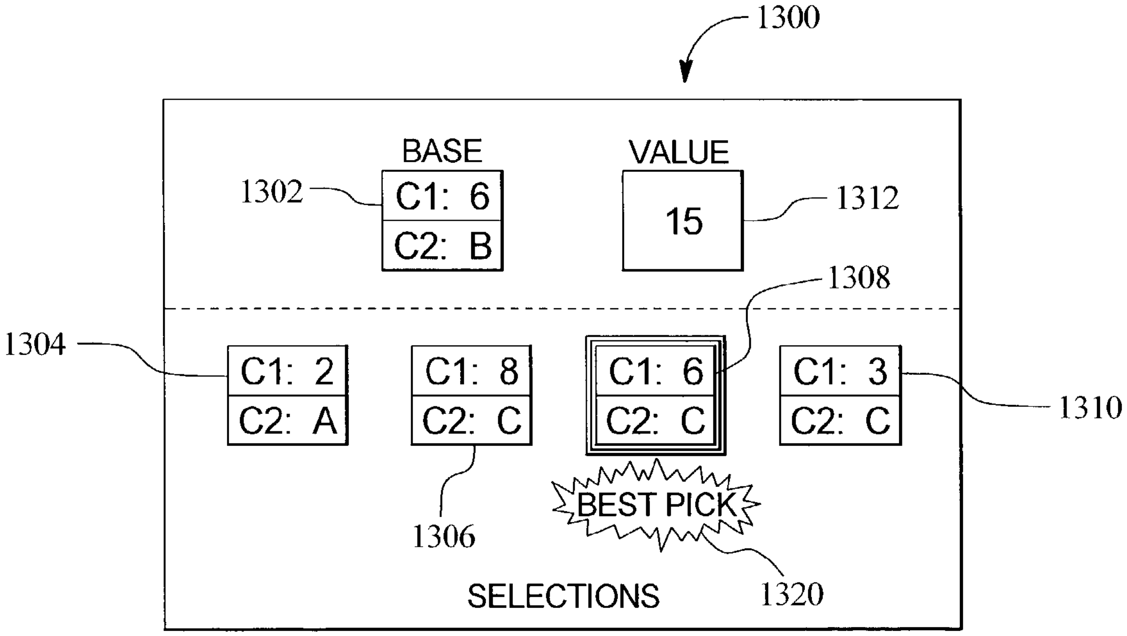

Referring to FIGS. 20A to 20C, an example of the embodiment of FIG. 19 is illustrated where the gaming device displays a matching game 1300 including a plurality of selections 1302, 1304, 1306, 1308 and 1310 where one of the selections 1302 functions as a base. The base or base selections includes a first characteristic, C1=4, and a second characteristic, C2=B. The gaming device enables the player to pick one of the selections including at least one characteristic that matches one of the characteristics of the selection functioning as the base 1302. The gaming device determines an award or value for each picked selection that includes a characteristic that matches one of the characteristics of the selection functioning as the base 1302 as indicated by the value display 1312. In this example, the gaming device displays two indicators 1316 and 1318 to direct the player to pick the best or optimal selection in the game.

Referring to FIG. 20A, the gaming device determines that selection 1308 is the best or optimal selection of the four selections in the game. The gaming device makes this determination because the second characteristic, C2=B matches the second characteristic of the selection functioning as the base 1302. None of the other selections in the game include at least one characteristic that matches one of the characteristics of the base 1302. Therefore, the gaming device displays an indicator or prompt 1316*a* which states that selection 1308 is the best pick or optimal selection in the game. The gaming device is directing the player to pick 1308 to maximize the players picks in the game.

Referring to FIG. 20B, the player picks selection 1304. Because selection 1304 is not the best or optimal selection in the game as determined by the gaming device, the gaming device displays the additional indicator 1318*a* which is the statement "not best pick." Therefore, the gaming device is directing the player away from picking any of the selections except the best selection 1308. The additional indicator 1318*a* therefore further directs the player to the optimal selection in the game.

Referring to FIG. 20C, the gaming device continues to indicate or direct the player to pick the best pick or optimal selection in the game by displaying the indicator 1316*a*, "best pick" to the player. The player picks selection 1308 and therefore picks the best pick or selection in the game. It should be appreciated that the gaming device may direct the player to the best selection or optimal selection by employing one or more prompts as described above in each of the picks, in a plurality of the picks, or in any other combination of picks as desired by the game implementor.

Figure 21:
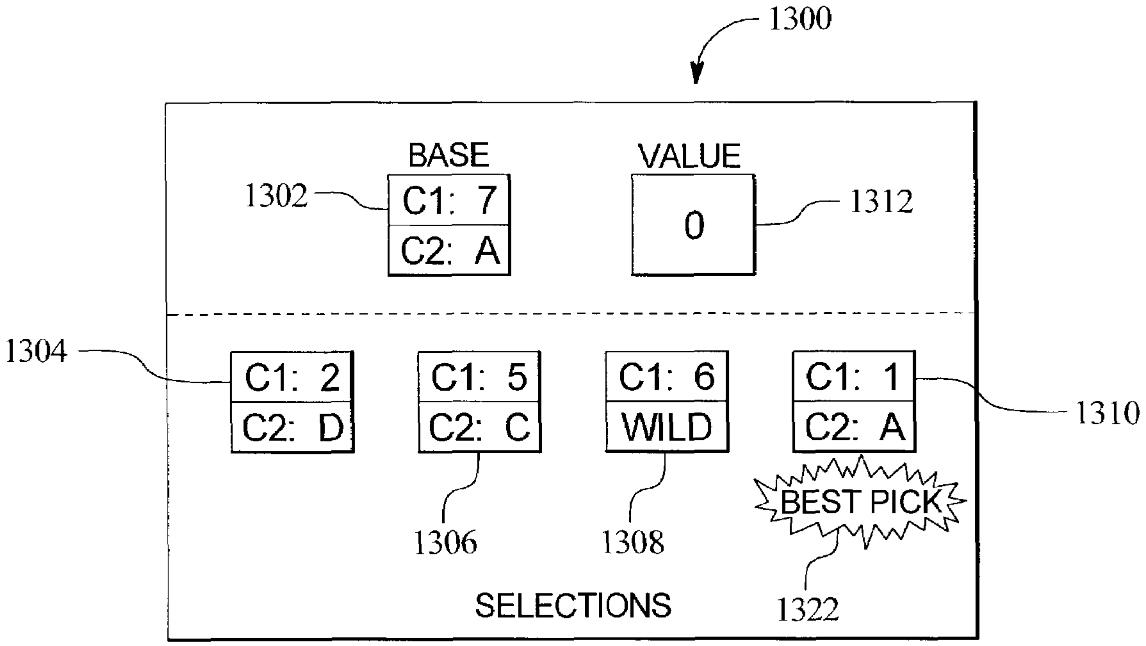
FIG. 21 is an elevation view of a display device of a further embodiment of the multi-characteristic matching game of the present invention illustrating a plurality of selections wherein the indicator directs the player to pick one of the selections in the game, which is not a selection including a wild characteristic.

Referring to FIG. 21, another embodiment of the present invention is illustrated where the multi-characteristic matching game 1300 includes a prompt or indicator 1322, that directs the player to the optimal selection in the game, which is not a selection including a wild characteristic. In this embodiment, if one of the selections includes a wild characteristic (i.e., WILD), which automatically matches any of the characteristics in the game, the gaming device picks the next best or next optimal selection (not including a WILD characteristic) as the best pick or optimal selection in the game. The gaming device indicates the best or optimal pick in the game by displaying a prompt including a statement such as "best pick" to the player associated with the best selection as described above In FIG. 21, the second characteristic (C2) of selection 1308 includes a wild characteristic. Therefore, the gaming device picks the next best selection or next optimal selection, not including a wild characteristic, which is selection 1310. The second characteristic of selection 1310 is the letter A which matches the second characteristic of the base 1302. The gaming device indicates selection 1310 as the best pick by displaying the prompt 1322 to the player. The gaming device continues to indicate the best pick or optimal selection that does not include a wild characteristic until only the selections including the wild characteristic are remaining in the game. The gaming device will then indicate the optimal selection of the remaining or unpicked selections in the game. It should be appreciated that the gaming device may indicate or direct the player to the best or optimal selection based on any characteristic or criteria in the game.

It should be appreciated that the alternative embodiments of the multi-characteristic matching game of the present invention can be simultaneously implemented in a single primary game or bonus round or each implemented individually in different primary games or bonus rounds. The determination of when to implement such alternative embodiments could also be randomly determined.

It should further be appreciated that the present invention may alternatively be implemented as a casino table game. In such embodiment, after the player makes an initial wager, the base and the selection may be revealed or partially revealed to the player as described above. Additional wagers may also be placed to obtain different or additional bases and/or selections.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device comprising:

a game;

a plurality of rounds in the game;

a base in each round including at least two characteristics;

a plurality of selections, each of the selections having at least two characteristics; and a processor operable to:

(i) enable a player in an initial round to pick selections in the round until none of the characteristics of the unpicked selections match one of the characteristics of the base, (ii) determine an award based on the number of picked selections which include at least one characteristic that matches one of the characteristics of the base, (iii) initiate a subsequent round in the game when none of the characteristics of the unpicked selections match at least one of the characteristics of the base, and (iv) provide a total award to the player associated with the determined award in each of the rounds when there are no rounds remaining in the game.

2. The gaming device of claim 1, wherein each of the picked selections replace the base for subsequent selections when at least one of the characteristics of each of the picked selections matches one of the characteristics of the base.

3. The gaming device of claim 1, wherein a randomly generated selection replaces each of the picked selections when at least one of the characteristics of each of the picked selections matches one of the characteristics of the base.

4. The gaming device of claim 1, wherein each of the picked selections is removed when at least one of the characteristics of each of the picked selections matches one of the characteristics of the base.

5. The gaming device of claim 1, which includes a modifier associated with each of the rounds, wherein the total award is based on the determined award or awards modified by the modifier in each of the rounds.

6. The gaming device of claim 5, wherein the modifier is different in each of the rounds.

7. The gaming device of claim 5, wherein the modifier is different in a plurality of the rounds.

8. The gaming device of claim 5, wherein the modifier increases, decreases or remains unchanged in each of the rounds.

9. The gaming device of claim 5, wherein the modifier increases, decreases or remains unchanged in a plurality of rounds.

10. The gaming device of claim 5, wherein the modifier associated with each of the rounds is randomly determined.

11. The gaming device of claim 5, wherein the modifier associated with each of the rounds is predetermined.

12. The gaming device of claim 5, wherein the modifier associated with each of the rounds is determined based on a wager made by the player.

13. The gaming device of claim 5, wherein the modifier associated with each of the rounds includes a multiplier.

14. The gaming device of claim 1, wherein each characteristic of the base and the selections are chosen from a set of characteristics, and the number of characteristics in each set of characteristics is equal.

15. The gaming device of claim 1, wherein each characteristic of the base and the selections are chosen from a set of characteristics, and the number of characteristics in each set of characteristics is unequal.

16. The gaming device of claim 1, wherein each characteristic is selected from a group consisting of numbers, letters, colors, symbols, game elements, characters, pictures and images.

17. The gaming device of claim 1, wherein the base and the selections are cards.

18. The gaming device of claim 1, which includes a functional element associated with at least one selection.

19. The gaming device of claim 18, wherein the functional element is a wild characteristic.

20. The gaming device of claim 19, wherein the base includes a wild characteristic.

21. The gaming device of claim 1, wherein the award is different in each of the rounds.

22. The gaming device of claim 1, wherein the award is different in a plurality of the rounds.

23. The gaming device of claim 1, wherein the award is randomly determined.

24. The gaming device of claim 1, wherein the award is predetermined.

25. The gaming device of claim 1, wherein the award is determined based on a wager made by the player.

26. The gaming device of claim 1, which includes a bonus award provided to the player when the player picks a plurality of the selections in one of the rounds.

27. The gaming device of claim 1, which includes a bonus award provided to the player when the player picks all of the selections in one of the rounds.

28. The gaming device of claim 1, wherein at least one of the selections includes a modifier.

29. The gaming device of claim 28, wherein the modifier is a multiplier.

30. A gaming device comprising:

a game;

a plurality of rounds in the game;

a plurality of selections, each of the selections having at least two characteristics wherein one of the selections is picked to initially function as a base; and a processor operable to:

(i) enable a player to pick one of the selections in an initial round, (ii) enable the player to continue to pick selections when at least one of the characteristics of each of the picked selections matches one of the characteristics of the base or the previously picked selection which replaces the base, (iii) sequentially replace the base with each of the picked selections in the round, (iv) determine an award based on the number of picked selections which include at least one characteristic that matches one of the characteristics of the base, (v) initiate a subsequent round in the game when none of the characteristics of the unpicked selections match at least one of the characteristics of the base, and (vi) provide a total award to the player associated with the determined award in each of the rounds when there are no rounds remaining in the game.

31. The gaming device of claim 30, wherein a randomly generated selection replaces each of the picked selections when at least one of the characteristics of each of the picked selections matches one of the characteristics of the base.

32. The gaming device of 30, wherein each of the picked selections is removed when at least one of the characteristics of each of the picked selections matches one of the characteristics of the base.

33. The gaming device of claim 30, wherein a randomly generated selection replaces the base when at least one of the characteristics of each of the picked selections matches one of the characteristics of the base.

34. The gaming device of claim 30, wherein the base and the selections are cards.

35. The gaming device of claim 30, which includes a functional element associated with at least one selection.

36. The gaming device of claim 35, wherein the functional element is a wild characteristic.

37. The gaming device of claim 36, wherein the base includes a wild characteristic.

38. The gaming device of claim 30, wherein at least one of the selections includes a modifier.

39. The gaming device of claim 38, wherein the modifier is a multiplier.

40. A gaming device comprising:

a game including a plurality of rounds;

a base including at least two characteristics;

a plurality of selections, each of the selections having at least two characteristics, wherein one selection is picked to initially function as the base;

a modifier associated with each of the rounds in the game; and a processor operable to:

(i) enable a player to pick one of the selections in an initial round, (ii) enable the player to continue to pick selections in the round when at least one of the characteristics of each of the picked selections matches one of the characteristics of the base or the previously picked selection which is functioning as the base, (iii) determine an award based on the number of picked selections which include at least one characteristic that matches one of the characteristics of the base or the previously picked selection which is functioning as the base, (iv) initiate a subsequent round in the game when none of the characteristics of the unpicked selections match at least one of the characteristics of the base, and (v) provide a total award to the player associated with the determined award and the modifier associated with each of the rounds when there are no rounds remaining in the game.

41. The gaming device of claim 40, wherein the modifier is different in each of the rounds.

42. The gaming device of claim 40, wherein the modifier is different in a plurality of the rounds.

43. The gaming device of claim 40, wherein the modifier increases, decreases or remains unchanged in each of the rounds.

44. The gaming device of claim 40, wherein the modifier increases, decreases or remains unchanged in a plurality of rounds.

45. The gaming device of claim 40, wherein the modifier associated with each of the rounds is randomly determined.

46. The gaming device of claim 40, wherein the modifier associated with each of the rounds is predetermined.

47. The gaming device of claim 40, wherein the modifier associated with each of the rounds is determined based on a wager made by the player.

48. The gaming device of claim 40, wherein at least one of the selections includes a modifier.

49. The gaming device of claim 48, wherein the modifier is a multiplier.

50. A gaming device comprising:
- a game including a plurality of rounds;
- a base card including at least two characteristics;
- a plurality of card selections including at least two of the characteristics; and
- a processor operable to:
  - (i) enable a player to pick one of the card selections in an initial round,
  - (ii) enable the player to continue to pick card selections in the round when at least one of the characteristics of each of the picked card selections matches one of the characteristics of the base card,
  - (iii) determine an award based on the number of picked card selections which include at least one characteristic that matches one of the characteristics of the base card,
  - (iv) initiate a subsequent round in the game when none of the characteristics of the unpicked card selections match at least one of the characteristics of the base card, and
  - (v) provide a total award to the player based on the determined award in each of the rounds when there are no rounds remaining in the game.

51. The gaming device of claim 50, wherein one of the characteristics is a wild characteristic.

52. The gaming device of claim 50, wherein each characteristic is selected from a group consisting of: playing card suits, numbers, letters, colors, symbols, game elements, characters, pictures and images.

53. The gaming device of claim 50, wherein at least one of the card selections includes a modifier.

54. The gaming device of claim 53, wherein the modifier is a multiplier.

55. A method of operating a gaming device having a game including a plurality of rounds, the method comprising the steps of:
- (a) displaying a base including at least two characteristics in an initial round;
- (b) displaying a plurality of selections each including at least two of the characteristics in the round;
- (c) enabling a player to pick one of the selections;
- (d) repeating step (c) until there are no selections in the round that include at least one characteristic that matches one of the characteristics of the base;
- (e) determining an award based on the number of picked selections which include at least one characteristic that matches one of the characteristics of the base;
- (f) initiating the next round in the game;
- (g) repeating steps (c) to (f) until there are no rounds remaining in the game; and
- (h) providing a total award to the player associated with the determined award in each of the rounds in the game.

56. The method of claim 55, which includes the step of removing the picked selection when at least one of the characteristics of the picked selection matches one of the characteristics of the base.

57. The method of claim 55, which includes the step of replacing the base with the picked selection.

58. The method of claim 55, which includes the step of providing a modifier in each of the rounds of the game.

59. The method of claim 58, wherein the modifier is different in each of the rounds of the game.

60. The method of claim 58, wherein the modifier is different in a plurality of the rounds of the game.

61. The method of claim 58, which includes the step of increasing the modifier in each round of the game.

62. The method of claim 61, wherein the step of increasing the modifier includes increasing the modifier by a randomly determined amount.

63. The method of claim 61, wherein the step of increasing the modifier includes increasing the modifier by a predetermined amount.

64. The method of claim 61, wherein the step of increasing the modifier includes increasing the modifier based on a wager made by the player.

65. The method of claim 58, which includes the step of increasing the modifier in a plurality of rounds in the game.

66. The method of claim 58, which includes the step of increasing the award in each round of the game.

67. The method of claim 66, wherein the step of increasing the award includes increasing the award by a randomly determined amount.

68. The method of claim 66, wherein the step of increasing the award includes increasing the award by a predetermined amount.

69. The method of claim 66, wherein the step of increasing the award includes increasing the award based on a wager made by the player.

70. The method of claim 55, which includes the step of selecting each characteristic of the base and the selections from a set of characteristics.

71. The method of claim 70, wherein the characteristics in the set are selected from a group consisting of: numbers, symbols, colors, game elements, characters, pictures and images.

72. The method of claim 70, wherein at least two of the characteristics in the set are different.

73. The method of claim 70, wherein a plurality of the characteristics in the set are different.

74. The method of claim 70, wherein all of the characteristics in the set are different.

75. The method of claim 55, which includes the step of associating a functional element with at least one of the selections.

76. The method of claim 75, wherein the functional element is a wild characteristic.

77. The method of claim 55, which includes the step of associating a functional element with the base.

78. The gaming device of claim 55, wherein at least one of the selections includes a modifier.

79. The gaming device of claim 78, wherein the modifier is a multiplier.

80. The method of claim 55, wherein the steps (a) to (h) are provided to the player through a data network.

81. The method of claim 80, wherein the data network is an internet.

82. A method of operating a gaming device having a game including a plurality of rounds, the method comprising the steps of:
- (a) displaying a base including at least two characteristics in an initial round;
- (b) displaying a plurality of selections including at least two of the characteristics in the round;
- (c) enabling a player to pick one of the selections;
- (d) replacing the base with the picked selection when at least one of the characteristics of the picked selection matches one of the characteristics of the base;

(e) repeating steps (c) to (d) until there are no selections in the round that include at least one characteristic that matches one of the characteristics of the base;

(f) determining an award based on the number of picked selections which include at least one characteristic that matches one of the characteristics of the base;

(g) initiating the next round in the game;

(h) repeating steps (c) to (g) until there are no rounds remaining in the game; and (i) providing a total award to the player associated with the determined award in each of the rounds in the game.

83. The method of claim 82, wherein the steps (a) to (i) are provided to the player through a data network.

84. The method of claim 83, wherein the data network is an internet.

85. A method of operating a gaming device having a game including a plurality of rounds, the method comprising the steps of:

(a) displaying a base including at least two characteristics in an initial round;

(b) displaying a plurality of selections including at least two of the characteristics in the round;

(c) associating a multiplier with each of the rounds in the game;

(d) enabling a player to pick one of the selections;

(e) replacing the base with the picked selection when at least one of the characteristics of the picked selection matches one of the characteristics of the base;

(f) repeating steps (d) to (e) until there are no selections in the round that include at least one characteristic that matches one of the characteristics of the base;

(g) determining an award based on the number of picked selections which include at least one characteristic that matches one of the characteristics of the base;

(h) initiating the next round in the game;

(i) repeating steps (d) to (h) until there are no rounds remaining in the game; and (j) providing a total award to the player associated with the determined award and the multiplier in each of the rounds in the game.

86. The method of claim 85, wherein the multiplier is different in each round of the game.

87. The method of claim 85, wherein the multiplier is different in a plurality of the rounds of the game.

88. The method of claim 85, which includes the step of increasing the multiplier in each round of the game.

89. The method of claim 88, wherein the step of increasing the multiplier includes increasing the multiplier by a randomly determined amount.

90. The method of claim 88, wherein the step of increasing the multiplier includes increasing the multiplier by a predetermined amount.

91. The method of claim 88, wherein the step of increasing the multiplier includes increasing the multiplier based on a wager made by the player.

92. The method of claim 85, which includes the step of increasing the multiplier in a plurality of rounds in the game.

93. The gaming device of claim 85, wherein at least one of the selections includes a modifier.

94. The gaming device of claim 93, wherein the modifier is a multiplier.

95. The method of claim 85, wherein the steps (a) to (j) are provided to the player through a data network.

96. The method of claim 95, wherein the data network is an internet.

97. A method of operating a gaming device having a game including a plurality of rounds, the method comprising the steps of:

(a) displaying a base card including at least two characteristics in an initial round;

(b) displaying a plurality of card selections including at least two of the characteristics in the round;

(c) enabling a player to pick one of the card selections;

(d) repeating step (c) until there are no card selections in the round that include at least one characteristic that matches one of the characteristics of the base card;

(e) determining an award based on the number of picked selections which include at least one characteristic that matches one of the characteristics of the base card;

(f) initiating the next round in the game;

(g) repeating steps (c) to (f) until there are no rounds remaining in the game; and (h) providing a total award to the player associated with the determined award in each of the rounds in the game.

98. The method of claim 97, wherein the characteristics include at least two of the following: numbers, letters, card suits, colors, pictures and images.

99. The gaming device of claim 97, wherein at least one of the card selections includes a modifier.

100. The gaming device of claim 99, wherein the modifier is a multiplier.

101. The method of claim 97, wherein the steps (a) to (h) are provided to the player through a data network.

102. The method of claim 101, wherein the data network is an internet.

* * * * *

UNITED STATES PATENT AND TRADEMARK OFFICE

CERTIFICATE OF CORRECTION

PATENT NO. : 7,040,983 B2
APPLICATION NO. : 10/243706
DATED : May 9, 2006
INVENTOR(S) : Jan K. Dolloff et al.

It is certified that error appears in the above-identified patent and that said Letters Patent is hereby corrected as shown below:

Column 1, line 20, change “Ser. No. 09/605,023.” to --Serial No. 09/605,023, Attorney Docket No. 0112300-025; “GAMING DEVICE HAVING A MULTI-CHARACTERISTIC MATCHING GAME,” Serial No. 09/813,698, Attorney Docket No. 0112300-609, and “GAMING DEVICE HAVING A MULTI-CHARACTERISTIC MATCHING GAME INCLUDING SELECTION INDICATORS,” Serial No. 10/243,192, Attorney Docket No. 0112300-1052.--

Signed and Sealed this

Twenty-second Day of August, 2006

JON W. DUDAS
*Director of the United States Patent and Trademark Office*